United States Patent
Bhagi et al.

(10) Patent No.: US 12,026,252 B2
(45) Date of Patent: *Jul. 2, 2024

(54) DETECTING RANSOMWARE IN SECONDARY COPIES OF CLIENT COMPUTING DEVICES

(71) Applicant: Commvault Systems, Inc., Tinton Falls, NJ (US)

(72) Inventors: Sri Karthik Bhagi, Morganville, NJ (US); Pratima Laxman Gadhave, Neptune, NJ (US); Marcelo dos Reis Mansano, Paraná (BR); Mrityunjay Upadhyay, Telengana (IN); PurnaChandra Sekhar Bedhapudi, Eatontown, NJ (US); Shyam Sundar Ramkumar, East Brunswick, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 209 days.

This patent is subject to a terminal disclaimer.

(21) Appl. No.: 17/243,188

(22) Filed: Apr. 28, 2021

(65) Prior Publication Data

US 2022/0292188 A1    Sep. 15, 2022

Related U.S. Application Data

(60) Provisional application No. 63/160,636, filed on Mar. 12, 2021, provisional application No. 63/160,459, filed on Mar. 12, 2021.

(51) Int. Cl.
*G06F 21/55*    (2013.01)
*G06F 9/455*    (2018.01)
(Continued)

(52) U.S. Cl.
CPC ........ *G06F 21/554* (2013.01); *G06F 9/45533* (2013.01); *G06F 11/1451* (2013.01);
(Continued)

(58) Field of Classification Search
CPC ............... G06F 21/554; G06F 9/45533; G06F 11/1451; G06F 21/54; G06F 21/561;
(Continued)

(56) References Cited

U.S. PATENT DOCUMENTS

| | | |
|---|---|---|
| 4,084,231 A | 4/1978 | Capozzi et al. |
| 4,267,568 A | 5/1981 | Dechant et al. |

(Continued)

FOREIGN PATENT DOCUMENTS

| | | |
|---|---|---|
| AU | 2010339584 B2 | 6/2014 |
| CN | 101986324 B | 8/2014 |

(Continued)

OTHER PUBLICATIONS

Arneson, "Mass Storage Archiving in Network Environments" IEEE, Oct. 31-Nov. 1998, pp. 45-50.

(Continued)

*Primary Examiner* — Dereena T Cattungal
(74) *Attorney, Agent, or Firm* — Commvault Systems, Inc.

(57) ABSTRACT

An information management system includes one or more client computing devices in communication with a storage manager and a secondary storage computing device. The storage manager manages the primary data of the one or more client computing devices and the secondary storage computing device manages secondary copies of the primary data of the one or more client computing devices. Each client computing device may be configured with a ransomware protection monitoring application that monitors for changes in their primary data. The ransomware protection (Continued)

monitoring application may input the changes detected in the primary data into a machine-learning classifier, where the classifier generates an output indicative of whether a client computing device has been affected by malware and/or ransomware. Using a virtual machine host, a virtual machine copy of an affected client computing device may be instantiated using a secondary copy of primary data of the affected client computing device.

17 Claims, 30 Drawing Sheets

(51) Int. Cl.
  *G06F 11/14*  (2006.01)
  *G06F 21/54*  (2013.01)
  *G06F 21/56*  (2013.01)
  *G06F 21/62*  (2013.01)
  *G06F 21/78*  (2013.01)
  *G06N 5/04*  (2023.01)
  *G06N 20/00*  (2019.01)

(52) U.S. Cl.
  CPC ............ *G06F 21/54* (2013.01); *G06F 21/561* (2013.01); *G06F 21/566* (2013.01); *G06F 21/567* (2013.01); *G06F 21/568* (2013.01); *G06F 21/6218* (2013.01); *G06F 21/78* (2013.01); *G06N 5/04* (2013.01); *G06N 20/00* (2019.01); *G06F 2201/815* (2013.01); *G06F 2221/034* (2013.01)

(58) Field of Classification Search
  CPC .... G06F 21/566; G06F 21/567; G06F 21/568; G06F 21/6218; G06F 21/78; G06F 2201/815; G06F 2221/034; G06F 11/1469; G06F 11/1453; G06N 5/04; G06N 20/00
  USPC .......................................................... 726/23
  See application file for complete search history.

(56) References Cited

U.S. PATENT DOCUMENTS

| | | | |
|---|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,827,400 A | 5/1989 | Dunwell et al. |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,329,465 A | 7/1994 | Arcella et al. |
| 5,347,653 A | 9/1994 | Flynn et al. |
| 5,410,295 A | 4/1995 | Van Lint |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 5,734,817 A | 3/1998 | Roffe et al. |
| 5,781,703 A | 7/1998 | Desai et al. |
| 6,073,172 A | 6/2000 | Frailong et al. |
| 6,418,478 B1 | 7/2002 | Ignatius et al. |
| 6,542,972 B2 | 4/2003 | Oshinsky et al. |
| 6,658,436 B2 | 12/2003 | Oshinsky et al. |
| 6,721,767 B2 | 4/2004 | Meno et al. |
| 6,760,723 B2 | 7/2004 | Oshinsky et al. |
| 6,795,856 B1 | 9/2004 | Bunch |
| 6,959,368 B1 | 10/2005 | St. Pierre et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,107,416 B2 | 9/2006 | Stuart et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,213,176 B2 | 5/2007 | Banko |
| 7,246,207 B2 | 7/2007 | Kottomtharayil et al. |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,502,972 B1 | 3/2009 | Chilukuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,779,021 B1 | 8/2010 | Smith et al. |
| 7,801,864 B2 | 9/2010 | Prahlad et al. |
| 7,809,914 B2 | 10/2010 | Kottomtharayil et al. |
| 7,895,167 B2 | 2/2011 | Berg et al. |
| 7,975,262 B2 | 7/2011 | Cozmei |
| 8,077,341 B2 | 12/2011 | Hull et al. |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,230,195 B2 | 7/2012 | Amarendran et al. |
| 8,266,159 B2 | 9/2012 | Torres |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,396,838 B2 | 3/2013 | Brockway et al. |
| 8,407,673 B2 | 3/2013 | Terpolilli |
| 8,495,060 B1 | 7/2013 | Chang |
| 8,527,468 B1 | 9/2013 | Crafford et al. |
| 8,578,120 B2 | 11/2013 | Attarde et al. |
| 8,601,323 B2 | 12/2013 | Tsantilis |
| 8,874,967 B2 | 10/2014 | Spafford et al. |
| 8,904,243 B2 | 12/2014 | Loimuneva et al. |
| 8,954,446 B2 | 2/2015 | Vijayan Retnamma et al. |
| 8,959,299 B2 | 2/2015 | Ngo et al. |
| 9,020,900 B2 | 4/2015 | Vijayan Retnamma et al. |
| 9,098,495 B2 | 8/2015 | Gokhale |
| 9,158,469 B2 | 10/2015 | Winter |
| 9,239,687 B2 | 1/2016 | Vijayan et al. |
| 9,244,779 B2 | 1/2016 | Littlefield et al. |
| 9,391,825 B1 | 7/2016 | Beal et al. |
| 9,405,928 B2 * | 8/2016 | Amarendran ......... G06F 21/602 |
| 9,424,271 B2 | 8/2016 | Tata |

(56) References Cited

U.S. PATENT DOCUMENTS

| | | | |
|---|---|---|---|
| 9,633,033 B2 | 4/2017 | Vijayan et al. |
| 9,639,274 B2 | 5/2017 | Maranna et al. |
| 9,661,023 B1 | 5/2017 | Fang |
| 9,766,825 B2 | 9/2017 | Bhagi |
| 9,852,026 B2 | 12/2017 | Mitkar et al. |
| 9,934,265 B2 | 4/2018 | Karandikar et al. |
| 10,007,795 B1 | 6/2018 | Chung et al. |
| 10,009,360 B1 | 6/2018 | Todd et al. |
| 10,061,663 B2 | 8/2018 | Vijayan et al. |
| 10,138,729 B2 | 11/2018 | Fliearman |
| 10,210,330 B1 * | 2/2019 | Chen ............... G06F 11/1451 |
| 10,228,962 B2 | 3/2019 | Dornemann et al. |
| 10,296,613 B2 | 5/2019 | Karandikar et al. |
| 10,310,953 B2 | 6/2019 | Kumar |
| 10,331,885 B2 | 6/2019 | Chelarescu et al. |
| 10,366,096 B2 | 7/2019 | Ferrar |
| 10,387,266 B2 | 8/2019 | Kumarasamy et al. |
| 10,545,699 B2 | 1/2020 | Baptist et al. |
| 10,592,357 B2 | 3/2020 | Vijayan et al. |
| 10,650,146 B1 * | 5/2020 | Gaurav ............... G06F 21/565 |
| 10,902,119 B1 | 1/2021 | Vashisht |
| 11,100,064 B2 | 8/2021 | Dwarampudi et al. |
| 11,574,050 B2 | 2/2023 | Bhagi et al. |
| 2002/0186131 A1 | 12/2002 | Fettis |
| 2004/0003316 A1 | 1/2004 | Meng et al. |
| 2004/0187029 A1 | 9/2004 | Ting |
| 2005/0138642 A1 | 6/2005 | Breh et al. |
| 2005/0192921 A1 | 9/2005 | Chaudhuri et al. |
| 2006/0031942 A1 | 2/2006 | Jones et al. |
| 2006/0036989 A1 | 2/2006 | Chaudhuri et al. |
| 2006/0075306 A1 | 4/2006 | Chandrasekaran |
| 2006/0218637 A1 | 9/2006 | Thomas et al. |
| 2006/0224846 A1 | 10/2006 | Amarendran et al. |
| 2007/0220602 A1 | 9/2007 | Ricks et al. |
| 2008/0022209 A1 | 1/2008 | Lyle |
| 2008/0163333 A1 | 7/2008 | Kasralikar |
| 2008/0183805 A1 | 7/2008 | Cancel et al. |
| 2008/0228998 A1 | 9/2008 | Colecchia |
| 2008/0243882 A1 | 10/2008 | Bailey et al. |
| 2008/0288215 A1 | 11/2008 | Duberry |
| 2008/0300900 A1 | 12/2008 | Demarest |
| 2009/0038010 A1 | 2/2009 | Ma et al. |
| 2009/0254655 A1 | 10/2009 | Kidwell et al. |
| 2009/0276205 A1 | 11/2009 | Jennings et al. |
| 2009/0319534 A1 | 12/2009 | Gokhale |
| 2009/0328119 A1 | 12/2009 | Kan et al. |
| 2009/0328186 A1 | 12/2009 | Pollutro et al. |
| 2010/0043072 A1 | 2/2010 | Rothwell |
| 2010/0123575 A1 | 5/2010 | Mittal et al. |
| 2010/0125554 A1 | 5/2010 | Jennings et al. |
| 2010/0169472 A1 | 7/2010 | Okamoto et al. |
| 2010/0185632 A1 | 7/2010 | Ylonen |
| 2011/0093461 A1 | 4/2011 | Mui et al. |
| 2011/0093471 A1 | 4/2011 | Brockway et al. |
| 2012/0011153 A1 | 1/2012 | Buchanan et al. |
| 2012/0016839 A1 | 1/2012 | Yueh |
| 2012/0113265 A1 | 5/2012 | Galvin |
| 2012/0150818 A1 | 6/2012 | Vijayan Retnamma et al. |
| 2012/0150826 A1 | 6/2012 | Vijayan Retnamma et al. |
| 2012/0173567 A1 | 7/2012 | Zavatone et al. |
| 2012/0179809 A1 | 7/2012 | Barsness et al. |
| 2012/0203895 A1 | 8/2012 | Jaudon et al. |
| 2012/0278354 A1 | 11/2012 | Yan et al. |
| 2013/0024423 A1 | 1/2013 | Doshi et al. |
| 2013/0054635 A1 | 2/2013 | Phelps et al. |
| 2013/0080538 A1 | 3/2013 | McEachern et al. |
| 2013/0082848 A1 | 4/2013 | Marjanen et al. |
| 2013/0227352 A1 | 8/2013 | Kumarasamy et al. |
| 2013/0317944 A1 | 11/2013 | Huang et al. |
| 2013/0332685 A1 | 12/2013 | Kripalani et al. |
| 2013/0335785 A1 | 12/2013 | Qi et al. |
| 2014/0025796 A1 | 1/2014 | Vibhor et al. |
| 2014/0074793 A1 | 3/2014 | Doering et al. |
| 2014/0137246 A1 | 5/2014 | Baluda |
| 2014/0201170 A1 | 7/2014 | Vijayan et al. |
| 2014/0201485 A1 | 7/2014 | Ahn et al. |
| 2014/0270159 A1 | 9/2014 | Youn et al. |
| 2014/0298112 A1 | 10/2014 | Otsuka et al. |
| 2014/0344234 A1 | 11/2014 | Amarendran et al. |
| 2015/0163206 A1 | 6/2015 | McCarthy et al. |
| 2015/0172120 A1 | 6/2015 | Dwarampudi et al. |
| 2015/0213484 A1 | 7/2015 | Amara |
| 2015/0236896 A1 | 8/2015 | Brown et al. |
| 2015/0242483 A1 | 8/2015 | Zhou et al. |
| 2016/0004882 A1 | 1/2016 | Ballai |
| 2016/0078245 A1 | 3/2016 | Amarendran et al. |
| 2016/0292263 A1 | 10/2016 | Ferrar |
| 2016/0299934 A1 * | 10/2016 | Karandikar ............ G06F 16/248 |
| 2016/0350391 A1 | 12/2016 | Vijayan et al. |
| 2017/0155674 A1 | 6/2017 | Seo et al. |
| 2017/0168903 A1 | 6/2017 | Dornemann et al. |
| 2017/0185488 A1 | 6/2017 | Kumarasamy et al. |
| 2017/0192866 A1 | 7/2017 | Vijayan et al. |
| 2017/0193003 A1 | 7/2017 | Vijayan et al. |
| 2017/0223031 A1 | 8/2017 | Gu et al. |
| 2017/0235647 A1 | 8/2017 | Kilaru et al. |
| 2017/0242871 A1 | 8/2017 | Kilaru et al. |
| 2017/0269955 A1 | 9/2017 | Hardy |
| 2017/0277774 A1 | 9/2017 | Eigner et al. |
| 2017/0279720 A1 | 9/2017 | Patnaik et al. |
| 2017/0279832 A1 | 9/2017 | Di Pietro et al. |
| 2017/0364681 A1 | 12/2017 | Roguine et al. |
| 2018/0007069 A1 | 1/2018 | Hunt et al. |
| 2018/0018458 A1 | 1/2018 | Schmugar et al. |
| 2018/0204000 A1 | 7/2018 | Charters et al. |
| 2018/0253358 A1 | 9/2018 | Gu |
| 2019/0075130 A1 | 3/2019 | Petry et al. |
| 2019/0095304 A1 | 3/2019 | Kumarasamy et al. |
| 2019/0108340 A1 | 4/2019 | Bedhapudi et al. |
| 2019/0108341 A1 | 4/2019 | Bedhapudi et al. |
| 2019/0109870 A1 * | 4/2019 | Bedhapudi .......... H04L 63/0428 |
| 2019/0138727 A1 * | 5/2019 | Dontov ............... G06F 11/1464 |
| 2019/0205317 A1 | 7/2019 | Tobias et al. |
| 2019/0228147 A1 | 7/2019 | Formato |
| 2020/0089876 A1 | 3/2020 | Aharoni et al. |
| 2020/0159624 A1 * | 5/2020 | Malkov ............... G06N 20/00 |
| 2020/0244672 A1 * | 7/2020 | Grill .................. H04L 63/1433 |
| 2020/0272549 A1 | 8/2020 | Kumarasamy et al. |
| 2020/0320215 A1 | 10/2020 | Bhosale et al. |
| 2020/0349133 A1 | 11/2020 | Dwarampudi et al. |
| 2021/0049075 A1 | 2/2021 | Gibbons, Jr. |
| 2021/0117377 A1 | 4/2021 | Savir |
| 2021/0218551 A1 | 7/2021 | Moriarty |
| 2021/0271758 A1 | 9/2021 | Bedhapudi et al. |
| 2021/0349748 A1 * | 11/2021 | Dunfey ............... G06F 3/065 |
| 2022/0019385 A1 * | 1/2022 | Karr ................. G06F 3/0607 |
| 2022/0292195 A1 | 9/2022 | Holland |
| 2022/0292196 A1 * | 9/2022 | Bhagi ................. G06F 21/561 |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 9513580 | 5/1995 |
| WO | WO 9912098 | 3/1999 |
| WO | WO 2006/052872 | 11/2005 |

OTHER PUBLICATIONS

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Eitel, "Backup and Storage Management in Distributed Heterogeneous Environments," IEEE, 1994, pp. 124-126.

(56) References Cited

OTHER PUBLICATIONS

Huff, KL, "Data Set Usage Sequence Number," IBM Technical Disclosure Bulletin, vol. 24, No. 5, Oct. 1981 New York, US, pp. 2404-2406.

Nagappan et al., Abstracting Log Lines to Log Event Types for Mining Software System Logs, Working Conference on Mining Software Repositories (MSR), May 2010, 7th IEEE, 6 pages.

Rosenblum et al., "The Design and Implementation of a Log-Structure File System," Operating Systems Review SIGOPS, vol. 25, No. 5, May 1991, New York, US, pp. 1-15.

Hossain et al._Combating Dependence Explosion in Forensic Analysis_ 2020 IEEE Symposium May 1, 2020.

Shingomikar et al._Proactive Early Threat Detection and Securing Oracle Database_Mar. 10, 2023.

\* cited by examiner

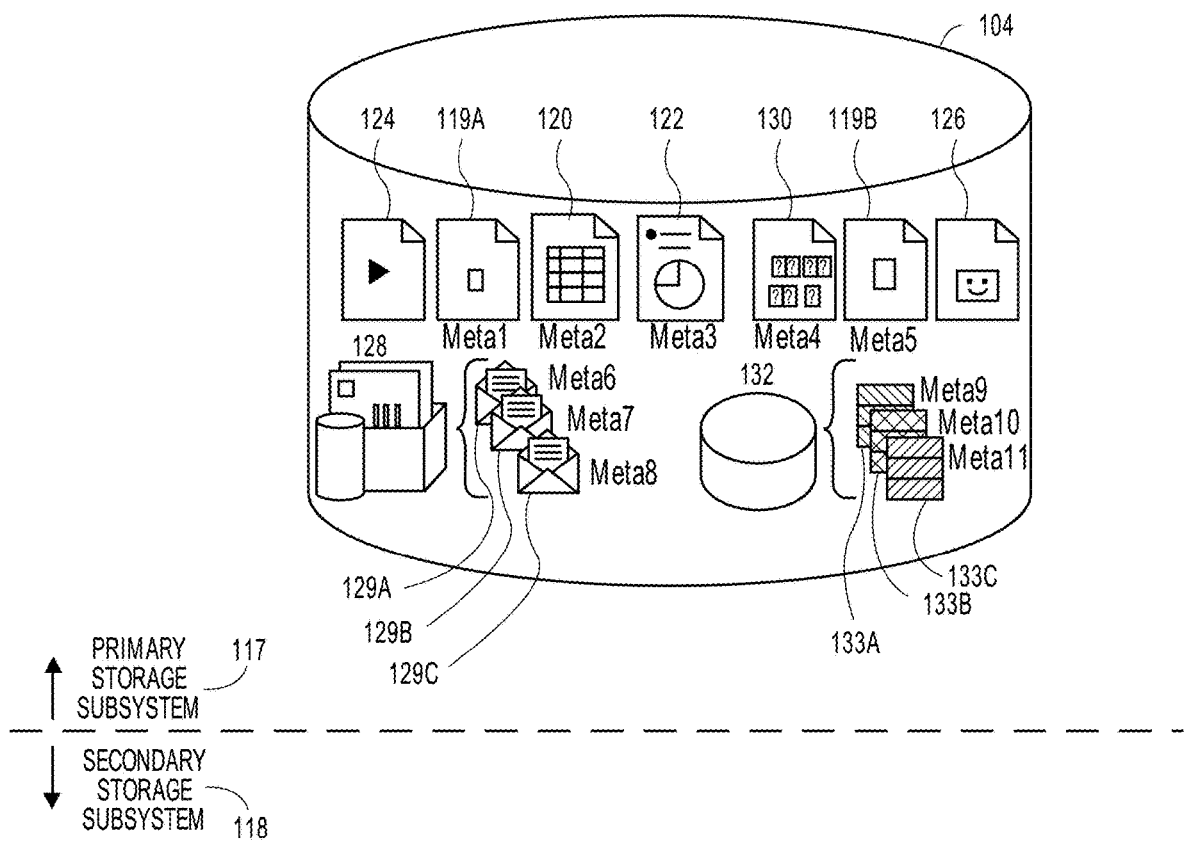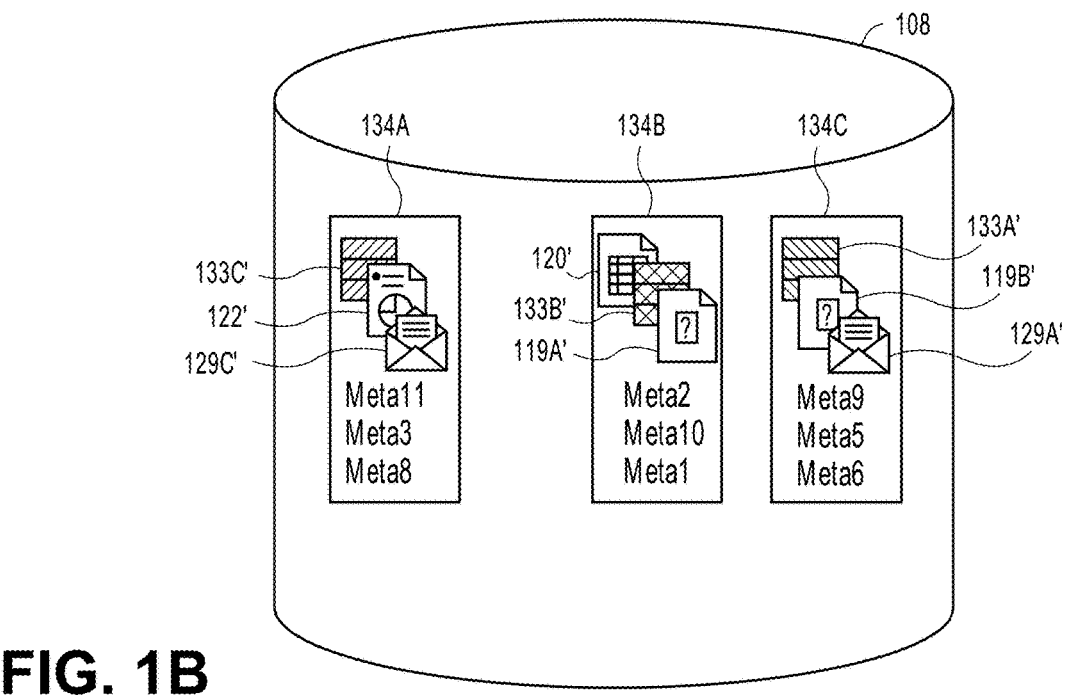
FIG. 1B

- GUIDED SETUP
- DASHBOARD
- PROTECT
  - VIRTUALIZATION
  - FILE SERVERS
  - DATABASES
  - LAPTOPS
  - APPLICATIONS
- UNUSUAL ACTIVITY
  - ORCHESTRATE
- JOBS
- REPORTS
- MONITORING

---

UNUSUAL ACTIVITY — 902

VIEW ACTIVITY DETAILS    CLEAR ACTIVITY    VIRTUALIZE ME    904

ACTIVITY SUMMARY

TYPE
MANY FILES WERE DELETED

CREATED FILES
81

RENAMED FILES
80

DELETED FILES
8000

MODIFIED FILES
800

DETECTED TIME
NOV. 21, 2020 02:01:35 AM

AFFECTED FOLDERS    ···    906

| PATH | AFFECTED FILES |
|---|---|
| E:\DESIGNS\SIDEBARDESIGNED | 41 |
| C:\TOMCAT\APACHE-TOMCAT-9.0.12\ | 2415 |
| C:\WINDOWS\SYSTEM32 | 4200 |
| C:\USERS\TORPHY\DOWNLOADS | 2305 |

906A    906B

DETECTING RANSOMWARE IN SECONDARY COPIES OF CLIENT COMPUTING DEVICES

CROSS-REFERENCE TO RELATED APPLICATIONS

This application claims the benefit of priority to U.S. Pat. App. No. 63/160,459, titled "DETECTING RANSOMWARE IN MONITORED DATA" and filed Mar. 12, 2021, and the benefit of priority to U.S. Pat. App. No. 63/160,636, titled "MEDIA AGENT HARDENING AGAINST RANSOMWARE ATTACKS" and filed Mar. 12, 2021, the disclosures of which are incorporated by reference in their entirety.

Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that leverage their data. For instance, data analysis capabilities, information management, improved data presentation and access features, and the like, are in increasing demand.

In preserving primary data of one or more client computing devices, a company or organization may back up the primary data of the one or more client computing devices to one or more secondary storage devices. However, the users of the client computing devices may unknowingly introduce nefarious or problematic software into the primary data of their client computing device. Malware, ransomware, viruses, and other various forms of malicious software may find their way into the primary data. Furthermore, these types of malicious software are designed to lay dormant and undetected by the user that inadvertently downloaded or installed them. When the client computing device backs up its primary data, that backup may include the malicious software with it. Should the user require a restoration of the primary data from the (now-infected) backup, the restored primary data will include the malicious software. In addition, depending on the complexity or sophistication of the malicious software, the malicious software may replicate and/or propagate itself throughout the backup architecture of the company or organization, and could potentially disrupt or preclude the company or organization from performing further backup and/or restoration operations. Thus, malicious and nefarious software presents itself as a non-trivial problem in the field of data archival and retrieval.

SUMMARY

To address these and other deficiencies, this disclosure describes an information management system that uses one or more machine-learning algorithms and/or trained classifiers to determine whether file system changes on managed client computing devices indicate that an anomaly is present in the file systems of the client computing devices. The information management system may include various devices and components such as a storage manager that manages primary data of one or more client computing devices; one or more secondary storage devices that are used to back up the primary data of the one or more client computing devices; and, one or more secondary storage computing devices that generate secondary copies from the primary data and manage and/or provide access to the secondary storage devices. In addition, the information management system may include a virtual machine host in communication with one or more of the storage manager, the client computing devices, and the secondary storage computing devices, where the virtual machine host provides access to one or more virtual machines. The storage manager and/or the client computing devices may leverage the virtual machine host to create a virtual machine of a client computing using the corresponding secondary copy of the primary data of the client computing device stored in the secondary storage device.

As the storage manager may be responsible for managing the primary data of the one or more client computing devices, each of the one or more client computing devices may be configured with a monitoring application that monitors changes and/or modifications to the primary data and/or file system data of the client computing device. The monitoring application may be configured to track and/or record changes and/or modifications to the primary data and/or file system data of the client computing device. The tracked changes and/or modifications to the primary data and/or file system data may be input to a trained classifier that determines, or outputs a probability value, that the tracked changes are anomalous and/or correspond to malicious activity.

The trained classifier may be trained using a training data set that indicates which types of file system changes and/or primary data changes likely indicate that the changes correspond to malicious activity or anomalous behavior. After an initial round of training, the trained classifier may be stored on each of the one or more client computing devices, where the trained classifier reports on the activity monitored by the monitoring application to the storage manager. Additionally, and/or alternatively, the trained classifier may be managed and/or stored locally at the storage manager, where each of the monitoring applications provide their tracked changes to the trained classifier, which then determines (or outputs a probability of) whether the tracked changes indicate anomalous and/or malicious activity. The storage manager may further store the tracked changes and/or detected anomalies in a database for later reference and/or retrieval.

The storage manager may further provide a graphical user interface, such as a web-based interface, for reporting on, and/or displaying, the detected anomalies. The graphical user interface may be implemented as a dashboard-type system, where the graphical user interface includes multiple graphical user interfaces or displays that provide information about various aspects of the information management system including, but not limited to, the number of monitored client computing devices, the number of monitored client computing devices that may be affected, the number of backup jobs that have been performed, the types of file system changes and/or modifications that have been detected, the location(s) of the client computing devices that may have been affected by malware and/or malicious software, and other such displays as discussed further below.

Using the graphical user interfaces, an administrator or operator of the information management system may view various aspects of the monitored client computing devices. The administrator or operator may view particular client computing devices and the file system changes and/or modifications that have been detected by the installed monitoring application. The administrator or operator may also view the changes at various granularities and, in particular, may inspect the detected changes and/or modifications at the directory and/or file level. Furthermore, the graphical user interfaces may include graphs or other charts that depict the detected changes and/or modifications to the client computing devices over a predetermined period of time, which may be changeable by the administrator or operator of the information management system.

In addition to being able to view particular client computing devices and the modifications and/or changes to their file system, the administrator and/or operator may revert and/or restore primary data to a particular client computing device using the graphical user interfaces provided by the information management system. The administrator and/or operator may restore the primary data to the particular client computing device from a backup copy or secondary copy stored in a secondary storage device. The administrator and/or operator may restore entire volumes, particular directories, and/or individual files to the client computing device from the secondary copies stored in the secondary storage device.

Further still, in the event that the administrator or operator is concerned with the overall health of a client computing device, the administrator or operator may instantiate a virtual machine copy of the client computing device using the virtual machine host. In this regard, a backup copy of the primary data of the client computing device may be restored to a virtual machine rather than being restored to the client computing device. Furthermore, the virtual machine may be instantiated to be similar and/or nearly identical to the client computing device, such as by having a similar virtual processor, virtual memory, virtual hard drives, and so forth. The virtual machine may also be instantiated such that the virtual machine includes similar credentials as the client computing device, such that the user of the client computing device may access the virtual machine as if the virtual machine were the client computing device. In this way, where a client computing device is suspected of being too corrupted and/or non-recoverable, a virtual machine version of the client computing device may be instantiated using a secondary copy restored from the secondary storage device, which may include one or more recent backups of the primary data of the client computing device.

BRIEF DESCRIPTION OF THE DRAWINGS

FIG. 1B is a detailed view of a primary storage device, a secondary storage device, and some examples of primary data and a secondary copy of the primary data.

FIG. 9 illustrates a graphical user interface displaying specific anomaly detection information for a particular client computing device, according to an example embodiment.

DETAILED DESCRIPTION

Detailed descriptions and examples of systems and methods according to one or more illustrative embodiments may be found in the section titled "Detecting Malware and/or Ransomware in Monitored Data," as well as in the section titled Example Embodiments, and also in FIGS. 3-14C herein. Furthermore, components and functionality for the disclosed recovery manager may be configured and/or incorporated into information management systems such as those described herein in FIGS. 1A-1H and 2A-2C.

Various embodiments described herein are intimately tied to, enabled by, and would not exist except for, computer technology. For example, the transference of backup jobs from the storage manager to the recovery manager described herein, in reference to various embodiments, cannot reasonably be performed by humans alone, without the computer technology upon which they are implemented.

Information Management System Overview

With the increasing importance of protecting and leveraging data, organizations simply cannot risk losing critical data. Moreover, runaway data growth and other modern realities make protecting and managing data increasingly difficult. There is therefore a need for efficient, powerful, and user-friendly solutions for protecting and managing data and for smart and efficient management of data storage. Depending on the size of the organization, there may be many data production sources which are under the purview of tens, hundreds, or even thousands of individuals. In the past, individuals were sometimes responsible for managing and protecting their own data, and a patchwork of hardware and software point solutions may have been used in any given organization. These solutions were often provided by different vendors and had limited or no interoperability. Certain embodiments described herein address these and other shortcomings of prior approaches by implementing scalable, unified, organization-wide information management, including data storage management.

Figure 1A:
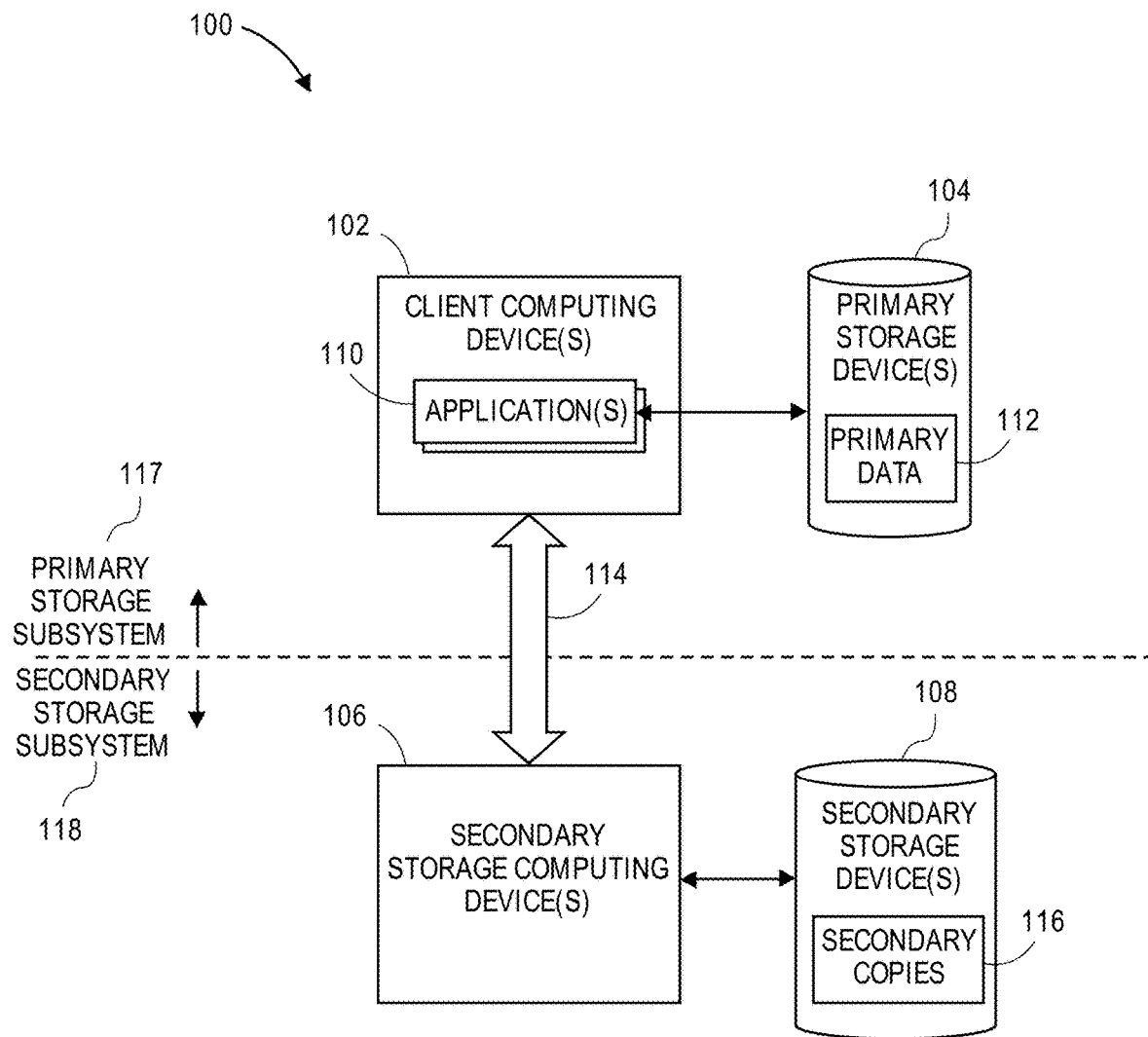
FIG. 1A is a block diagram illustrating an exemplary information management system.

FIG. 1A shows one such information management system 100 (or "system 100"), which generally includes combinations of hardware and software configured to protect and manage data and metadata that are generated and used by computing devices in system 100. System 100 may be referred to in some embodiments as a "storage management system" or a "data storage management system." System 100 performs information management operations, some of which may be referred to as "storage operations" or "data storage operations," to protect and manage the data residing in and/or managed by system 100. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents/publications and patent applications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. Pub. No. 2006/0224846, entitled "System and Method to Support Single Instance Storage Operations" (now abandoned);

U.S. Pat. Pub. No. 2014/0201170, entitled "High Availability Distributed Deduplicated Storage System", now U.S. Pat. No. 9,633,033;

U.S. Pat. Pub. No. 2016/0041880 A1, entitled "Efficient Application Recovery in an Information Management System Based on a Pseudo-Storage-Device Driver", now U.S. Pat. No. 9,852,026;

U.S. patent application Ser. No. 14/721,971, entitled "Replication Using Deduplicated Secondary Copy Data", published as U.S. Pat. Pub. No. 2016/0350391;

U.S. patent application Ser. No. 14/805,615, entitled "Browse and Restore for Block-Level Backups", now U.S. Pat. No. 9,766,825.

U.S. Provisional Patent Application No. 62/265,339 entitled "Live Synchronization and Management of Virtual Machines across Computing and Virtualization Platforms and Using Live Synchronization to Support Disaster Recovery", to which U.S. patent application Ser. No. 15/365,756 claims priority (now U.S. Pat. No. 10,228,962);

U.S. Provisional Patent Application No. 62/273,286 entitled "Redundant and Robust Distributed Deduplication Data Storage System", to which U.S. patent application Ser. No. 15/299,254 (now U.S. Pat. No. 10,310,953), Ser. No. 15/299,281 (published as U.S. Pat Pub. 2017-0192868), Ser. No. 15/299,291 (now U.S. Pat. No. 10,138,729), Ser. No. 15/299,298 (now U.S. Pat. No. 10,592,357), Ser. No. 15/299,299 (published as U.S. Pat. Pub. US 2017-0193003), and Ser. No. 15/299,280 (now U.S. Pat. No. 10,061,663) all claim priority;

U.S. Provisional Patent Application No. 62/294,920, entitled "Data Protection Operations Based on Network Path Information", to which U.S. patent application Ser. No. 15/283,033 claims priority (published as U.S. Pat. Pub. No. 2017/0235647 (now abandoned));

U.S. Provisional Patent Application No. 62/297,057, entitled "Data Restoration Operations Based on Network Path Information", to which U.S. patent application Ser. No. 15/286,403 claims priority (published as U.S. Pat. Pub. No. 2017/0242871); and U.S. Provisional Patent Application No. 62/387,384, entitled "Application-Level Live Synchronization Across Computing Platforms Including Synchronizing Co-Resident Applications To Disparate Standby Destinations And Selectively Synchronizing Some Applications And Not Others", to which U.S. patent application Ser. No. 15/369,676 claims priority (now U.S. Pat. No. 10,387,266).

System 100 includes computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, virtual machine servers, and web servers. Any given computing device comprises one or more processors (e.g., CPU and/or single-core or multi-core processors), as well as corresponding non-transitory computer memory (e.g., random-access memory (RAM)) for storing computer programs which are to be executed by the one or more processors. Other computer memory for mass storage of data may be packaged/configured with the computing device (e.g., an internal hard disk) and/or may be external and accessible by the computing device (e.g., network-attached storage, a storage array, etc.). In some cases, a computing device includes cloud computing resources, which may be implemented as virtual machines. For instance, one or more virtual machines may be provided to the organization by a third-party cloud service vendor.

In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine. A Virtual machine ("VM") is a software implementation of a computer that does not physically exist and is instead instantiated in an operating system of a physical computer (or host machine) to enable applications to execute within the VM's environment, i.e., a VM emulates a physical computer. A VM includes an operating system and associated virtual resources, such as computer memory and processor(s). A hypervisor operates between the VM and the hardware of the physical host machine and is generally responsible for creating and running the VMs. Hypervisors are also known in the art as virtual machine monitors or a virtual machine managers or "VMMs", and may be implemented in software, firmware, and/or specialized hardware installed on the host machine. Examples of hypervisors include ESX Server, by VMware, Inc. of Palo Alto, California; Microsoft Virtual Server and Microsoft Windows Server Hyper-V, both by Microsoft Corporation of Redmond, Washington; Sun xVM by Oracle America Inc. of Santa Clara, California; and Xen by Citrix Systems, Santa Clara, California. The hypervisor provides resources to each virtual operating system such as a virtual processor, virtual memory, a virtual network device, and a virtual disk. Each virtual machine has one or more associated virtual disks. The hypervisor typically stores the data of virtual disks in files on the file system of the physical host machine, called virtual machine disk files ("VMDK" in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries, or other magnetic, non-tape storage devices, optical media storage devices, combinations of the same, etc. In some embodiments, storage devices form part of a distributed file system. In some cases, storage devices are provided in a cloud storage environment (e.g., a private cloud or one operated by a third-party vendor), whether for primary data or secondary copies or both.

Figure 1C:
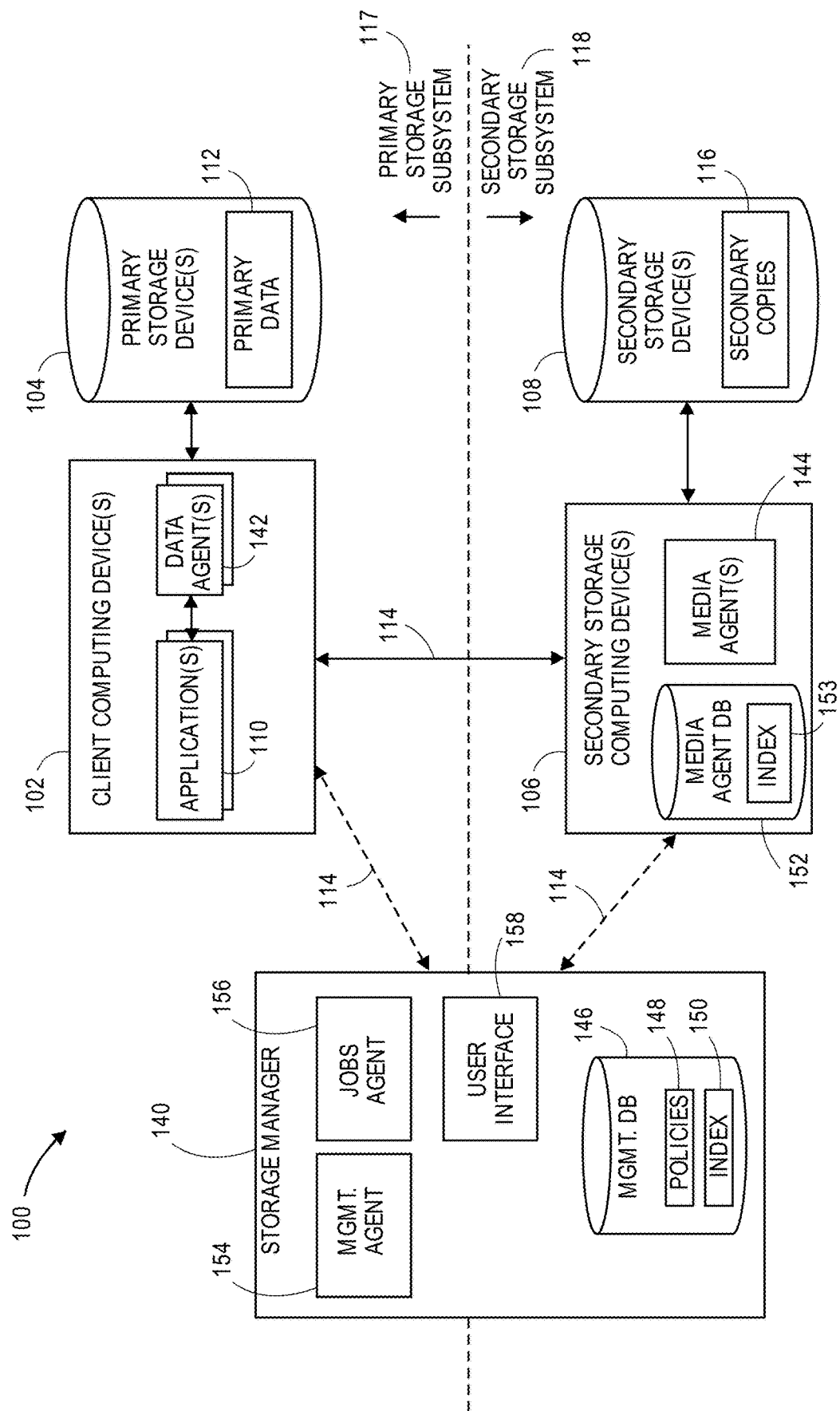
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" or "storage management system" may sometimes refer to one or more of the following components, which will be described in further detail below: storage manager, data agent, and media agent.

One or more client computing devices 102 may be part of system 100, each client computing device 102 having an operating system and at least one application 110 and one or more accompanying data agents executing thereon; and associated with one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, virtual machine servers, and/or web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file system applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142, though not all data agents 142 are application-specific or associated with only application. A file manager application, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general, a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110 and may belong to one given client, portions of the data may be assigned to different subclients for distinct treatment by system 100. More detail on subclients is given in regard to storage policies below.

Primary Data and Exemplary Primary Storage Devices

Primary data 112 is generally production data or "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. Primary data 112 is an initial or first stored body of data generated by the source application 110.

Primary data 112 in some cases is created substantially directly from data generated by the corresponding source application 110. It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and/or to (ii) a subset of such a file (e.g., a data block, an extent, etc.). Primary data 112 may include structured data (e.g., database files), unstructured data (e.g., documents), and/or semi-structured data. See, e.g., FIG. 1B.

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Primary storage devices 104 storing primary data 112 may be relatively fast and/or expensive technology (e.g., flash storage, a disk drive, a hard-disk storage array, solid state memory, etc.), typically to support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Each client computing device 102 is generally associated with and/or in communication with one or more primary storage devices 104 storing corresponding primary data 112. A client computing device 102 is said to be associated with or in communication with a particular primary storage device 104 if it is capable of one or more of: routing and/or storing data (e.g., primary data 112) to the primary storage device 104, coordinating the routing and/or storing of data to the primary storage device 104, retrieving data from the primary storage device 104, coordinating the retrieval of data from the primary storage device 104, and modifying and/or deleting data in the primary storage device 104. Thus, a client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

System 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention and pruning policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), enabling users to browse and restore at a later time and further enabling the lifecycle management of the indexed data. After creation of a secondary copy 116 that represents certain primary data 112, a pointer or other location indicia (e.g., a stub) may be placed in primary data 112, or be otherwise associated with primary data 112, to indicate the current location of a particular secondary copy 116. Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists. For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 are distinguishable from corresponding primary data 112. First, secondary copies 116 can be stored in a different format from primary data 112 (e.g., backup, archive, or other non-native format). For this or other reasons, secondary copies 116 may not be directly usable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, application-aware metadata, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging when hundreds or thousands of client computing devices 102 continually generate large volumes of primary data 112 to be protected. Also, there can be significant overhead involved in the creation of secondary copies 116. Moreover, specialized programmed intelligence and/or hardware capability is generally needed for accessing and interacting with secondary storage devices 108. Client computing devices 102 may interact directly with a secondary storage device 108 to create secondary copies 116, but in view of the factors described above, this approach can negatively impact the ability of client computing device 102 to serve/service application 110 and produce primary data 112. Further, any given client computing device 102 may not be optimized for interaction with certain secondary storage devices 108.

Thus, system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E). These special-purpose components of system 100 comprise specialized programmed intelligence and/or hardware capability for writing to, reading from, instructing, communicating with, or otherwise interacting with secondary storage devices 108.

Secondary storage computing device(s) 106 can comprise any of the computing devices described above, without limitation. In some cases, secondary storage computing device(s) 106 also include specialized hardware componentry and/or software intelligence (e.g., specialized interfaces) for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof generated by a data agent 142) to the designated secondary storage computing device 106, via a communication pathway 114. Secondary storage computing device 106 in turn may further process and convey the data or a processed version thereof to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view of some specific examples of primary data stored on primary storage device(s) 104 and secondary copy data stored on secondary storage device(s) 108, with other components of the system removed for the purposes of illustration. Stored on primary storage device(s) 104 are primary data 112 objects including word processing documents 119A-B, spreadsheets 120, presentation documents 122, video files 124, image files 126, email mailboxes 128 (and corresponding email messages 129A-C), HTML/XML or other types of markup language files 130, databases 132 and corresponding tables or other data structures 133A-133C. Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 134B represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

System 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact how system 100 performs and adapts to data growth and other changing circumstances. FIG. 1C shows a system 100 designed according to these considerations and includes: storage manager 140, one or more data agents 142 executing on client computing device(s) 102 and configured to process primary data 112, and one or more media agents 144 executing on one or more secondary storage computing devices 106 for performing tasks involving secondary storage devices 108.

Storage Manager

Storage manager 140 is a centralized storage and/or information manager that is configured to perform certain control functions and also to store certain critical information about system 100—hence storage manager 140 is said to manage system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application hosted by a suitable computing device. In some embodiments, storage manager 140 is itself a computing device that performs the functions described herein. Storage manager 140 comprises or operates in conjunction with one or more associated data structures such as a dedicated database (e.g., management database 146), depending on the configuration. The storage manager 140 generally initiates, performs, coordinates, and/or controls storage and other information management operations performed by system 100, e.g., to protect and control primary data 112 and secondary copies 116. In general, storage manager 140 is said to manage system 100, which includes communicating with, instructing, and controlling in some circumstances components such as data agents 142 and media agents 144, etc.

As shown by the dashed arrowed lines 114 in FIG. 1C, storage manager 140 may communicate with, instruct, and/or control some or all elements of system 100, such as data agents 142 and media agents 144. In this manner, storage manager 140 manages the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

communicating with data agents 142 and media agents 144, including transmitting instructions, messages, and/or queries, as well as receiving status reports, index information, messages, and/or queries, and responding to same;

initiating execution of information management operations;

initiating restore and recovery operations;

managing secondary storage devices 108 and inventory/capacity of the same;

allocating secondary storage devices 108 for secondary copy operations;

reporting, searching, and/or classification of data in system 100;

monitoring completion of and status reporting related to information management operations and jobs;

tracking movement of data within system 100;

tracking age information relating to secondary copies 116, secondary storage devices 108, comparing the age information against retention guidelines, and initiating data pruning when appropriate;

tracking logical associations between components in system 100;

protecting metadata associated with system 100, e.g., in management database 146;

implementing job management, schedule management, event management, alert management, reporting, job history maintenance, user security management, disaster recovery management, and/or user interfacing for system administrators and/or end users of system 100;

sending, searching, and/or viewing of log files; and implementing operations management functionality.

Storage manager 140 may maintain an associated database 146 (or "storage manager database 146" or "management database 146") of management-related data and information management policies 148. Database 146 is stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; other useful data; and/or any combination thereof. For example, storage manager 140 may use index 150 to track logical associations between media agents 144 and secondary storage devices 108 and/or movement of data to/from secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the storage operation(s)). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies, schedule policies, etc.), status and reporting information about completed jobs (e.g., status and error reports on yesterday's backup jobs), and additional information sufficient to enable restore and disaster recovery operations (e.g., media agent associations, location indexing, content indexing, etc.).

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job is a logical grouping of information management operations such as daily storage operations scheduled for a certain set of subclients (e.g., generating incremental block-level backup copies 116 at a certain time every day for database files in a certain geographical location). Thus, jobs agent 156 may access information management policies 148 (e.g., in management database 146) to determine when, where, and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to storage manager 140 and other components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data usable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within system 100 and/or with other information management cells via network protocols and application programming interfaces (APIs) including, e.g., HTTP, HTTPS, FTP, REST, virtualization software APIs, cloud service provider APIs, and hosted service provider APIs, without limitation. Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communications and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell or a storage operation cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 to participate in creating or restoring secondary copies 116. Data agent 142 may be a software program (e.g., in the form of a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s) 110. For instance, data agent 142 may take part in copying, archiving, migrating, and/or replicating of certain primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt certain primary data 112, as well as capture application-related metadata before transmitting the processed data to media agent 144. Data agent 142 also may receive instructions from storage manager 140 to restore (or assist in restoring) a secondary copy 116 from secondary storage device 108 to primary storage 104, such that the restored data may be properly accessed by application 110 in a suitable format as though it were primary data 112.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, Share Point data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: (1) a Microsoft Exchange Mailbox data agent 142 to back up the Exchange mailboxes; (2) a Microsoft Exchange Database data agent 142 to back up the Exchange databases; (3) a Microsoft Exchange Public Folder data agent 142 to back up the Exchange Public Folders; and (4) a Microsoft Windows File System data agent 142 to back up the file system of client computing device 102. In this example, these specialized data agents 142 are treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design, operation, and performance of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata. In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster and more reliable information management operations, and enhanced scalability. In one example which will be discussed further below, media agent 144 can act as a local cache of recently-copied data and/or metadata stored to secondary storage device(s) 108, thus improving restore capabilities and performance for the cached data.

Media agent 144 is a component of system 100 and is generally directed by storage manager 140 in creating and restoring secondary copies 116. Whereas storage manager 140 generally manages system 100 as a whole, media agent 144 provides a portal to certain secondary storage devices 108, such as by having specialized features for communicating with and accessing certain associated secondary storage device 108. Media agent 144 may be a software program (e.g., in the form of a set of executable binary files) that executes on a secondary storage computing device 106. Media agent 144 generally manages, coordinates, and facilitates the transmission of data between a data agent 142 (executing on client computing device 102) and secondary storage device(s) 108 associated with media agent 144. For instance, other components in the system may interact with media agent 144 to gain access to data stored on associated secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116. Each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fibre Channel link.

Each media agent 144 may maintain an associated media agent database 152. Media agent database 152 may be stored to a disk or other storage device (not shown) that is local to the secondary storage computing device 106 on which media agent 144 executes. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108. Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
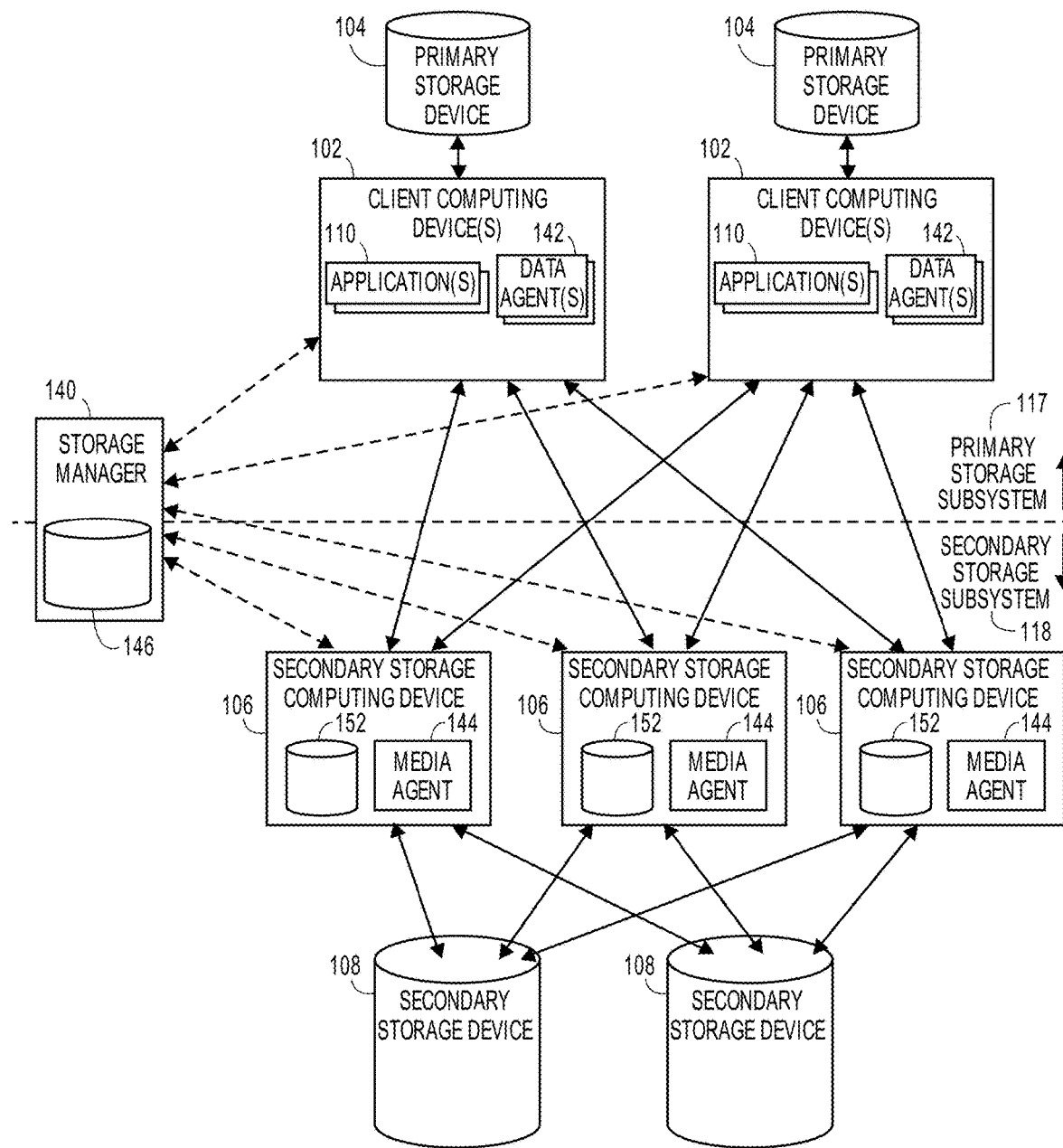
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations, Including Storage Operations In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally storage operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity, because they involve secondary copies. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a format native to the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage. Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy afterwards.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating and retrieving constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation occurs where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from snapshot processing. An array may receive a request from another component to take a snapshot and then proceed to execute the "hardware snapshot" operations autonomously, preferably reporting success to the requesting component.

A "software snapshot" (or "software-based snapshot") operation, on the other hand, occurs where a component in system 100 (e.g., client computing device 102, etc.) implements a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product is Microsoft Volume Snapshot Service (VSS), which is part of the Microsoft Windows operating system.

Some types of snapshots do not actually create another physical copy of all the data as it existed at the particular point in time, but may simply create pointers that map files and directories to specific memory locations (e.g., to specific disk blocks) where the data resides as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782. A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Replication is another type of secondary copy operation. Some types of secondary copies 116 periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments, secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, back up, or otherwise manipulate the replication copies as if they were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new/changed portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, system 100 may calculate and/or store signatures (e.g., hashes or cryptographically unique IDs) corresponding to the individual source data portions and compare the signatures to already-stored data signatures, instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, yet still significantly reduce stored-data redundancy. Depending on the embodiment, deduplication portions such as data blocks can be of fixed or variable length. Using variable length blocks can enhance deduplication by responding to changes in the data stream, but can involve more complex processing. In some cases, system 100 utilizes a technique for dynamically aligning deduplication blocks based on changing content in the data stream, as described in U.S. Pat. No. 8,364,652.

System 100 can deduplicate in a variety of manners at a variety of locations. For instance, in some embodiments, system 100 implements "target-side" deduplication by deduplicating data at the media agent 144 after being received from data agent 142. In some such cases, media agents 144 are generally configured to manage the deduplication process. For instance, one or more of the media agents 144 maintain a corresponding deduplication database that stores deduplication information (e.g., data block signatures). Examples of such a configuration are provided in U.S. Pat. No. 9,020,900. Instead of or in combination with "target-side" deduplication, "source-side" (or "client-side") deduplication can also be performed, e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and in U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that exceeds a given size threshold or a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

For example, files are generally moved between higher and lower cost storage depending on how often the files are accessed. When a user requests access to HSM data that has been removed or migrated, system 100 uses the stub to locate the data and can make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may include metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "online archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

System 100 may also make and retain disaster recovery copies, often as secondary, high-availability disk copies. System 100 may create secondary copies and store them at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116, or conversely in the course of restoring data from secondary to primary.

Encryption Operations

System 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging data under management to enhance search and other features.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

System 100 generally organizes and catalogues the results into a content index, which may be stored within media agent database 152, for example. The content index can also include the storage locations of or pointer references to indexed data in primary data 112 and/or secondary copies 116. Results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, metabase(s) may be associated with individual components, e.g., client computing devices 102 and/or media agents 144. In some embodiments, a data classification database may reside as one or more data structures within management database 146, may be otherwise associated with storage manager 140, and/or may reside as a separate component. In some cases, metabase(s) may be included in separate database(s) and/or on separate storage device(s) from primary data 112 and/or secondary copies 116, such that operations related to the metabase(s) do not significantly impact performance on other components of system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which system 100 can search through and identify data as compared to other approaches that involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of system 100 to provide useful system-wide management and reporting. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or another component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free up space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to graphically depict the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

System 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of associated operations, such as backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

Another type of information management policy 148 is an "audit policy" (or "security policy"), which comprises preferences, rules and/or criteria that protect sensitive data in system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 are described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

schedules or other timing information, e.g., specifying when and/or how often to perform information management operations;

the type of secondary copy 116 and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Copy Operations

Figure 1E:
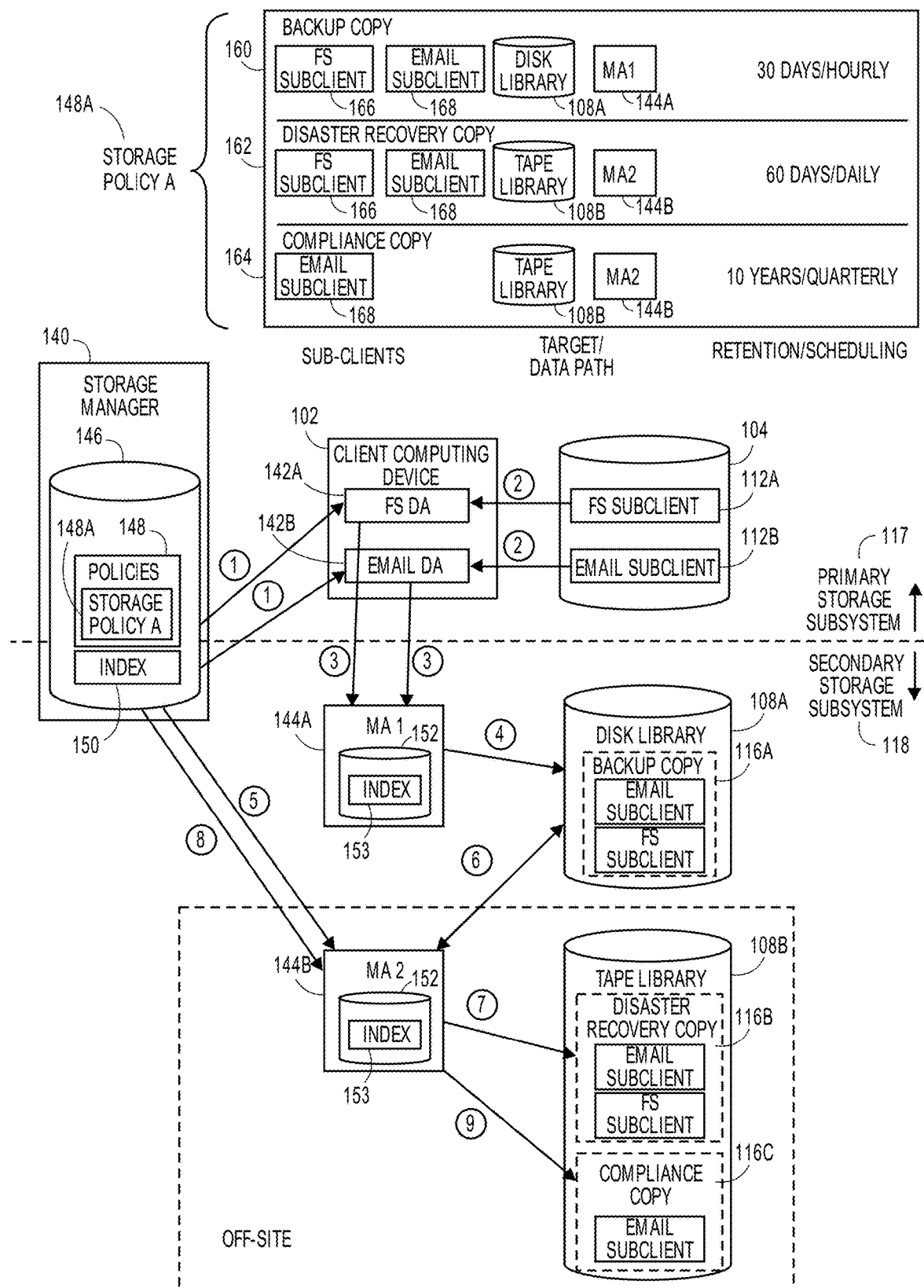
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences or rule set 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that the copies it governs will be generated quarterly and retained for 10 years.

Secondary Copy Jobs

A logical grouping of secondary copy operations governed by a rule set and being initiated at a point in time may be referred to as a "secondary copy job" (and sometimes may be called a "backup job," even though it is not necessarily limited to creating only backup copies). Secondary copy jobs may be initiated on demand as well. Steps 1-9 below illustrate three secondary copy jobs based on storage policy 148A.

Referring to FIG. 1E, at step 1, storage manager 140 initiates a backup job according to the backup copy rule set 160, which logically comprises all the secondary copy operations necessary to effectuate rules 160 in storage policy 148A every hour, including steps 1-4 occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B on client computing device 102 respond to instructions from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 communicates the processed file system data (e.g., using file system data agent 142A) and the processed email data (e.g., using email data agent 142B) to the first media agent 144A according to backup copy rule set 160, as directed by storage manager 140. Storage manager 140 may further keep a record in management database 146 of the association between media agent 144A and one or more of: client computing device 102, file system subclient 112A, file system data agent 142A, email subclient 112B, email data agent 142B, and/or backup copy 116A.

The target media agent 144A receives the data-agent-processed data from client computing device 102, and at step 4 generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, where the email copy resides, where the file system copy resides, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job for a disaster recovery copy according to the disaster recovery rule set 162. Illustratively this includes steps 5-7 occurring daily for creating disaster recovery copy 116B. Illustratively, and by way of illustrating the scalable aspects and off-loading principles embedded in system 100, disaster recovery copy 116B is based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 116B may be further compressed or encrypted, or may be generated in some other manner, such as by using primary data 112A and 112B from primary storage device 104 as sources. The disaster recovery copy operation is initiated once a day and disaster recovery copies 116B are deleted after 60 days; indexes 153 and/or 150 are updated accordingly when/after each information management operation is executed and/or completed. The present backup job may be considered completed.

At step 8, storage manager 140 initiates another backup job according to compliance rule set 164, which performs steps 8-9 quarterly to create compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. This is efficient, because disaster recovery copy resides on the same secondary storage device and thus no network resources are required to move the data. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Again referring to FIG. 1E, storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, and 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. Metadata stored within or associated with the secondary copy 116 may be used during the restore operation. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 on the target client computing device 102 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases a backup copy 116A that was recently created or accessed, may be cached to speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpack (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage, etc. In some cases, the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. Headers can include a variety of information such as file and/or volume identifier(s), offset(s), and/or other information associated with the payload data items, a chunk sequence number, etc. Importantly, in addition to being stored with secondary copy 116 on secondary storage device 108, chunk headers can also be stored to index 153 of the associated media agent(s) 144 and/or to index 150 associated with storage manager 140. This can be useful for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923, 8,156,086, and 8,578,120.

Figure 1F:
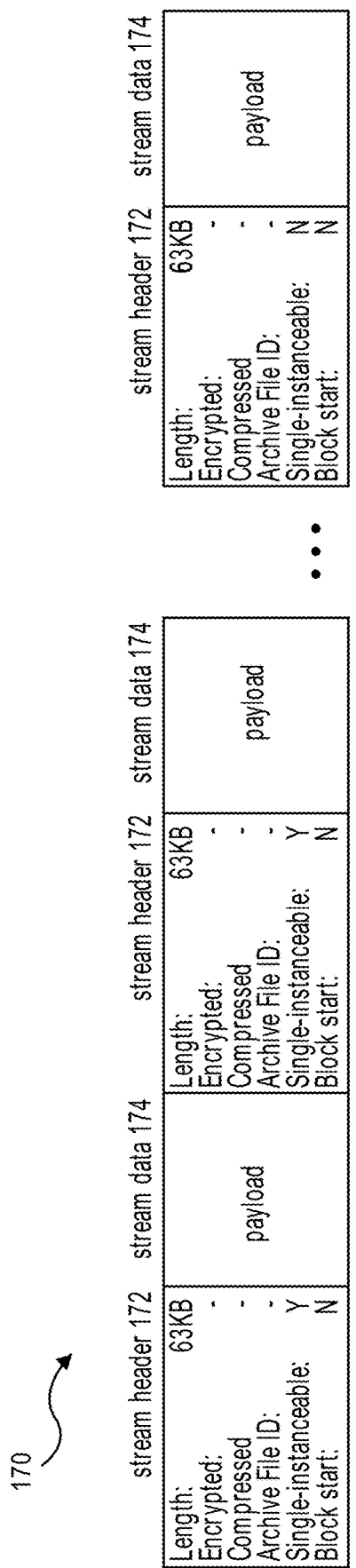
FIGS. 1F-1H are block diagrams illustrating suitable data structures that may be employed by the information management system.
Figure 1G:
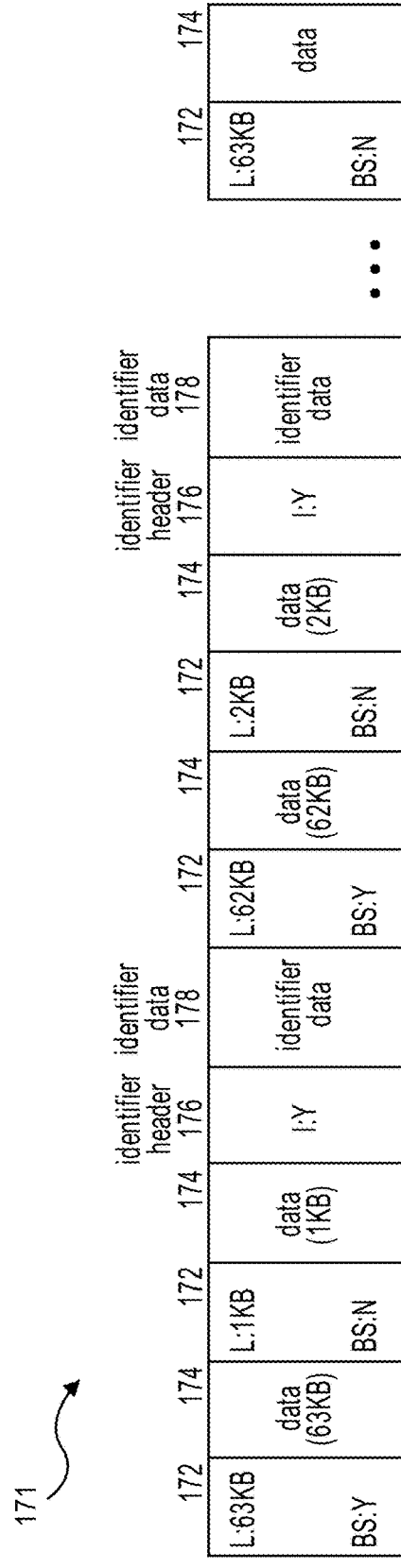

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
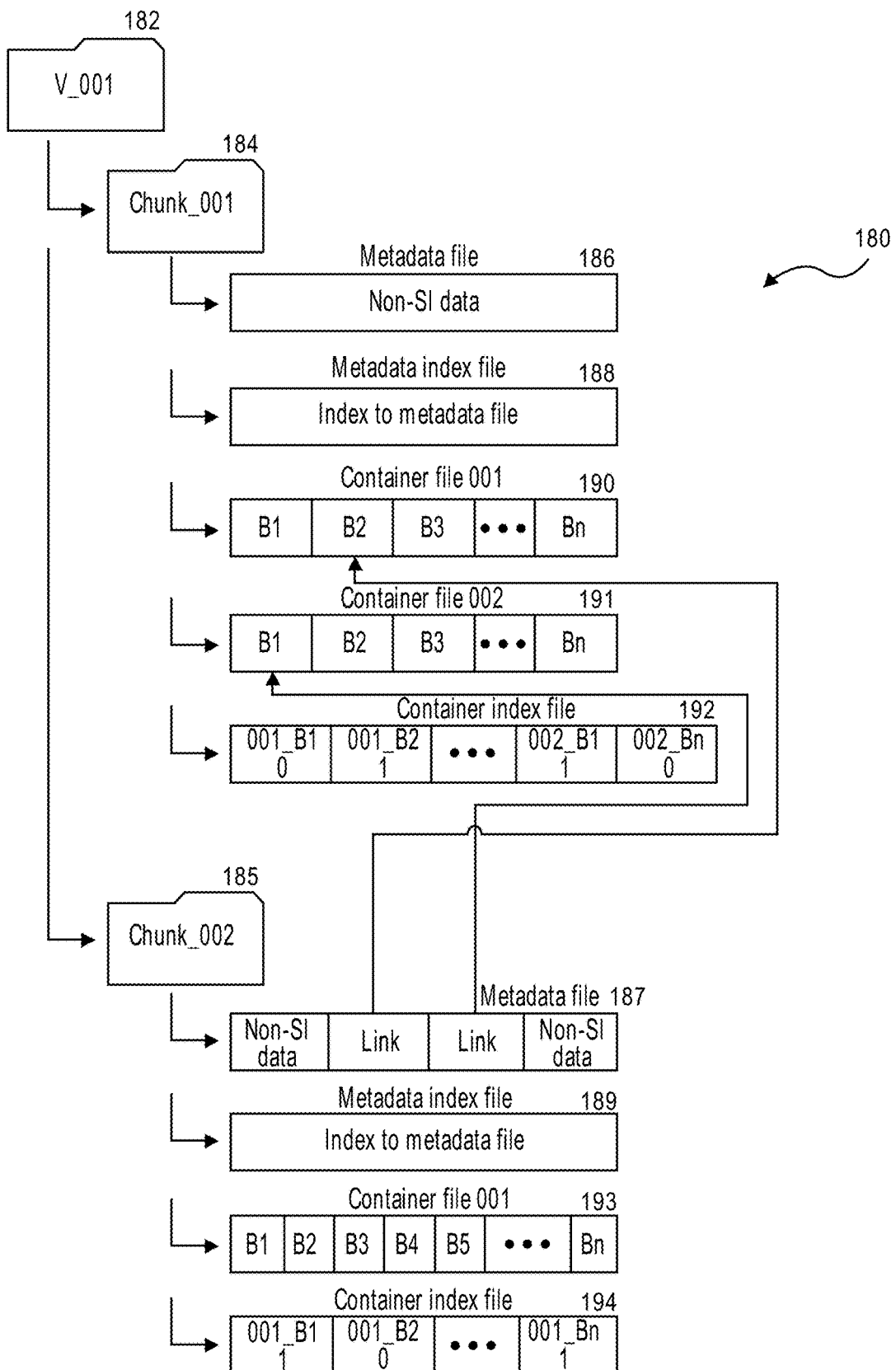

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approx. 100 to approx. 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to off-load resource intensive information management tasks (e.g., data replication tasks) away from production devices (e.g., physical or virtual client computing devices) in order to maximize production efficiency. At the same time, enterprises expect access to readily-available up-to-date recovery copies in the event of failure, with little or no production downtime.

Figure 2A:
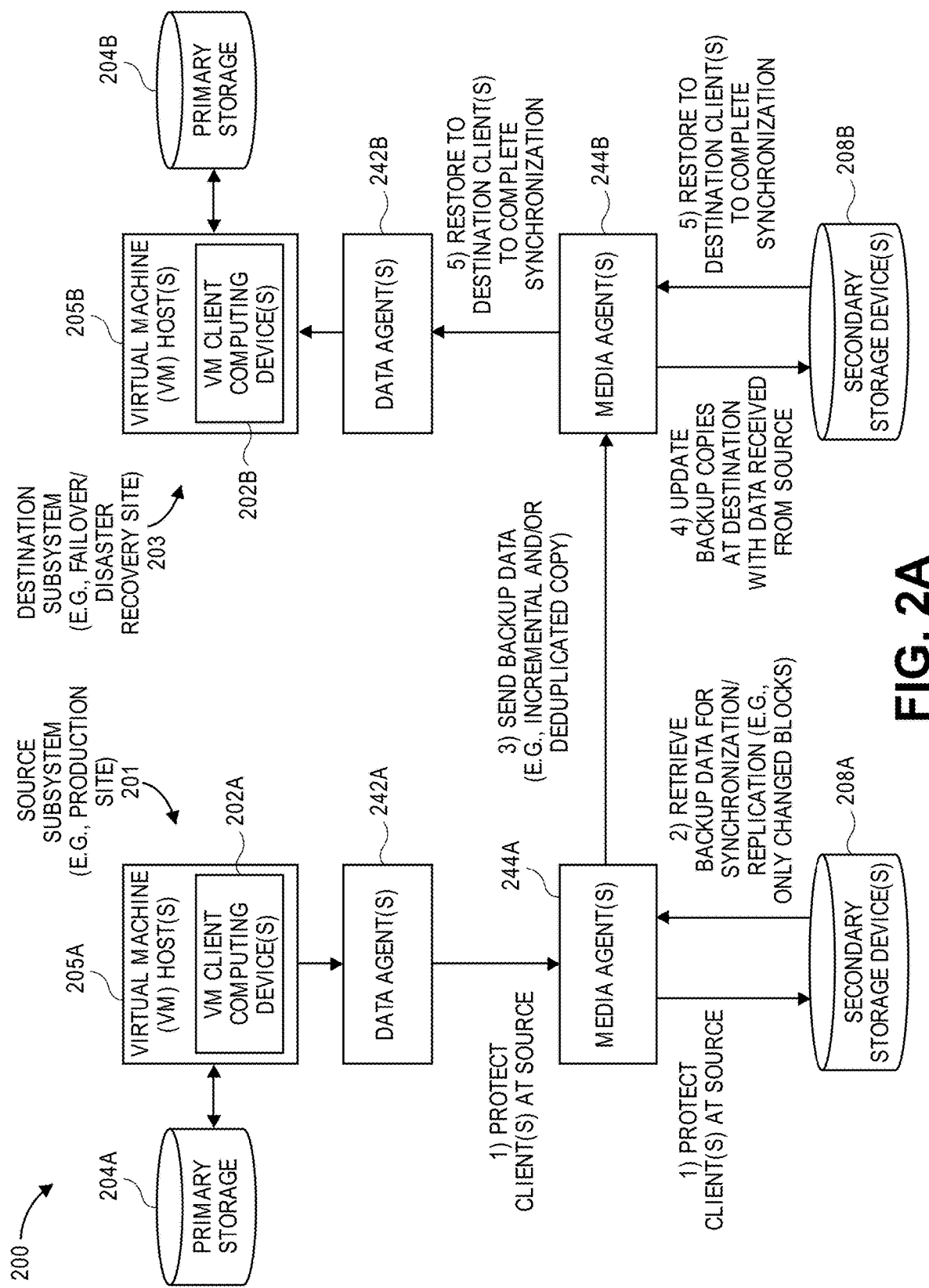
FIG. 2A illustrates a system and technique for synchronizing primary data to a destination such as a failover site using a secondary copy.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a, though the source need not be virtualized. The destination site 203 may be at a location that is remote from the production site 201, or may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1, the source data agent(s) 242a and source media agent(s) 244a work together to write backup or other secondary copies of the primary data generated by the source client computing devices 202a into the source secondary storage device(s) 208a. At step 2, the backup/secondary copies are retrieved by the source media agent(s) 244a from secondary storage. At step 3, source media agent(s) 244a communicate the backup/secondary copies across a network to the destination media agent(s) 244b in destination subsystem 203.

As shown, the data can be copied from source to destination in an incremental fashion, such that only changed blocks are transmitted, and in some cases multiple incremental backups are consolidated at the source so that only the most current changed blocks are transmitted to and applied at the destination. An example of live synchronization of virtual machines using the "incremental forever" approach is found in U.S. Patent Application No. 62/265,339 entitled "Live Synchronization and Management of Virtual Machines across Computing and Virtualization Platforms and Using Live Synchronization to Support Disaster Recovery." Moreover, a deduplicated copy can be employed to further reduce network traffic from source to destination. For instance, the system can utilize the deduplicated copy techniques described in U.S. Pat. No. 9,239,687, entitled "Systems and Methods for Retaining and Using Data Block Signatures in Data Protection Operations."

At step 4, destination media agent(s) 244b write the received backup/secondary copy data to the destination secondary storage device(s) 208b. At step 5, the synchronization is completed when the destination media agent(s) and destination data agent(s) 242b restore the backup/secondary copy data to the destination client computing device(s) 202b. The destination client computing device(s) 202b may be kept "warm" awaiting activation in case failure is detected at the source. This synchronization/replication process can incorporate the techniques described in U.S. patent application Ser. No. 14/721,971, entitled "Replication Using Deduplicated Secondary Copy Data."

Where the incremental backups are applied on a frequent, on-going basis, the synchronized copies can be viewed as mirror or replication copies. Moreover, by applying the incremental backups to the destination site 203 using backup or other secondary copy data, the production site 201 is not burdened with the synchronization operations. Because the destination site 203 can be maintained in a synchronized "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can later be reverse synchronized back to the production site 201, such as after repairs have been implemented or after the failure has passed.

Integrating with the Cloud Using File System Protocols

Figure 2B:
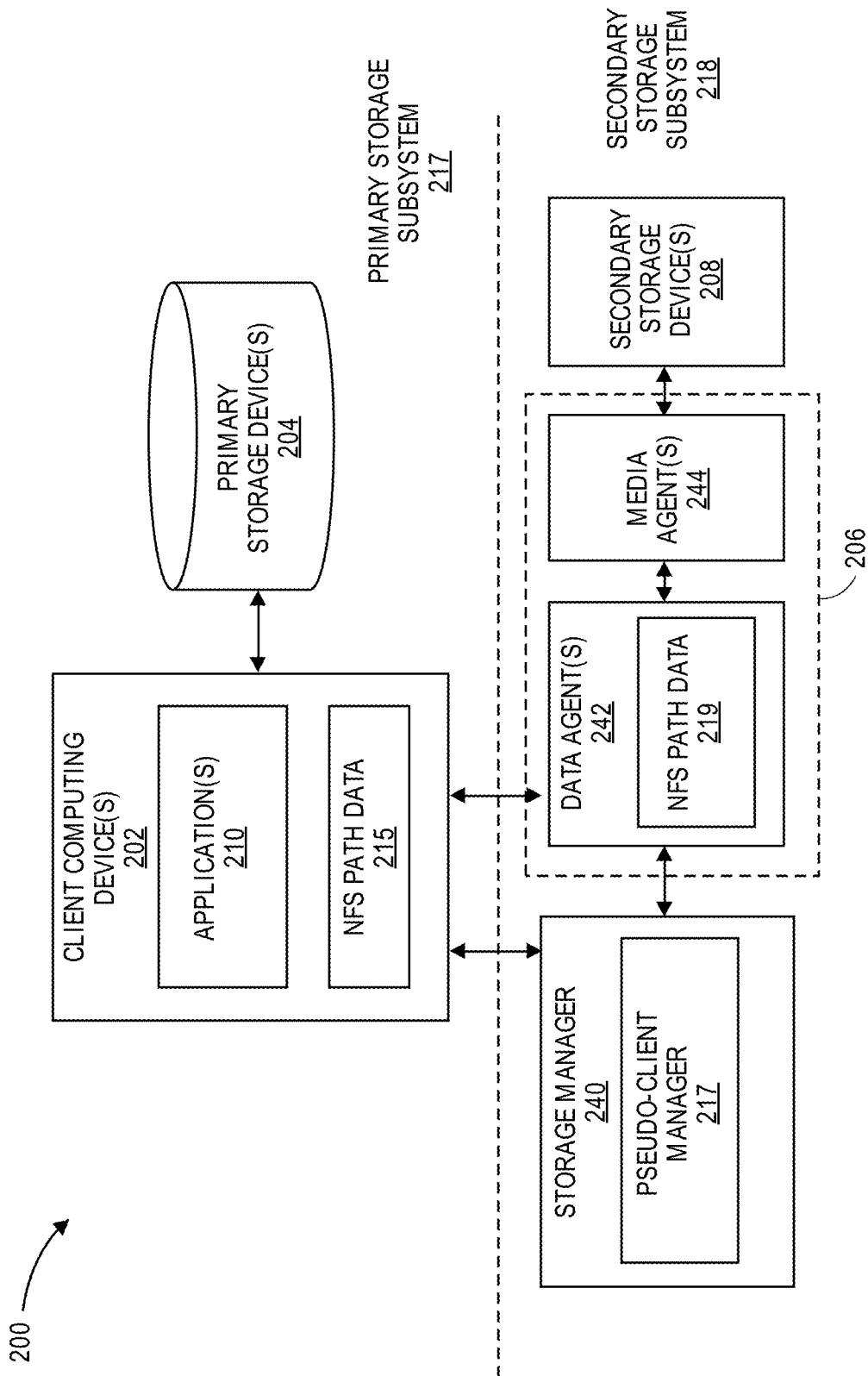
FIG. 2B illustrates an information management system architecture incorporating use of a network file system (NFS) protocol for communicating between the primary and secondary storage subsystems.

Given the ubiquity of cloud computing, it can be increasingly useful to provide data protection and other information management services in a scalable, transparent, and highly plug-able fashion. FIG. 2B illustrates an information management system 200 having an architecture that provides such advantages, and incorporates use of a standard file system protocol between primary and secondary storage subsystems 217, 218. As shown, the use of the network file system (NFS) protocol (or any another appropriate file system protocol such as that of the Common Internet File System (CIFS)) allows data agent 242 to be moved from the primary storage subsystem 217 to the secondary storage subsystem 218. For instance, as indicated by the dashed box 206 around data agent 242 and media agent 244, data agent 242 can co-reside with media agent 244 on the same server (e.g., a secondary storage computing device such as component 106), or in some other location in secondary storage subsystem 218.

Where NFS is used, for example, secondary storage subsystem 218 allocates an NFS network path to the client computing device 202 or to one or more target applications 210 running on client computing device 202. During a backup or other secondary copy operation, the client computing device 202 mounts the designated NFS path and writes data to that NFS path. The NFS path may be obtained from NFS path data 215 stored locally at the client computing device 202, and which may be a copy of or otherwise derived from NFS path data 219 stored in the secondary storage subsystem 218.

Write requests issued by client computing device(s) 202 are received by data agent 242 in secondary storage subsystem 218, which translates the requests and works in conjunction with media agent 244 to process and write data to a secondary storage device(s) 208, thereby creating a backup or other secondary copy. Storage manager 240 can include a pseudo-client manager 217, which coordinates the process by, among other things, communicating information relating to client computing device 202 and application 210 (e.g., application type, client computing device identifier, etc.) to data agent 242, obtaining appropriate NFS path data from the data agent 242 (e.g., NFS path information), and delivering such data to client computing device 202.

Conversely, during a restore or recovery operation client computing device 202 reads from the designated NFS network path, and the read request is translated by data agent 242. The data agent 242 then works with media agent 244 to retrieve, re-process (e.g., re-hydrate, decompress, decrypt), and forward the requested data to client computing device 202 using NFS.

By moving specialized software associated with system 200 such as data agent 242 off the client computing devices 202, the illustrative architecture effectively decouples the client computing devices 202 from the installed components of system 200, improving both scalability and plug-ability of system 200. Indeed, the secondary storage subsystem 218 in such environments can be treated simply as a read/write NFS target for primary storage subsystem 217, without the need for information management software to be installed on client computing devices 202. As one example, an enterprise implementing a cloud production computing environment can add VM client computing devices 202 without installing and configuring specialized information management software on these VMs. Rather, backups and restores are achieved transparently, where the new VMs simply write to and read from the designated NFS path. An example of integrating with the cloud using file system protocols or so-called "infinite backup" using NFS share is found in U.S. Patent Application No. 62/294,920, entitled "Data Protection Operations Based on Network Path Information." Examples of improved data restoration scenarios based on network-path information, including using stored backups effectively as primary data sources, may be found in U.S. Patent Application No. 62/297,057, entitled "Data Restoration Operations Based on Network Path Information."

Highly Scalable Managed Data Pool Architecture

Figure 2C:
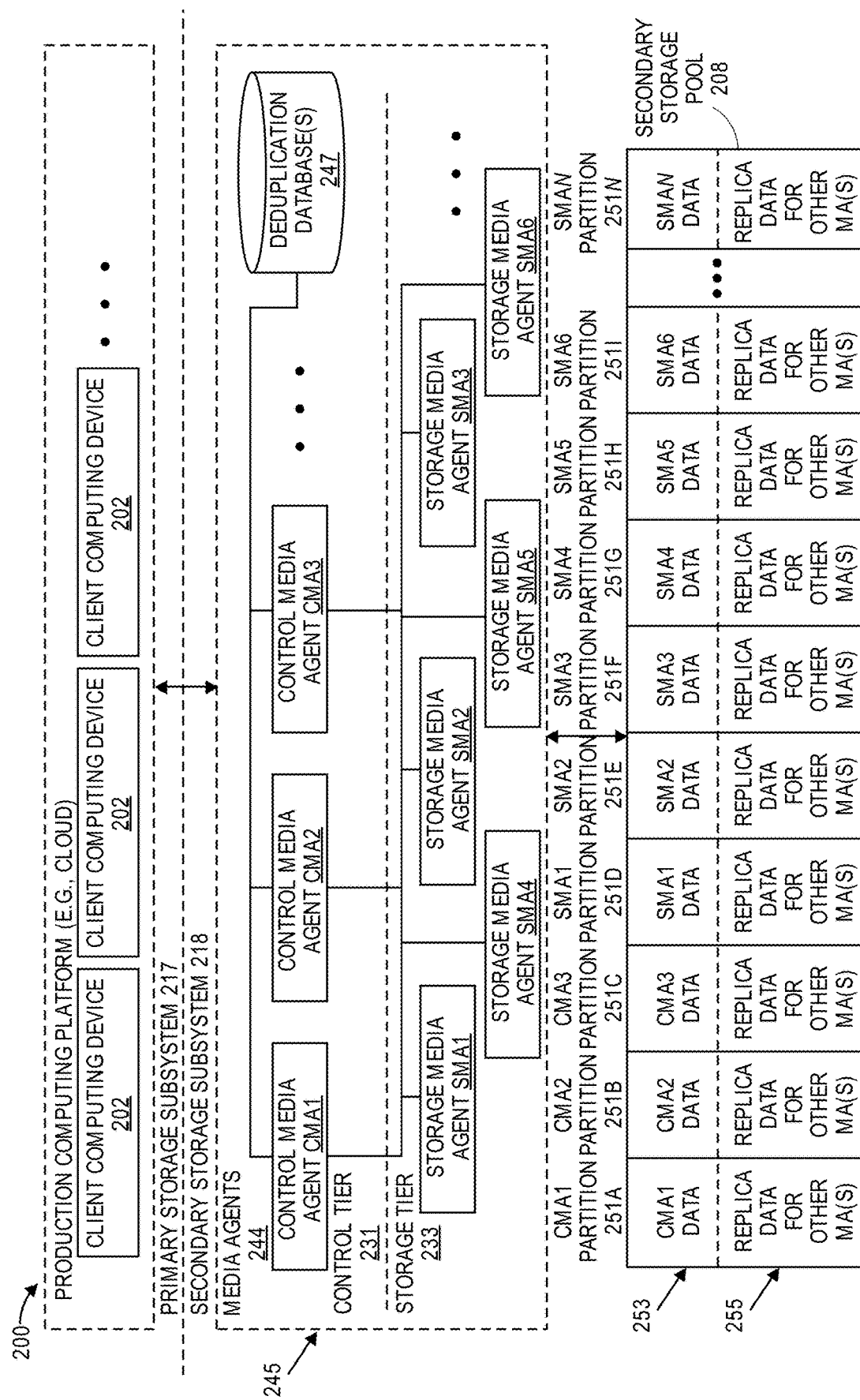
FIG. 2C is a block diagram of an example of a highly scalable managed data pool architecture.

Enterprises are seeing explosive data growth in recent years, often from various applications running in geographically distributed locations. FIG. 2C shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from secondary storage pool 208 and write deduplicated files to secondary storage pool 208. For instance, system 200 can incorporate any of the deduplication systems and methods shown and described in U.S. Pat. No. 9,020,900, entitled "Distributed Deduplicated Storage System," and U.S. Pat. Pub. No. 2014/0201170, entitled "High Availability Distributed Deduplicated Storage System."

Media agents SMA1-SMA6 assigned to the secondary tier 233 receive write and read requests from media agents CMA1-CMA3 in control tier 231, and access secondary storage pool 208 to service those requests. Media agents CMA1-CMA3 in control tier 231 can also communicate with secondary storage pool 208, and may execute read and write requests themselves (e.g., in response to requests from other control media agents CMA1-CMA3) in addition to issuing requests to media agents in secondary tier 233. Moreover, while shown as separate from the secondary storage pool 208, deduplication database(s) 247 can in some cases reside in storage devices in secondary storage pool 208.

As shown, each of the media agents 244 (e.g., CMA1-CMA3, SMA1-SMA6, etc.) in grid 245 can be allocated a corresponding dedicated partition 251A-251I, respectively, in secondary storage pool 208. Each partition 251 can include a first portion 253 containing data associated with (e.g., stored by) media agent 244 corresponding to the respective partition 251. System 200 can also implement a desired level of replication, thereby providing redundancy in the event of a failure of a media agent 244 in grid 245. Along these lines, each partition 251 can further include a second portion 255 storing one or more replication copies of the data associated with one or more other media agents 244 in the grid.

System 200 can also be configured to allow for seamless addition of media agents 244 to grid 245 via automatic configuration. As one illustrative example, a storage manager (not shown) or other appropriate component may determine that it is appropriate to add an additional node to control tier 231, and perform some or all of the following: (i) assess the capabilities of a newly added or otherwise available computing device as satisfying a minimum criteria to be configured as or hosting a media agent in control tier 231; (ii) confirm that a sufficient amount of the appropriate type of storage exists to support an additional node in control tier 231 (e.g., enough disk drive capacity exists in storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of deduplication database 247). An example of highly scalable managed data pool architecture or so-called web-scale architecture for storage and data management is found in U.S. Patent Application No. 62/273,286 entitled "Redundant and Robust Distributed Deduplication Data Storage System."

The embodiments and components thereof disclosed in FIGS. 2A, 2B, and 2C, as well as those in FIGS. 1A-1H, may be implemented in any combination and permutation to satisfy data storage management and information management needs at one or more locations and/or data centers.

Detecting Malware and/or Ransomware in Monitored Data

An information management system may include multiple client computing devices, a storage manager, secondary storage computing devices, secondary storage devices, one or more virtual machine host, and other such devices and/or components. The client computing devices may be configured to back up primary data and/or file system data to the secondary storage devices, where the secondary storage computing devices are responsible for managing the secondary copies generated by the client computing devices. A storage manager in communication with the client computing devices and the secondary storage computing device may transfer a machine-learning classifier and/or an anomaly detection model to the client computing devices and/or the secondary storage computing device, where the classifier determines whether file system activities occurring on the client computing devices are anomalous and can indicate whether a client computing device has likely been compromised by malware and/or ransomware.

Figure 3:
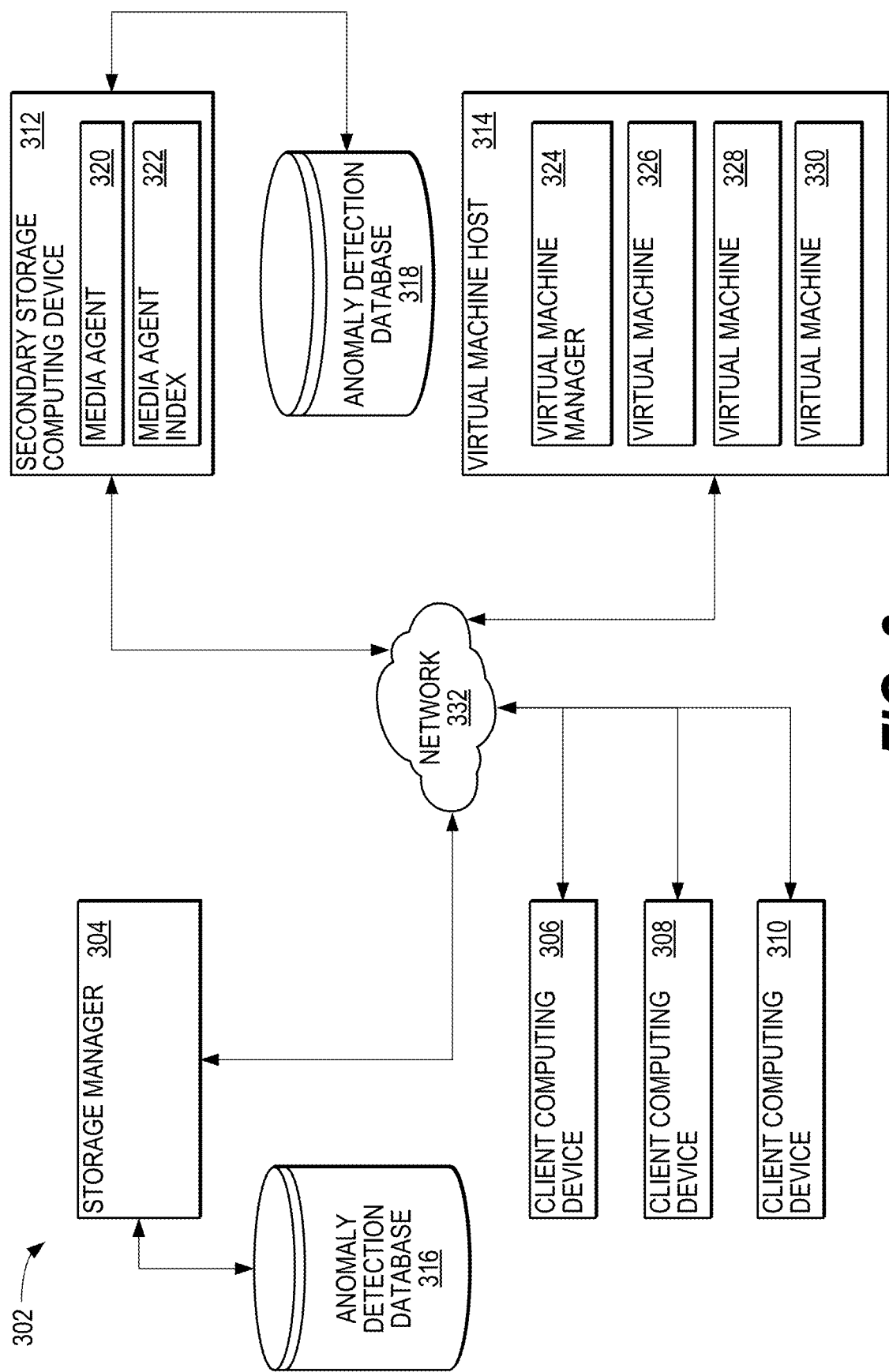
FIG. 3 illustrates a block diagram of an information management system that supports detecting ransomware in one or more client computing devices, in accordance with an example embodiment.

FIG. 3 illustrates a block diagram of an information management system 302 that supports detecting ransomware in one or more client computing devices 306-310, in accordance with an example embodiment. The information management system 302 may include one or more networks 332, where the one or more networks 332 interconnect the various devices and components illustrated in FIG. 3. In one embodiment, the information management system 302 includes a storage manager 304, one or more client computing devices 306-310, a secondary storage computing device 312, and a virtual machine host 314.

In one embodiment, the storage manager 304 is implemented similarly to the storage manager 140 illustrated in FIG. 1C, and additionally comprises new features for ransomware detection and for operating in system 302. Accordingly, the storage manager 304 may include one or more components illustrated in FIG. 1C, such as a management database that stores one or more information policies and/or a management index, a management agent, a jobs agent, or any other components discussed with reference to the storage manager 140. The storage manager 304 may be in communication with, and/or include, an anomaly detection database 316, where the anomaly detection database 316 is configured to store anomaly detection information corresponding to one or more of the client computing devices 306-310. The anomaly detection database 316 may be populated with the anomaly detection information via the storage manager 304 being in communication with one or more monitoring applications that provide the anomaly detection information to the storage manager 304 for storing in the anomaly detection database 316. Additionally, and/or alternatively, the storage manager 304 may allow access to the anomaly detection database 316 to other components and/or devices in the information management system 302, such as by allowing one or more of the monitoring applications write and/or read access to the anomaly detection database 316.

The anomaly detection database 316 may be implemented as one or more databases, and further still, as one or more different types of databases. For example, the anomaly detection database 316 may be implemented as a hierarchical database, a relational database, a NoSQL database an object-oriented database, one or more flat files, any other type of database now known or later developed, or combinations thereof. The anomaly detection information may include information about anomalies detected in the one or more client computing devices 306-310, such as anomalies detected in the file system data of the one or more client computing devices 306-310 and/or anomalies detected in the primary data managed by the storage manager 304. The anomaly detection information may include, but is not limited to, the number of detected changes in a monitored file system, the number of deletions in a monitored file system, which client computing devices had detected changes, specific directories and/or files that were modified in a monitored client computing device, the date and/or time on which a detected change occurred, the geographic location of a monitored client computing device that experienced an anomaly, and other such anomaly detection information. The storage manager 304 may make the anomaly detection information available for review via a graphical user interface (e.g., a web-based interface, a standalone application, etc.) to one or more of the client computing devices 306-310 and/or to other users, without limitation.

In addition to the storage manager 304 and its accompanying databases (e.g., the anomaly detection database 316), the information management system 302 may also include one or more client computing devices 306-310. The one or more client computing devices 306-310 may be implemented similarly to the client computing device 102 illustrated in FIG. 1A. As discussed with reference to FIG. 4, the one or more client computing devices 306-310 may include components similar to the components found in the client computing device 102, such as one or more processors, one or more communication interfaces, one or more computer-readable mediums, an operating system, one or more applications, and so forth. In addition, the one or more client computing devices 306-310 may include one or more components that facilitate the detection of anomalies in the file system data and/or primary data of the one or more client computing devices 306-310, such as a monitoring application, a classifier, an anomaly detection model, and other such components.

The one or more client computing devices 306-310 may be in communication with the other devices of the information management system 302, such as the storage manager 304, the secondary storage computing device 312, and/or the virtual machine host 314. The one or more client computing devices 306-310 may communicate with the other devices in the information management system 302, including each other client computing device, via a network 332. The network 332 may include one or more networks including, but not limited to, an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi network, a WiMAX network, another type of network, or a combination of two or more such networks.

The secondary storage computing device 312 is configured to create secondary copies of primary data of the one or more client computing devices 306-310, and to store the secondary copies in a secondary storage device (e.g., secondary storage device 108). The secondary storage computing device 312 may be implemented similarly to the secondary storage computing devices 106 illustrated in FIG. 1A and include similar components. For example, the secondary storage computing device 312 may also be in communication with and/or manage a secondary storage device (not shown), where secondary copies of the primary data of the one or more computing devices 306-310 are stored. In addition, the secondary storage computing device 312 may include a media agent 320 and a media agent index 322, which may be implemented similarly to the media agent 144 and the media agent index 153, respectively, illustrated in FIG. 1C. Furthermore, the secondary storage computing device 312 may be configured with additional components and/or applications that facilitate the monitoring of changes in the primary data of the client computing devices 306-310 and/or the detection of one or more anomalies in the primary data of the client computing devices 306-310.

As discussed with reference to FIG. 4, and in one implementation, the monitoring of modifications and/or changes of the client computing device 306-310 may occur in real-time or in near real-time. However, in some implementations, the secondary storage computing device 312 may be configured to monitor for changes between backups of the primary data of the client computing device 306-310. For example, one or more operating systems may prohibit or prevent the real-time or near real-time of monitoring of the primary data of a client computing device. Accordingly, the secondary storage computing device 312 may be configured to monitor changes between backups of the one or more client computing devices 306-310. The changes between the backups of the one or more client computing devices 306-310 may be recorded in an anomaly detection database 318 that is associated with the secondary storage computing device 312. For example, where the secondary storage computing device 312 detects and/or determines that an anomaly is present in a backup of a client computing device, anomaly detection information corresponding to the backup may be stored in the anomaly detection database 318. The anomaly detection database 318 may be implemented similarly to the anomaly detection database 316, and may store similar information. The secondary storage computing device 312 may use the anomaly detection database 318 to store anomaly detection information, and then report the anomaly detection information to the storage manager 304, which may then store the reported anomaly detection information in its own anomaly detection database 316. Thus, the secondary storage computing device 312 may be implemented as a mechanism for determining whether an anomaly is present in the backups of the one or more client computing devices 306-310 where real-time or near real-time monitoring of the one or more client computing devices 306-310 is not possible or is undesirable. However, in some instances, monitoring may be performed both on a real-time or near real-time basis as well as the monitoring being performed on the backups of the one or more client computing devices 306-310.

The information management system 302 may also include a virtual machine host 314 in communication with the other devices and/or components of the information management system 302 via the network 332. In one embodiment, the virtual machine host 314 is configured to host one or more virtual machines 326-330 that are managed by a virtual machine manager 324. The virtual machine host 314 may provide the physical hardware infrastructure used by the virtual machines 326-330. One example of a virtual machine manager 324 (e.g., a hypervisor) is the vCenter Server®, which is available from VMWare, Inc. located in Palo Alto, California. Another example of a virtual machine manager 324 is the Microsoft® System Center Virtual Machine Manager, which is available from the Microsoft Corporation, located in Redmond, Washington. Each of the virtual machines 326-330 may be instantiated with one or more components found in a virtual machine, such as virtual memory (volatile and non-volatile), one or more virtual processors, one or more virtual communication interfaces, an operating system, various applications, and so forth.

In one embodiment, the virtual machine host 314 is in communication with the secondary storage computing device 312 and one or more secondary storage devices (not shown) managed by the secondary storage computing device 312. The information management system 302 may be implemented in this configuration so that a virtual machine 326 may be instantiated using one or more secondary copies (e.g., secondary copies 116) managed by the secondary storage computing device 312. More particularly, a virtual machine (e.g., virtual machine 326) may be instantiated as a copy of a client computing device (e.g., client computing device 306). For example, the storage manager 304, the client computing device 306, and/or the secondary storage computing device 312 may detect anomalous changes in the primary data of the client computing device 306. A classifier or other machine-learning algorithm may determine that it is probable that the anomalous changes correspond to malware or ransomware that has infected the client computing device 306. The operator or administrator of the information management system 302 may then browse one secondary copies of the primary data of the client computing device 306 to identify a secondary copy 116 of the client computing device 306 that is unaffected by the malware or ransomware. The operator or administrator may then instantiate a virtual machine (e.g., virtual machine 326) via the virtual machine host 314 using the identified secondary copy to effectively replicate a virtual copy of the client computing device 306 that existed prior to a time of the infection. The virtual machine 326 may then operate in place of the client computing device 306 until the client computing device 306, after restoring the identified secondary copy 116 to a primary datastore of the virtual machine 326, until the client computing device 306 has been cleaned of the malware and/or ransomware.

Figure 4:
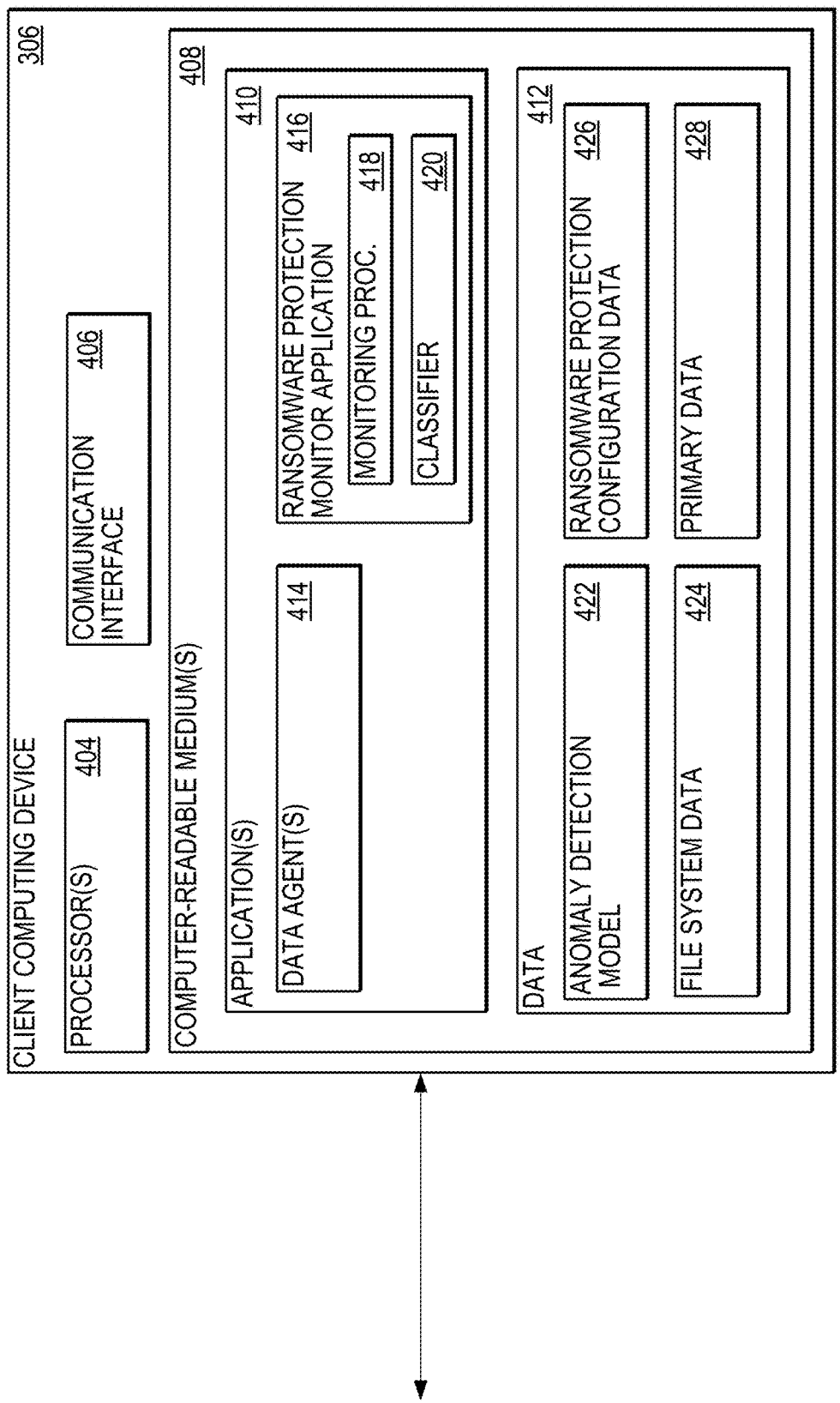
FIG. 4 illustrates a block diagram of a client computing device of the information management system of FIG. 3, according to an example embodiment.

FIG. 4 illustrates a block diagram of a client computing device 306 of the information management system 302 of FIG. 3, according to an example embodiment. In one embodiment, the client computing device 306 includes one or more processor(s) 404, one or more communication interface(s) 406, and one or more non-transitory, computer-readable medium(s) 408. The one or more computer-readable medium(s) 408 may include one or more executable application(s) 410 and data 412. The client computing device 306 may be managed by the storage manager 304 and in communication with the secondary storage computing device 312 via the network(s) 332.

The one or more processor(s) 404 may be any type of commercially available processor, such as processors available from the Intel Corporation, Advanced Micro Devices, Qualcomm, Texas Instruments, or other such processors. Further still, the one or more processor(s) 404 may include one or more special-purpose processors, such as a Field-Programmable Gate Array (FPGA) or an Application Specific Integrated Circuit (ASIC). The one or more processor(s) 404 may also include programmable logic or circuitry that is temporarily configured by software to perform certain operations. Thus, once configured by such software, the one or more processor(s) 404 become specific machines (or specific components of a machine) uniquely tailored to perform the configured functions and are no longer general-purpose processors.

The one or more communication interface(s) 406 are configured to facilitate communications between the client computing device 306 and other devices within the information management system 302, such as the storage manager 304, the secondary storage computing device 312, and the virtual machine host 314. The one or more communication interface(s) 406 may include wired communication components, wireless communication components, cellular communication components, Near Field Communication (NFC) components, Bluetooth® components (e.g., Bluetooth® Low Energy), Wi-Fi® components, and other communication components to provide communication via other modalities.

The client computing device 306 further includes one or more computer-readable medium(s) 408 that store one or more application(s) 410 and data 412 for monitoring the file system data and/or primary data of the client computing device 306 and determining whether the client computing device 306 has been infected with malware and/or ransomware. The computer-readable medium(s) 408 may include one or more devices configured to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer-readable medium" should be taken to include a single medium or multiple media (e.g., a centralized or distributed database, or associated caches and servers) able to store the application(s) 410 and the data 412. Accordingly, the computer-readable medium(s) 408 may be implemented as a single storage apparatus or device, or, alternatively and/or additionally, as a "cloud-based" storage systems or storage networks that include multiple storage apparatus or devices.

In one embodiment, the application(s) 410 are written in a computer-programming and/or scripting language. Examples of such languages include, but are not limited to, C, C++, C#, Java, JavaScript, Perl, Python, or any other computer programming and/or scripting language now known or later developed.

The client computing device 306 may include a variety of software such as an operating system, a web browser, a word processing application, an e-mail client, and so forth. A discussion of this software has been omitted for brevity. To explain the benefits provided by the disclosed systems and methods for monitoring the client computing devices 306-310 and detecting malware and/or ransomware, FIG. 4 illustrates that the application(s) 410 of the client computing device 306 may include one or more data agent(s) 414 and a ransomware protection monitoring application 416.

The one or more data agent(s) 414 may be implemented similarly to the data agent 142 discussed with reference to FIG. 1C. More particularly, the one or more data agent(s) 414 may be responsible for backing up data from different sources of data on the client computing device 306, such as various application(s) (e.g., an e-mail client, calendaring application, etc.), an operating system, one or more file systems, database applications, and so forth. In the embodiment shown in FIG. 4, the one or more data agent(s) 414 may back up file system data 424, which generally includes data used by, and/or corresponding to, a file system instantiated by an operating system, and primary data 428, which may include all other types of data other than the file system data. For example, primary data 428 may include data generated by applications, whereas the file system data 424 may include the structures that organize the primary data 428 (e.g., partition boot sector, master file table, a master boot record, and so forth) within a file system. The primary data 428 may be created substantially directly from data generated by a corresponding source application and may include files, directories, file system volumes, data blocks, extents, or any other hierarchies or organizations of data objects.

During operation of the client computing device 306, the file system data 424 and/or the primary data 428 may change. For example, one or more application(s) 410 of the client computing device 306 may add files, delete files, modify files, change permissions for the files, encrypt files, compress files, and other such operations. Under ordinary circumstances, such modifications and changes to the files of the client computing device 306 are expected. However, should the client computing device 306 be infected with malware or ransomware, there may be an unusually high number of modifications and/or changes to the files performed by the malware and/or ransomware. By the time the malware and/or ransomware has finished operating on the files of the client computing device 306, it may be too late for the user of the client computing device 306 to recover those files or to remove the malware and/or ransomware.

To anticipate the threat of the malware and/or ransomware, the client computing device 306 may be configured with a ransomware protection monitoring application 416 ("the RPMA 416"). The RPMA 416 may include various modules and/or components to facilitate in the monitoring of the client computing device 306. In one embodiment, the modules and/or components include a monitoring process 418 and a classifier 420. To configure the operation of the modules and/or components of the RPMA 416, the data 412 may include ransomware protection configuration data 426 and an anomaly detection model 422.

In one embodiment, the client computing device 306 obtains the RPMA 416, the configuration data 426, and/or the anomaly detection model 422 from the storage manager 304. In another embodiment, the RPMA 416, the configuration data 426, and/or the anomaly detection model 422 may be integrated into one or more of the data agent(s) 414. As explained previously, the client computing device 306 may be in communication with the storage manager 304 via the network 332, and because the storage manager 304 is responsible for managing the client computing device 306, the storage manager 304 may be granted authorization to install and/or remove applications from the client computing device 306, including the RPMA 416. Similarly, the storage manager 304 may be granted authorization to add, upgrade, and/or remove data to the client computing device 306, including the ransomware protection configuration data 426 and/or the anomaly detection model 422.

The RPMA 416 is configured to monitor the data 412 of the client computing device 306 on a real-time or near real-time basis. In particular, the RPMA 416 may instantiate one or more monitoring processes 418 to monitor the data 412 of the client computing device 306, such as the file system data 424 and/or the primary data 428. The one or more monitoring processes 418 may be configured to monitor for modifications and/or changes to the file system data 424 and/or the primary data 428. The ransomware protection configuration data 426 may configure and/or instruct the RPMA 416 as to how it should monitor the client computing device 306 including, but not limited to, the number of process(es) 418 to instantiate, the frequency of monitoring, which file system data 424 and/or primary data 428 to monitor, and so forth.

In one embodiment, the RPMA 416 instantiates a monitoring process for each data source to be monitored. For example, the RPMA 416 may instantiate a first monitoring process to monitor changes to the file system data 424, a second monitoring process to monitor changes to data associated with an e-mail client, a third monitoring process to monitor changes to data associated with a word processing application, a fourth monitoring process to monitor changes to data associated with a database application, and so forth. In this embodiment, there may be multiple monitoring processes 418 based on the number of data sources within primary data 428, the number of applications generating and/or modifying data, the number of file systems being monitored, and so forth.

In another embodiment, the RPMA 416 may instantiate a single monitoring process 418, where the single monitoring process 418 monitors the file system data 424 and/or the primary data 428. In this embodiment, the monitoring process 418 may be responsible for monitoring the data of many different sources, depending on which sources are generating data within the client computing device 306.

The monitoring process(es) 418 may be configured to monitor for one or more different types of changes to the file system data 424 and/or primary data 428. Types of changes include, but are not limited to, the creation of new data (e.g., new files and/or new data structures), the modification of existing data (e.g., the editing of files and/or data structures), the deletion of existing data (e.g., the deletion of existing files and/or data structures), and other such modifications to the file system data 424 and/or primary data 428.

The monitoring process 418 may monitor and record the modifications to the file system data 424 and/or primary data 428 for one or more sets of a predetermined time period. For example, the monitoring process 418 may monitor and record the modifications to the file system data 424 and/or primary data 428 over a first time period, then a subsequent second time period, then a third time period, and so forth. A predetermined time period may be measured as one or more minutes, one or more hours, one or more days, or combinations of the foregoing.

The predetermined time periods may be configured by an administrator and/or operator of the information management system 302. Additionally, and/or alternatively, the predetermined time period may be automatically modified (e.g., increased and/or decreased) by one or more devices and/or components in the information management system 302, such as the storage manager 304. For example, the storage manager 304 may modify the predetermined time period based on a determination that the monitoring process(es) 418 are collecting too much or too little modification information. For example, the storage manager 304 may be configured with a data collection threshold that establishes a baseline for a number of detected changes, and may compare the number of changes recorded by the monitoring process(es) 418 with this threshold. Based on this comparison, the storage manager 304 may modify the predetermined time period for the one or more monitoring process(es) 418, depending on whether additional data points (e.g., recorded modifications) are needed (or not needed) for the one or more time periods. This allows one or more of the monitoring processes 418 to determine a rate of change of primary data 428 over a unit of time.

The one or more process(es) 418 may record the modifications to the file system data 424 and/or the primary data 428 at one or more locations within the information management system 302. In one embodiment, the one or more process(es) 418 locally record the modifications at the client computing device 306. Additionally, and/or alternative, the one or more process(es) 418 may record the modifications within the anomaly detection database 316, which may be separate from the client computing device 306 and protected from infection by malware. Additionally, and/or alternatively, the modifications may be transmitted in near real-time to another location and/or device, such as the storage manager 304. For example, at the end of each predetermined time period, the one or more process(es) 418 may communicate the recorded modifications to the storage manager 304, and the storage manager 304 may then store the recorded modifications in the anomaly detection database 316. As discussed below, the storage manager 304 may access the anomaly detection database 316 to retrieve information about these modifications to display on one or more graphical user interfaces.

It is not uncommon for the file system data 424 and/or the primary data 428 to change hundreds of times during a monitored, predetermined time period (e.g., a unit of time). Accordingly, to determine whether the changes are the result of malware and/or ransomware, or simply from the ordinary course of operation of the client computing device 306, the application(s) 410 may include a classifier 420 and an anomaly detection model 422, where the classifier and/or the anomaly detection model 422 output a result indicative of whether the monitored changes and/or modifications are from malware and/or ransomware. The classifier 420 may output a probability value, an absolute value, and/or a binary value that the changes to the file system data 424 and/or the primary data 428 are from the behavior of malware and/or ransomware.

The client computing device 306 may obtain the classifier 420 and/or the anomaly detection model 422 from one or more sources of data, such as the storage manager 304 and/or the secondary storage computing device 312. In one embodiment, and prior to be copied to the client computing device 306, the anomaly detection model 422 is initially trained using a labeled training data set, where the labeled training data set indicates which types of modifications and/or changes are from the innocuous operation of a client computing device 306, and which types of modifications and/or changes are from the operation of malware and/or ransomware. The training of the anomaly detection model 422 may occur using various types of data, various types of modifications, over one or more different time periods, and so forth. In addition, the training may include human verification, where the human verification provides feedback as to whether the one or more training data sets accurately reflects the outcome each training data set is associated with.

During the monitoring of the file system data 424 and/or the primary data 428, the one or more monitoring process(es) 418 may provide the modifications and/or changes to the classifier 420 as input, where the classifier 420 uses the anomaly detection model 422 to output a confidence value, probabilistic value, and/or binary value that the monitored changes are associated with the behavior of malware and/or ransomware. The output by the classifier 420 may then be communicated to the storage manager 304, which may then store the output in the anomaly detection database 316. In one embodiment, the classifier 420 and/or the anomaly detection model 422 are stored locally on the client computing device 306 so that the changes and/or modifications to the file system data 424 and/or primary data 428 can be input to the classifier 420 on a real-time and/or near real-time basis. In this embodiment, the monitoring process(es) 418 may be monitoring production or "live" data of the client computing device 306, and the changes to the production data may be input to the classifier 420. By operating on live or production data of the client computing device 306, the classifier 420 can determine whether the detected changes and/or modifications are the result of malware and/or ransomware within a short time period of the detected changes and/or modifications having occurred.

In another embodiment, the classifier 420 and/or the anomaly detection model 422 are executed by the storage manager 304 and may be stored in a storage device local to the storage manager 304. The classifier 420 and/or the anomaly detection model 422 may be stored in network-accessible storage device, and the storage manager 304 may execute the classifier 420 from the network-accessible storage device. Where the storage manager 304 executes the classifier 420, one or more of the monitoring process(s) 418 may communicate the detected changes and/or modifications to the file system data 424 and/or primary data 428 to the storage manager 304. The storage manager 304 may then store these detected changes and/or modifications in the anomaly detection database 318. In addition, the storage manager 304 may input the detected changes and/or modifications to the classifier, which may then output a probability value and/or binary value that the changes and/or modifications are the result of malware and/or ransomware. The storage manager 304 may also store this result in the anomaly detection database 316, which may then be provided to one or more graphical user interfaces, discussed further below.

In addition to generating an output of whether the behavior is associated with the operation of malware and/or ransomware, the classifier may output a value indicating the type of behavior that was detected. For example, where the classifier 420 determines that there an unusual number of deletions within the file system data 424 and/or the primary data 428 during a particular predetermined time period, the classifier 420 may output a value indicating this behavior. The value may be a numerical value, a series of alphanumeric characters, and so forth. Another type of behavior that the classifier 420 may determine and/or identify is a number of excessive file moves (e.g., a file being moved from one directory to another directory). Yet a further type of behavior that the classifier 420 may determine is an excessive number of encryptions (e.g., a large number of files being encrypted). Each of these types of behaviors may have been previously trained within the anomaly detection model 422 so that the classifier 420 can readily identify and/or determine them. Further still, the anomaly detection model 422 may be updateable, so that the anomaly detection model 422 may be up-to-date with different behaviors and how they may be recognized. The anomaly detection model 422 may be updated by the storage manager Whether the classifier 420 is executed by the storage manager 304 or the client computing device (e.g., any one of client computing devices 306-310), the classifier 420 can inform an operator or administrator of the information management system 302 as to whether the client computing device 306 (or any client computing device managed by the storage manager 304) is exhibiting behavior symptomatic of a malware and/or ransomware infection. In one embodiment, the storage manager 304 notifies the administrator or operator of the information management system 302 via one or more communication channels, such as an e-mail, text sent via the Short Messaging System (SMS), an automated phone call, or combinations of the foregoing. In addition, the storage manager 304 may display the behaviors detected by the classifier on a graphical user interface that the administrator or operator may use to interact with the various devices of the information management system 302, and implement a solution to address the potentially infected client computing device. In some instances, operator and/or administrator approval may be needed to resolve the potentially infected client computing device; in other instances, the storage manager 304 may operate automatically to implement a solution.

When the classifier 420 determines that some activity on the client computing device is outside of expected values, the classifier 420 may generate additional information about the detected activity. The information about the detected activity may include, but is not limited to, the type of activity detected, a number of files that were created, a number of files that were modified, a number of files that were renamed, a number of files that were deleted, and a date and/or time at which the classifier 420 detected the activity. This information may be communicated to the storage manager 304, where it may be stored in the anomaly detection database 316 and associated with the client computing device where the activity was detected.

As mentioned previously, the client computing devices 306-310 may be in communication with the secondary storage computing device 312, where the media agent 320 creates secondary copies of file system data 424 and/or primary data 428 within a secondary storage device (not shown) communicatively coupled with the secondary storage computing device 312. Furthermore, as the secondary storage computing device 312 may maintain records of the secondary copies in a media agent index 322 or create a copy of backup records in a management database communicatively coupled to the storage manager 304 (e.g., management database 146), an administrator or operator of the information management system 302 may access and/or view metadata about the secondary copies. As discussed below with reference to FIGS. 11A-11B, an administrator or operator of the information management system 302 may use a graphical user interface to browse volumes, directories, and/or files of backups of one or more of the client computing devices 306-310.

As the secondary storage computing device 312 may manage backups of the client computing devices 306-310, an administrator or operator of the information management system 302 may selectively restore one or more files, directories, and/or volumes from secondary copies to their corresponding client computing devices 306-310 in the event that the client computing device has become infected with malware and/or ransomware. In one embodiment, the selective restoration of a client computing device is manually performed by the administrator or operator of the information management system 302. For example, the administrator or operator may manually select which of the volumes, directories, and/or files to restore to the client computing device. In another embodiment, the restoration of the client computing device may be automatically initiated by the storage manager 304, which may then be performed by the media agent 320 and one or more of the data agent(s) 414. In this embodiment, the storage manager 304 may inform the administrator and/or operator of the information management system 302 that a client computing device has become infected with malware and/or ransomware (e.g., based on the output of the classifier 420), and the storage manager 304 may request authorization to restore the affected files to the client computing device (e.g., files that were maliciously encrypted, deleted, renamed, obfuscated, etc.) from the secondary copies managed by the secondary storage computing device 312. In performing the automatic restoration, the storage manager 304 may instruct the media agent 320 to select secondary copies that were most recently created, where the file system data 424 and/or primary data 428 did not exhibit the abnormal behavior.

In addition to being able to selectively restore backups to a client computing device, the administrator and/or operator may decide to restore a complete backup of the client computing device to a virtual machine. Accordingly, in one embodiment, an administrator and/or operator may instruct the virtual machine host 314 to instantiate a virtual machine (e.g., virtual machine 326) having a configuration similar and/or approximate to the configuration of the client computing device that is being restored. The virtual machine host 314 may obtain the hardware configuration of the client computing device in several different ways. In one embodiment, the virtual machine host 314 queries the client computing device (e.g., client computing device 306) for its hardware configuration, and the client computing device 306 responds with a listing of its hardware configuration. In another embodiment, the administrator and/or operator of the information management system 302 may manually input the hardware configuration of the virtual machine to-be-instantiated into the virtual machine host 314. In yet a third embodiment, the virtual machine host 314 may store different hardware configuration templates, and may instantiate a new virtual machine from one of the hardware configuration templates. Thus, there are several different ways in which the virtual machine host 314 may obtain the hardware specification for the virtual machine to-be-instantiated.

After instantiating a virtual machine (e.g., virtual machine 326), one or more of the client computing devices 306-310 may be virtualized using secondary copies managed by the secondary storage computing device 312. Although an administrator or operator of the information management system 302 may selectively restore one or more files to a client computing device 306, there may be instances where virtualization of the client computing device 306 is preferable over a selective restore. For example, the classifier 420 may determine that a significant number of files, directories, and/or data structures of the client computing device 306 have been affected by malware and/or ransomware, and the administrator and/or operator may determine that a selective restore of such files, directories, and/or data structures may be ineffective. As another example, the client computing device 306 may be a "mission critical" device (e.g., the downtime of the device negatively impacts the performance of the information management system 302), and needing the client computing device 306 operational is urgent. In these examples, virtualizing the client computing device 306 via the virtual machine host 314 is an expedient solution to restoring the client computing device 306 to an operational state that was backed up prior to any infection or instability caused by malware and/or ransomware. The administrator and/or operator of the information management system 302 may interact with the virtual machine manager 324 to manage any of the virtual machines 326-330 that have been instantiated by the virtual machine host 314.

In the preceding discussion, the monitoring process(es) 418 and/or classifier 420 monitor and act on file system data 424 and/or primary data 428 of a device on a real-time and/or near real-time basis. However, in some instances, such real-time and/or near real-time monitoring may not be possible. To address this deficiency, the secondary storage computing device 312 may also be configured with a Ransomware Protection Monitoring Application ("RPMA") to monitor changes between backups of the one or more client computing devices 306-310, where such changes may indicate whether a client computing device has become affected by malware and/or ransomware.

Figure 5:
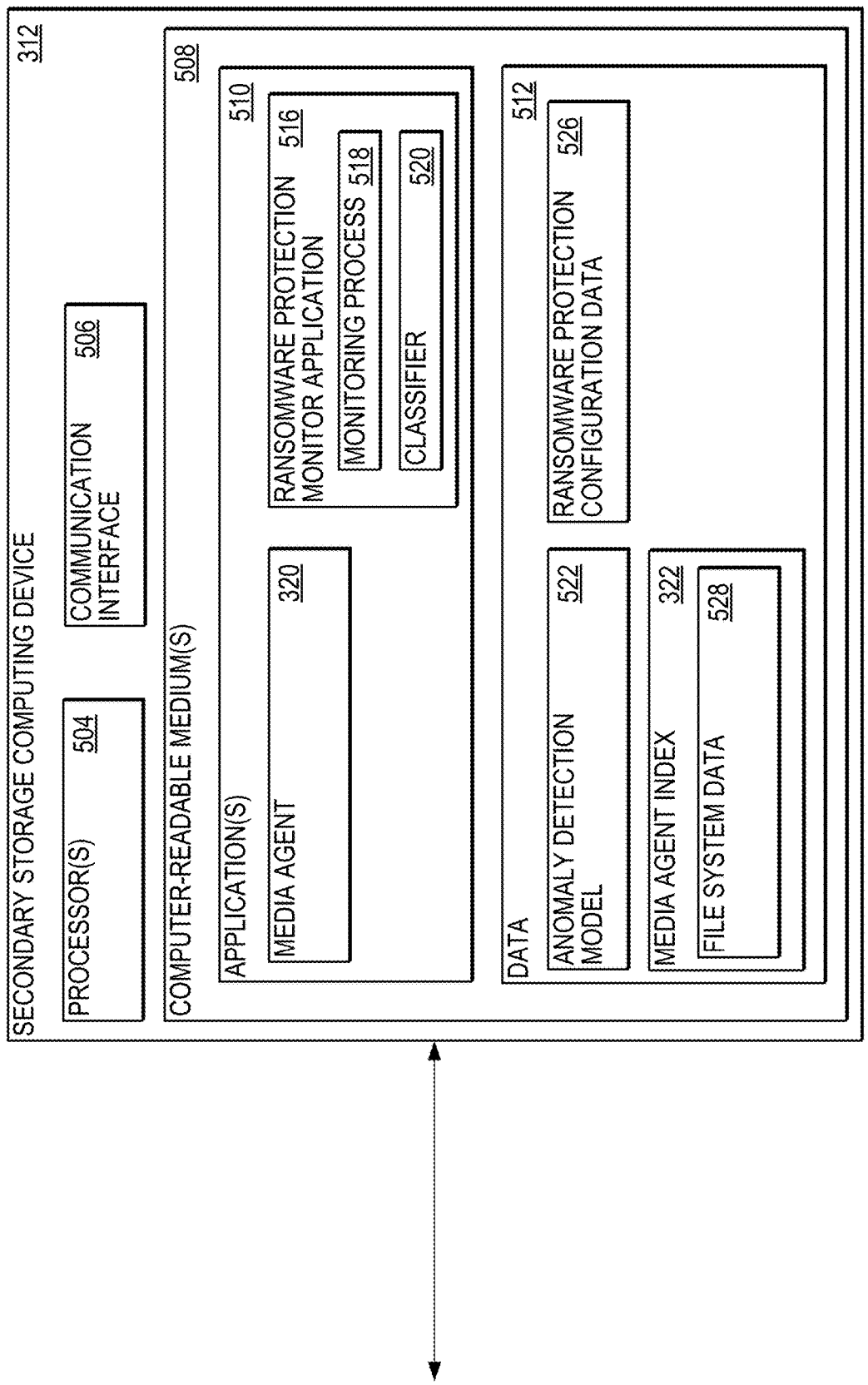
FIG. 5 illustrates a block diagram of a secondary storage computing device of the information management system of FIG. 3, according to an example embodiment.

FIG. 5 illustrates a block diagram of the secondary storage computing device 312 of the information management system 302 of FIG. 3, according to an example embodiment. In one embodiment, the secondary storage computing device 312 includes one or more processor(s) 504, one or more communication interface(s) 506, and one or more computer-readable medium(s) 508. The one or more computer-readable medium(s) 508 may include one or more application(s) 510 and data 512. The secondary storage computing device 312 in communication with the one or more client computing devices 306-310, the storage manager 304, and/or the virtual machine host 314 via the network 332.

The one or more processor(s) 504 may be any type of commercially available processor, such as processors available from the Intel Corporation, Advanced Micro Devices, Qualcomm, Texas Instruments, or other such processors. Further still, the one or more processor(s) 504 may include one or more special-purpose processors, such as a Field-Programmable Gate Array (FPGA) or an Application Specific Integrated Circuit (ASIC). The one or more processor(s) 504 may also include programmable logic or circuitry that is temporarily configured by software to perform certain operations. Thus, once configured by such software, the one or more processor(s) 504 become specific machines (or specific components of a machine) uniquely tailored to perform the configured functions and are no longer general-purpose processors.

The one or more communication interface(s) 506 are configured to facilitate communications between the secondary storage computing device 312 and other devices within the information management system 302, such as the storage manager 304, the one or more client computing devices 306-310, and the virtual machine host 314. The one or more communication interface(s) 506 may include wired communication components, wireless communication components, cellular communication components, Near Field Communication (NFC) components, Bluetooth® components (e.g., Bluetooth® Low Energy), Wi-Fi® components, and other communication components to provide communication via other modalities.

The secondary storage computing device 312 further includes one or more computer-readable medium(s) 508 that store one or more application(s) 510 and data 512 for providing access to a secondary storage device and for monitoring differences between backups of the one or more client computing devices 306-310. The computer-readable medium(s) 508 may include one or more devices configured to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "computer-readable medium" should be taken to include a single medium or multiple media (e.g., a centralized or distributed database, or associated caches and servers) able to store the application(s) 510 and the data 512. Accordingly, the computer-readable medium(s) 508 may be implemented as a single storage apparatus or device, or, alternatively and/or additionally, as a "cloud-based" storage systems or storage networks that include multiple storage apparatus or devices.

In one embodiment, the application(s) 510 are written in a computer-programming and/or scripting language. Examples of such languages include, but are not limited to, C, C++, C#, Java, JavaScript, Perl, Python, or any other computer programming and/or scripting language now known or later developed.

The secondary storage computing device 312 may be implemented similarly to the secondary storage computing device 106 illustrated in FIG. 1C. Accordingly, the secondary storage computing device 312 may include a media agent 320 that generates indexing information stored in the media agent index 322. In addition, the secondary storage computing device 312 may include a ransomware protection monitoring application 516 (RPMA 516) that monitors for changes between backups of the client computing devices 306-310. In one embodiment, the RPMA 516 determines the differences between the backups of client computing devices 306-310 by referencing indexing data of the media agent index 524 (e.g., file system data 528).

The media agent 320 may be implemented similarly to the media agent 144 discussed with reference to FIG. 1C. For example, the media agent 320 may be responsible for managing, coordinating, and facilitating the transmission of data between one or more data agents of the client computing devices 306-310 and associated with the media agent 320. In addition, the media agent 320 may be configured to generate and store metadata of the secondary copies stored in one or more secondary storage devices. While FIG. 5 illustrates that the secondary storage computing device 312 may instantiate a single media agent 320, the secondary storage computing device 312 may instantiate multiple media agents that operate on one or more secondary storage devices.

As the media agent 320 indexes secondary copies of the client computing devices 306-310, the media agent 320 may generate file system data 528 about the secondary copies and store the file system data 528 in the media agent index 322. The file system data 528 may include information about the files, directories, and/or data structures of the file system of the secondary copies of the client computing devices 306-310. The file system data 528 may further include the metadata that the media agent 320 generates as it indexes the secondary copies of the client computing devices 306-310.

In some instances, malware and/or ransomware may be introduced into the file system of a client computing device (e.g., client computing device 306). As discussed above, the malware and/or ransomware may cause undesirable changes to the files of the client computing device including, but not limited to, file renaming, file deletion, file modification, file encryption, file obfuscation, and other such modifications. Due to the sophistication of some malware and/or ransomware, detecting the malware and/or ransomware in real-time and/or near real-time may be problematic and/or challenging. The malware and/or ransomware may further disguise and/or obfuscate its operations such that the malware and/or ransomware is not detected by the RPMA 416 of the client computing device 306. Accordingly, to anticipate the threat of potential malware and/or ransomware being introduced into the secondary copies of the client computing devices 306-310, the secondary storage computing device 312 may also be configured with the RPMA 516 that monitors the secondary copies as they are created in the secondary storage device.

The RPMA 516 may include various modules and/or components to facilitate the monitoring of the secondary copies managed by the secondary storage computing device 312. In one embodiment, the modules and/or components include one or more monitoring process(es) 518 and a classifier 520. To configure the operation of the modules and/or components of the RPMA 516, the data 512 may include ransomware protection configuration data 526 and an anomaly detection model 522.

In one embodiment, the secondary storage computing device 312 obtains the RPMA 516, the ransomware protection configuration data 526, and/or the anomaly detection model 522 from the storage manager 304. As explained previously, the secondary storage computing device 312 may be in communication with the storage manager 304 via the network 332, and because the storage manager 304 is responsible for managing one or more devices within the information management system 302, the storage manager 304 may be granted authorization to install and/or remove applications from the secondary storage computing device 312, including the RPMA 416. Similarly, the storage manager 304 may be granted authorization to add and/or remove data to the secondary storage computing device 312, including the ransomware protection configuration data 526 and/or the anomaly detection model 522.

The RPMA 516 is configured to monitor the media agent index 322 and/or the file system data 528 of the media agent index 322 as one or more secondary copies of data from the client computing devices 306-310 are created in the secondary storage device. The ransomware protection configuration data 526 may configure and/or instruct the RPMA 516 as to how it should monitor one or more backups of the client computing devices including, but not limited to, the number of process(es) 518 to instantiate, the frequency of monitoring, which backups and/or types of backups to monitor, and so forth.

In particular, the RPMA 516 may instantiate one or more monitoring processes 518 to monitor the media agent index 322 and/or file system data 528 of the media agent index 322. The one or more monitoring processes 518 may be configured to determine differences between sequential backups (e.g., sequential secondary copies) of the data of the client computing devices 306-310. In one embodiment, the RPMA 516 instantiates a monitoring process for each client computing device to be monitored (e.g., the secondary copies generated by a particular client computing device). For example, the RPMA 516 may instantiate a first monitoring process to monitor changes to the file system data 528 for a first client computing device, a second monitoring process to monitor changes to the file system data 528 for a second client computing device, a third monitoring process to monitor changes to the file system data 528 for a third client computing device, and so forth. In this embodiment, there may be multiple monitoring processes 418 based on the number of client computing devices to monitor. Additionally, and/or alternatively, the number of process(es) 518 may be based on the number of secondary copies that the RPMA 516 is monitoring.

In another embodiment, the RPMA 516 may instantiate a single monitoring process 518, where the single monitoring process 518 monitors the file system data 528 and/or other data stored in the media agent index 322. In this embodiment, the monitoring process 518 may be responsible for monitoring for changes in the file system data for secondary copies of many different client computing devices, depending on which client computing devices are storing secondary copies in one or more secondary storage devices managed by the secondary storage computing device.

The monitoring process(es) 518 may be configured to monitor for one or more different types of changes to the file system data 528 and/or changes to other data within the media agent index 322. In one embodiment, the monitoring process(es) 518 determine whether changes have occurred by comparing secondary copies of backups having identical volumes, directories, and files. For example, the monitoring process(es) 518 may compare secondary copies of the same directory, secondary copies of the same volume, secondary copies of the same files, and so forth. In this manner, the monitoring process(es) 518 may compare secondary copies corresponding to the same data. The type of changes that the monitoring process(es) 518 may monitor include, but are not limited to, the creation of new data (e.g., additional files and/or additional data structures), the modification of existing data (e.g., the editing of files and/or data structures), the deletion of existing data (e.g., the deletion of existing files and/or data structures), and other such modifications to the file system data 528 and/or indexing information of the media agent index 322.

The monitoring process(es) 518 may monitor and record the modifications to the file system data 528 and/or other indexing information for one or more pairs of compared secondary copies. In one embodiment, the monitoring process(es) 518 compare sequential secondary copies, where a first secondary copy was created at a first time and a second secondary copy was created at a second time, where the second time occurs after the first time, and the second secondary copy is the immediate secondary copy created after the first secondary copy. In other instances, the monitoring process(es) 518 may compare secondary copies that are not sequential, but where intermediate secondary copies may have been created between the compared pair of secondary copies.

The one or more process(es) 518 may record the monitored changes to the file system data 528 and/or the indexing information at one or more locations within the information management system 302. In one embodiment, the one or more process(es) 518 locally record the monitored changes in the computer-readable medium 508 of the secondary storage computing device 312. Additionally, and/or alternative, the one or more process(es) 518 may record the monitored changes within the anomaly detection database 318. For example, after each comparison of one or more secondary copies, the one or more process(es) 518 record the determined changes in the anomaly detection database 318. Further still, the monitoring process(es) 518 may communicate the monitored changes to the storage manager 304, and the storage manager 304 may then store these monitored changes in the anomaly detection database 316. As discussed below, the storage manager 304 may access the anomaly detection database 316 to retrieve information about these modifications to display on one or more graphical user interfaces.

It is not uncommon for different secondary copies to have a non-trivial number of changes or differences. Accordingly, to determine whether the changes are the result of malware and/or ransomware, or simply from the ordinary course of operation of the client computing device 306, the application(s) 510 may include a classifier 520 and an anomaly detection model 522, where the classifier 520 and/or the anomaly detection model 522 output a result indicative of whether the monitored changes and/or modifications are from malware and/or ransomware. The classifier 520 may output a probability value, an absolute value, and/or a binary value that the changes to the file system data 528 and/or the indexing information of the media agent index 322 are from operations performed by malware and/or ransomware.

As with the client computing device 306, the secondary storage computing device 312 may obtain the classifier 520 and/or the anomaly detection model 522 from one or more sources of data, such as the storage manager 304. In one embodiment, and prior to be copied to the secondary storage computing device 312, the anomaly detection model 522 is initially trained using a labeled training data set, where the labeled training data set indicates which types of modifications and/or changes are from the ordinary course of operation of a client computing device, and which types of modifications and/or changes are from the operation of malware and/or ransomware. The training of the anomaly detection model 522 may occur using various types of data, various types of modifications, over one or more different time periods, and so forth. In addition, the training may include human verification, where the human verification provides feedback as to whether the one or more training data sets accurately reflects the outcome each training data set is associated with.

The monitoring process(es) 518 may provide the determined and/or monitored changes to the classifier 520 as input, where the classifier 520 uses the anomaly detection model 522 to output a confidence value, probabilistic value, and/or binary value that the determined and/or monitored changes are associated with the behavior of malware and/or ransomware. The output by the classifier 520 may then be stored in the anomaly detection database 318, and then communicated to the storage manager 304, which may then store the output in the anomaly detection database 316. In one embodiment, the classifier 520 and/or the anomaly detection model 522 are stored locally on the secondary storage computing device 312 so that the changes and/or modifications to the file system data 528 can be input to the classifier 520 after a determination is made on one or more pairs of compared secondary copies. In this embodiment, the secondary storage computing device 312 may determine whether a secondary copy has been affected by malware and/or ransomware shortly after the secondary copy is created in a secondary storage device managed by the secondary storage computing device. In another embodiment, the classifier 520 and/or the anomaly detection model 522 are executed by the storage manager 304 and may be stored in a storage device local to the storage manager 304.

As with the classifier 420, the classifier 520 may output a value indicating the type of behavior that was detected. The different types of behaviors may have been previously trained within the anomaly detection model 522 so that the classifier 520 can readily identify and/or determine them. Further still, the anomaly detection model 522 may be updateable, so that the anomaly detection model 522 may be up-to-date with different behaviors and how they may be recognized. The anomaly detection model 522 may be updated by the storage manager Whether the classifier 520 is executed by the secondary storage computing device 312, the storage manager 304, or another distinct computing device not specifically illustrated, the classifier 520 can inform an operator or administrator of the information management system 302 as to whether secondary copies managed or accessible by the media agent 320 have been affected by malware and/or ransomware. In one embodiment, the storage manager 304 notifies the administrator or operator of the information management system 302 via one or more communication channels, such as an e-mail, text message, an automated phone call, or combinations of the foregoing. In addition, the storage manager 304 may display the behaviors detected by the classifier on a graphical user interface that the administrator or operator may use to interact with the various devices of the information management system 302, and implement a solution to address the potentially infected client computing device.

Figure 6:
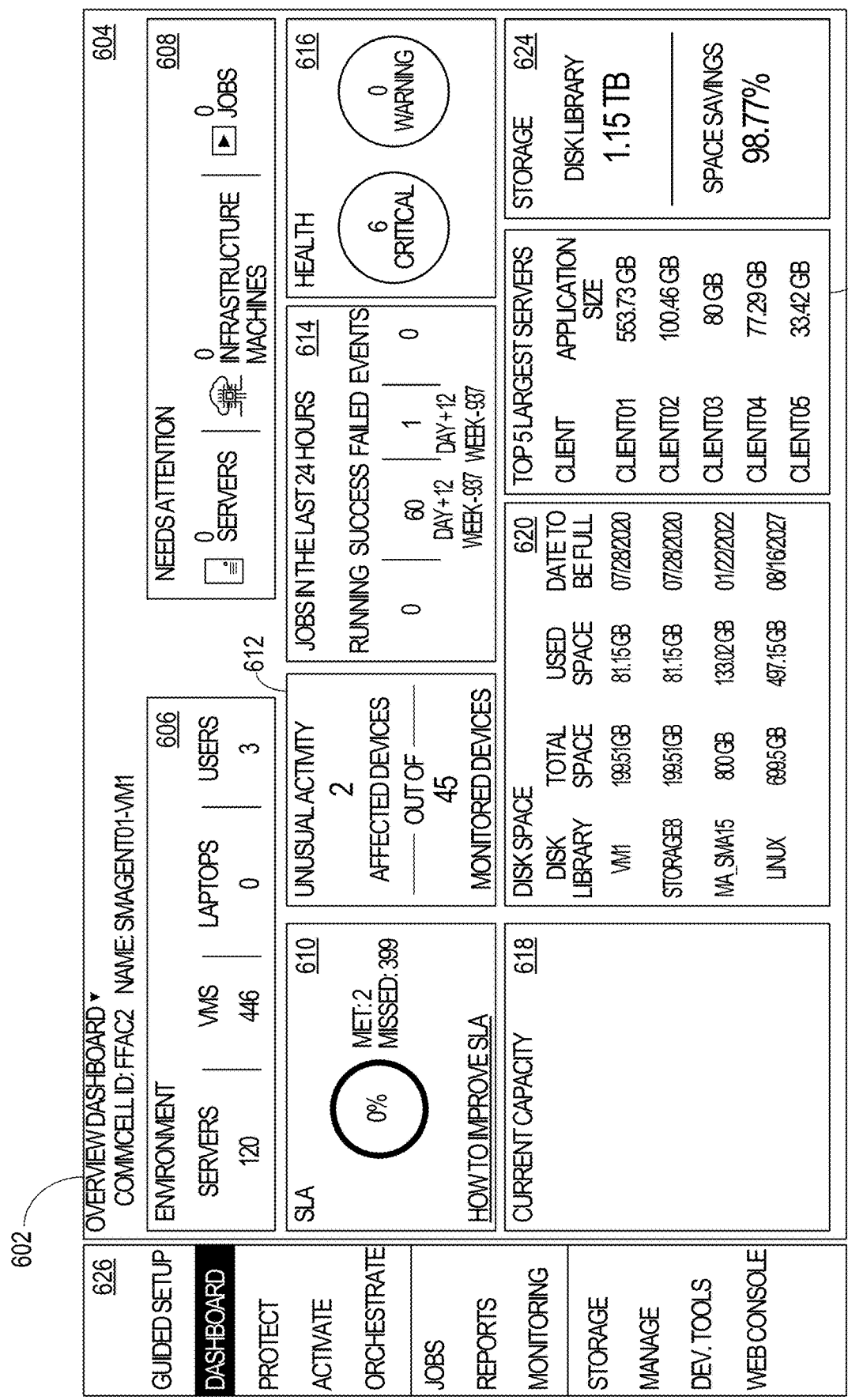
FIG. 6 illustrates a graphical user interface for displaying an overview of anomaly detection information provided by the storage manager of the information management system of FIG. 3, according to an example embodiment.

FIG. 6 illustrates a graphical user interface 602 for displaying an overview of anomaly detection information provided by the storage manager 304 of the information management system 302 of FIG. 3, according to an example embodiment. The graphical user interface 602 may be displayed using one or more different types of applications including, but not limited to, a web-based application, a programmatic or standalone application, or combinations thereof.

The graphical user interface 602 may include multiple windows or panels 604-626, where each panel allows a user of the application to interact with the application or provide information relating to the information management system 302. The information sources for the panels 604-626 may be provided by one or more devices and/or components in the information management system 302, such as the storage manager 304, the secondary storage computing device 312, the anomaly detection database 316, the anomaly detection database 318, the virtual machine host 314, one or more client computing devices 306-310, one or more of the virtual machines 326-330, and any other such device or component in the information management system 302.

In one embodiment, the graphical user interface 602 includes an overview panel 604, where the overview panel includes multiple panels 606-624. The overview panel 604 provides an overview of the information management system 302 and allows a user interacting with the graphical user interface 602 to view specific information about the information management system 302.

The panels 606-624 also include an environment panel 606. The environment panel 606 provides information about the computing environment of the information management system 302. The information about the computing environment may include the number and/or types of all devices used in the information management system 302, the number and/or types of active (e.g., online) devices, the number and/or types of inactive (e.g., offline) devices, the number of total users in the information management system 302, the number of active (e.g., online) users, the number of inactive (e.g., offline) users, and other such information.

The overview panel 604 may further include an attention panel 608, where the attention panel 608 identifies whether entities used and/or computing activities occurring in the information management system 302 require attention from a user, administrator, or operator of the information management system 302. An entity may be any device and/or component used in the information management system 302. A computing activity may be any software- and/or hardware-based activity occurring within the information management system 302. Examples of the entities include the storage manager 304, the secondary storage computing device 312, the one or more client computing devices 306-310, and other such devices. Examples of computing activities include the backup jobs being performed, network transfers occurring between one or more of the devices in the information management system 302, uploads and/or downloads that are occurring, reads from and/or writes to one or more storage devices within the information management system 302, and other such computing activities. The attention panel 608 may be also customizable such that the attention panel 608 may display any combination of the foregoing entities and/or computing activities within the information management system 302.

The overview panel 604 may further display an SLA panel 610, where the SLA panel 610 displays information about the service-level provided by the information management system 302. In one embodiment, the storage manager 304 provides the information for the SLA panel 610. For example, the storage manager 304 may obtain the information for the SLA panel 610 from one or more database sources within the information management system 302, such as the management database 146 (not shown in FIG. 3).

In addition, the overview panel 604 may include an unusual activity panel 612, where the unusual activity panel 612 displays information about unusual activity detected within one or more monitored devices of the information management system 302. In one embodiment, the unusual activity panel 612 is populated after one or more devices within the information management system 302 have determined that there is unusual file system activity occurring on a monitored device (e.g., one or more of the client computing devices 306-310, the secondary storage computing device 312, a secondary storage device, etc.). In one embodiment, when a device determines that there is unusual activity occurring, the device reports the occurrence of the unusual activity to the storage manager 304, which may populate the anomaly detection database 316 accordingly. The information from the anomaly detection database 316 may then be populated into the unusual detection panel 612. For example, the storage manager 304 may provide the information from the anomaly detection database 316 for the unusual activity panel 612. As another example, a computing device on which the unusual activity panel 612 is displayed may be granted access to obtain the information from the anomaly detection database 316. In either example, the unusual activity panel 612 displays information about anomalous activity that is occurring on one or more of the monitored devices within the information management system 302. As shown in FIG. 6, the unusual activity panel 612 shows that there are two devices out of 45 monitored devices that are exhibiting anomalous activity within the information management system 302.

The overview panel 604 further includes a jobs status panel 614 that provides status information for one or more computing activities occurring within the information management system 302. In one embodiment, the jobs status panel 614 provides information and the status of one or more backup jobs that are occurring and/or have occurred within the information management system 302. The job status information may be provided by one or more devices within the information management system 302, such as the storage manager 304, the secondary storage computing device 312, the virtual machine host 314, and/or any of the devices within the information management system 302.

In addition, the overview panel 604 includes a health status panel 616 that provides alerts and/or warnings about the computing health of one or more of the monitored devices within the information management system 302. The health information for the health status panel 616 may be obtained from one or more of the devices within the information management system 302 such as the storage manager 304, the secondary storage computing device 312, the virtual machine host 314, and/or any of the other devices.

Furthermore, the overview panel 604 may display a current capacity panel 618 that indicates the storage capacity of a particular computing device of the information management system 302. For example, a user of the graphical user interface 602 may select a computing device, such as client computing device 306 of various devices within the information management system 302. The current capacity panel 618 may display available free space, total storage space, currently used space, and other such storage information for the particular computing device.

The overview panel 604 may also display a disk space panel 620 that displays disk space information for one or more of the computing devices within the information management system 302. In one embodiment, the disk space panel 620 displays disk space information accessible and/or usable for various file servers and/or managing servers within the information management system 302, such as the secondary storage computing device 312 and/or the storage manager 304. The disk space panel 620 may display available disk space, total disk space, used disk space, an expected calendar date when a particular disk and/or volume is expected to be full, and other such disk space information. The disk space information may be provided by the one or more file servers and/or managing servers within the information management system 302.

The overview panel 604 may further display a server panel 622, where the server panel 622 displays a predetermined number of clients having application sizes that are the largest relative to the application sizes of other clients within the information management system 302. In one embodiment, the predetermined number is the value five, such that the server panel 622 displays the top five clients have the largest application sizes within the information management system 302. The predetermined number may be configurable by an operator or an administrator of the information management system 302.

Additionally, the overview panel 604 may display a storage panel 624 that displays the size of the disk library used by the client computing devices of the information management system 302. In one embodiment, the storage panel 624 displays the amount of space used for secondary copies of primary data and/or file system data of the one or more client computing devices 306-310. In addition, the storage panel 624 may display an amount of storage space that has been saved by using one or more secondary operations on the secondary copies, where secondary operations include such operations as compression, encryption, deduplication, and so forth. As shown in FIG. 6, the information management system 302 has saved 98.77% of secondary storage space by using one or more of the secondary operations on the secondary copies managed by the secondary storage computing device 312.

Finally, the graphical user interface 602 may include a menu panel 626, where the menu panel 626 allows a user of the graphical user interface 602 to navigate among the different panels of information. The menu panel 626 may include one or more menu options that a user may select, and a selection of a menu option causing a corresponding change in the graphical user interface 602 to display the panel associated with the selected menu option (e.g., selecting the "JOBS" menu option will cause the graphical user interface 602 to display a jobs panel).

Figure 7:
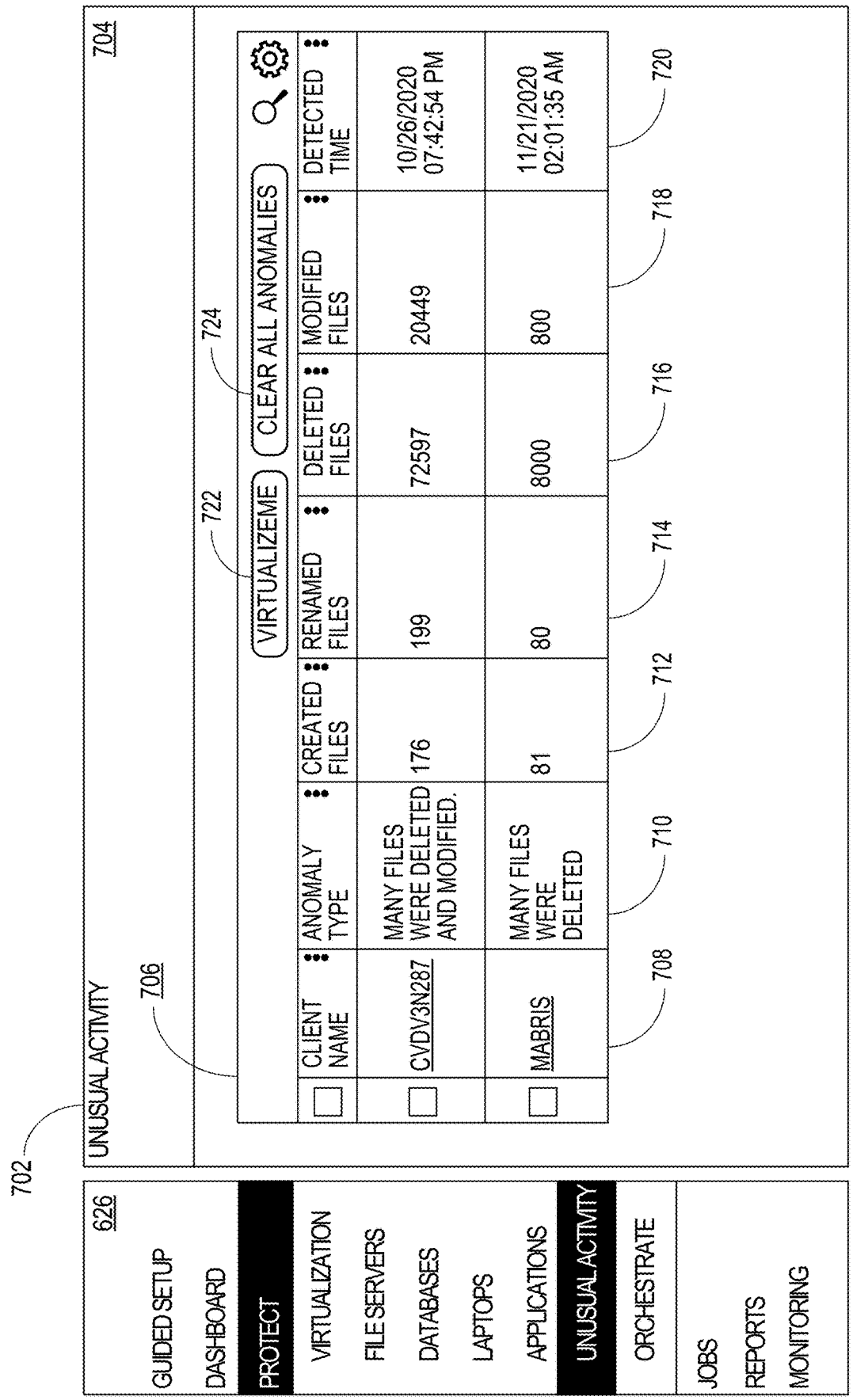
FIG. 7 illustrates a graphical user interface that displays client computing devices having detected anomalies in their file system data and/or primary data, according to an example embodiment.

Turning next to FIG. 7, is an illustration of a graphical user interface 702 that displays client computing devices having detected anomalies in their file system data and/or primary data, according to an example embodiment. The graphical user interface 702 may be displayed in response to a user selecting a "PROTECT" menu option from the menu panel 626, and then selecting an "UNUSUAL ACTIVITY" sub-menu option.

In one embodiment, the graphical user interface 702 displays an unusual activity panel 704, where the unusual activity panel 704 displays unusual activity that has been detected for one or more of the client computing devices of the information management system 302. The information displayed in the unusual activity panel 704 may correspond to the unusual activity panel 612. The information shown in the unusual activity panel 704 may be obtained from one or more sources of information, such as the anomaly detection database 316 and/or the anomaly detection database 318.

As discussed above, the classifier 420 may have determined that a particular client computing device was exhibiting anomalous activity on a real-time or near real-time basis and reported such determination to the storage manager 304, or the classifier 520 may have determined that a particular client computing device was exhibiting anomalous activity based on comparison of sequential backups and reported such determination to the storage manager 304. Regardless of the specific implementation (e.g., real-time basis or a comparison of sequential backups, the information shown in the unusual activity panel 704 may be obtained from the anomaly detection database 316 and/or the anomaly detection database 318.

In one embodiment, the unusual activity panel displays a client table 706, where the client table 706 displays client computing devices within the information management system 302 that have been detected as demonstrating unusual or anomalous activity. The columns of the client table 706 may include, but are not limited to, a client name column 708, an anomaly type column 710, a created files column 712, a renamed files column 714, a deleted files column 716, a modified files column 718, and a detected time column 720. The client table 706 may also include graphical elements 722-724 which, when selected, cause a particular action to occur.

The client name column 708 displays the assigned names of client computing devices for which anomalous activity has been detected. As shown in FIG. 7, the client name column 708 displays two client names for client computing devices that have been reported as having anomalous or unusual activity, namely, "CVDV3N287" and "MABRIS." The names displayed in the client name column 708 may correspond to particular client computing devices, such as client computing device 306 and client computing device 308.

The anomaly type column 710 displays a determined anomaly type corresponding to the anomalous activity of a particular client computing device. In the example shown in FIG. 7, the client computing device named "CVDV3N287" was exhibiting behavior corresponding to "MANY FILES WERE DELETED AND MODIFIED" and the client computing device named "MABRIS" was exhibiting behavior corresponding to "MANY FILES WERE DELETED." The anomaly type populated in the anomaly type column 710 may have been previously determined by the classifier 420 and/or the classifier 520, where the determined anomaly type was then stored in the anomaly detection database 316 and/or the anomaly detection database 318.

The created files column 712 may indicate the number of files that were created in the time period in which the classifier 420 detected the anomaly or suspicious behavior. Similarly, the renamed files column 714, the deleted files column 716, and the modified files column 718 may each indicate, respectively, the number of files renamed, the number of files deleted, and the number of files modified during the time period in which the classifier 420 detected the anomaly or suspicious behavior. In the event that the values shown in each of the columns 712-718 were provided by the classifier 520, the values may represent the differences between sequential backups that were compared by the classifier 520. Regardless of whether the values were determined by the classifier 420 or the classifier 520, the values indicate the type of anomaly or suspicious behavior that was detected and reflect the anomaly type indicated in the anomaly type column 710.

The detected time column 720 indicates the time and/or date at which the anomalous or suspicious behavior by the client computing device was detected. The value of the detected time column 720 may correspond to the time and/or date at which one or more of the monitoring process(es) 418 first detected a particular activity (e.g., a file rename, a file deletion, a file modification, etc.), to the time and/or date at which the classifier 420 and/or the classifier 520 determined that the activity was anomalous, the time and/or date at which activity relating to one or more files was determined to be anomalous or suspicious, or any other similar time and/or date value. The detected time column 720 provides an approximate indication as to the time and/or date when the anomalous and/or suspicious activity was detected, and helps the user investigate the possible source of the malware and/or ransomware.

The unusual activity panel 704 also includes a first graphical element, namely a virtualization option 722, and a second graphical element, namely a clear option 724, that are selectable by a user of the graphical user interface 702. The virtualization option 722 allows a user to virtualize one or more of the client computing devices displayed in the client table 706. More particularly, a user may select a client computing device from a client name column 708, and then may select the virtualization option 722 to virtualize the selected client computing device. As discussed above, virtualizing a selected client computing device may include instantiating a virtual machine with virtual hardware similar to the selected client computing device, and then restoring a secondary copy of the primary data of the client computing device to the newly instantiated virtual machine. The process of virtualizing the client computing device may start when the user selects the virtualization option 722, and the virtual machine host 314 may inform the storage manager 304 when the virtual machine host 314 has instantiated the virtual machine, and has restored primary data to the instantiated virtual machine from a secondary copy managed by the secondary storage computing device 312.

The clear option 724 allows a user to reset and/or remove the anomalous behavior from the unusual activity panel 704. In one embodiment, selecting the clear option 724 instructs the storage manager 304 to indicate that anomalous activity associated with a currently selected client computing device (e.g., a client computing device selected from the client table 706) is not to be displayed in future displays of the unusual activity panel 704. In one embodiment, selecting a client computing device and then selecting the clear option 724 may instruct the storage manager 304 to flag or otherwise indicate in the anomaly detection database 316 that the currently displayed anomalous information associated with a selected client computing device is not to be displayed in the unusual activity panel 704. In another embodiment, selecting the clear option 724 may instruct the storage manager 304 to delete the anomalous information from the anomaly detection database 316 associated with the currently selected client computing device. This embodiment may result in the removal or deletion of the anomalous information stored in the anomaly detection database 316 associated with the selected client computing device, and thus, will not appear in future displays in the unusual activity panel 704. Furthermore, to clear the anomalous activity displayed in the unusual activity panel 704, the graphical user interface 702 may display a further prompt (not shown) requesting confirmation that the user wishes to proceed with the removal of the anomalous information.

Figure 8:
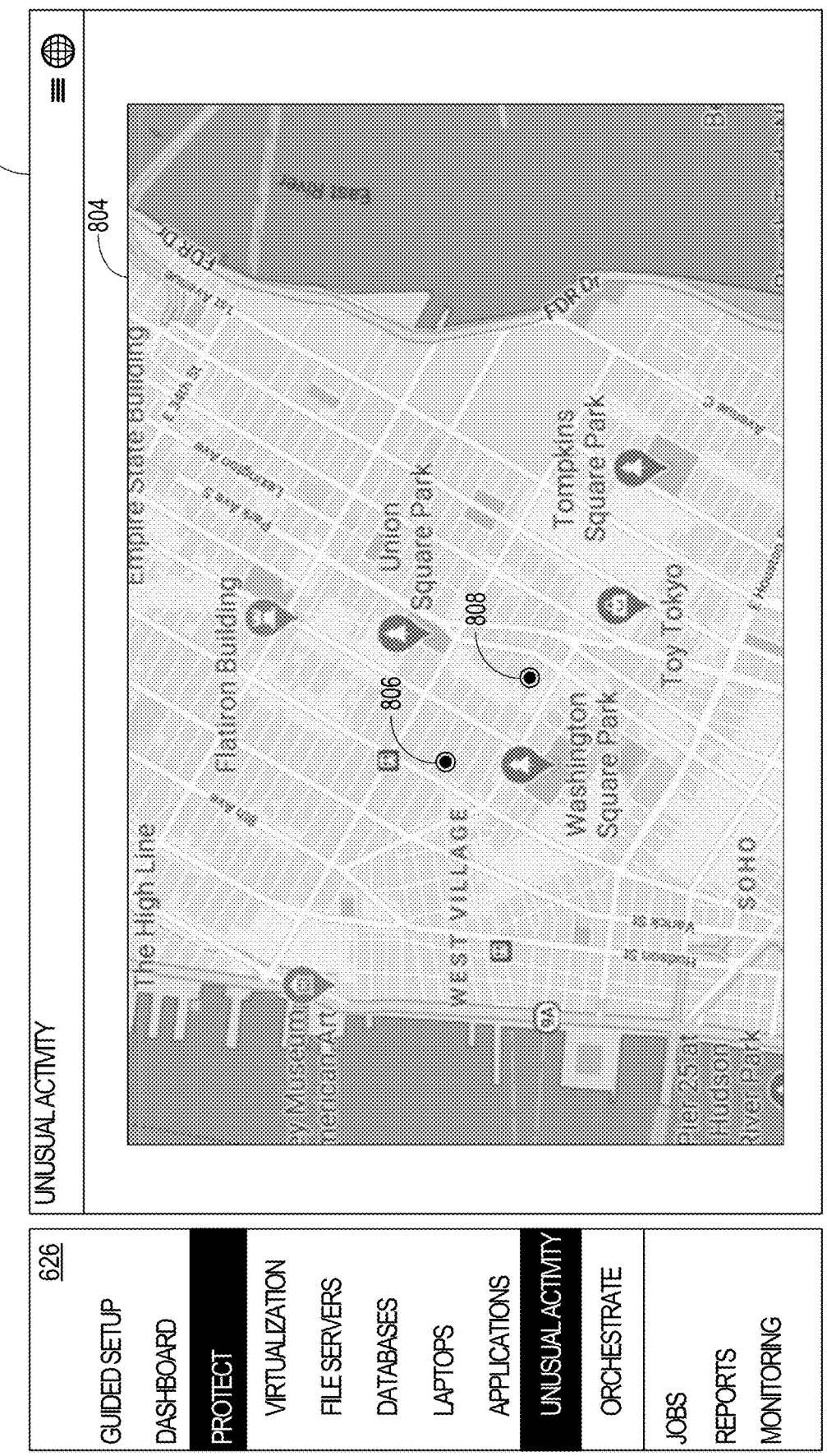
FIG. 8 illustrates a graphical user interface that displays a graphical map of the geographical locations of client computing devices having detected anomalies, according to an example embodiment.

FIG. 8 illustrates a graphical user interface 802 that displays a graphical map 804 of the geographical locations 806-808 of client computing devices having detected anomalies, according to an example embodiment. The graphical user interface 802 may be displayed in response to selecting one or more of the client computing devices from the unusual activity panel 704. In one embodiment, the graphical map 804 identifies approximate locations of the client computing devices that were determined to have unusual activity. As shown in FIG. 8, one client computing device is approximately located at a first geographical location 806 and another client computing device is approximately located at a second geographical location 808. The geographical locations of the client computing devices may be approximated based on information communicated by the client computing devices included, but not limited, to a set of Global Positioning System (GPS) coordinates, one or more Internet Protocol (IP) addresses that have been geo-located, one or more wired and/or wireless networks that are known to be associated with a particular geographical location, or other such information. By showing the geographical locations of which client computing devices are experiencing unusual activity, an administrator or operator of the information management system 302 can better understand whether a malware and/or ransomware has affected a particular set of client computing devices (e.g., a particular geographical region) and, if such client computing devices are affected, whether the impact of the malware and/or ransomware has spread to other client computing devices in other geographical locations (e.g., other states, other countries, other provinces, other cities, etc.). Understanding the scope of the impact using the graphical map 804 can help the operator or administrator of the information management system 302 better plan a solution for addressing the spread and/or impact of the malware and/or ransomware.

FIG. 9 illustrates a graphical user interface 902 displaying specific anomaly detection information for a particular client computing device, according to an example embodiment. The graphical user interface 902 may display an activity summary panel 904 and an affected folders panel 906. With reference to FIG. 7, the graphical user interface 902 may be displayed in response to selecting one or more of the client computing devices displayed in the client table 706. Although shown as occupying a predominant portion of the graphical user interface 902, the activity summary panel 904 may be shown overlaid the client table 706 or as a sidebar menu similar to the manner in which the menu panel 626 is displayed.

The activity summary panel 904 displays an activity summary for the unusual activity and/or suspicious activity for a selecting client computing device. As shown in FIG. 8, the activity summary panel 904 may display information similar to the information shown in the client table 706. For example, the activity summary panel 904 may display an anomaly type (e.g., "MANY FILES WERE DELETED"), a number of renamed files (e.g., "80"), a number of modified files ("800"), a number of created files ("81"), a number of deleted files ("8000"), and a detected time (e.g., "NOV. 21, 2020 02:01:35 AM"). The values displayed in the activity summary panel 904 may be provided by the same source of information that populated the client table 706, such as the storage manager 304, the anomaly detection database 316, the anomaly detection database 318, or combinations thereof.

The affected folders panel 906 displays more granular information than the information displayed in the activity summary panel 904. More particularly, the affected folders panel 906 may include a path sub-panel 906A and a files sub-panel 906B. The path sub-panel 906A displays the affected folders and/or directories of the selected client computing device associated with the anomaly type shown in the activity summary panel 904. In one embodiment, the folders and/or directories displayed in the path sub-panel 906A may include folders and/or directories where an activity occurred, whether the activity was a file renaming, a file modification, a file creation, or a file deletion. In another embodiment, the folders and/or directories displayed in the path sub-panel 906A include only those folders and/or directories that were affected by the identified anomaly type. As an example, in this alternative embodiment, if the identified anomaly type was "MANY FILES WERE DELETED," the path sub-panel 906A displays only those folders and/or directories where a file deletion occurred.

In one embodiment, the path sub-panel 906A displays a predetermined number of folders and/or directories (e.g., four, five, and/or six folders and/or directories). Where the number of affected folders and/or directories is greater than the predetermined number, the path sub-panel 906A may be scrollable or may be expanded to display any additional folders and/or sub-directories that were affected. Furthermore, the predetermined number may initially have a default value (e.g., four, five, six, etc.), where the administrator and/or operator of the information management system 302 may then change the predetermined number.

The files sub-panel 906B shows the number of affected files for a corresponding folder or directory shown in the path sub-panel 906A, where the number corresponds to one or more of the activities shown in the activity summary panel 904. In one embodiment, the number of affected files displays comprises a value representing a summation of all the files within a particular folder or directory associated with one or more activities. As an example, in this embodiment, the value of "2415" shown in the files sub-panel 906B may indicate that 2415 files were renamed, modified, created, and/or deleted. In another embodiment, the number of affected files comprises a value representing only those files that were affected by a particular activity. As an example, in this embodiment, the value of "2415" shown in the files sub-panel 906B may indicate that 2415 files in the folder or directory were deleted (e.g., the activity that corresponds to the detected activity of "MANY FILES WERE DELETED"). As another example, if the detected or determined activity was "MANY FILES WERE RENAMED," the value of 2415 may represent that 2415 files were renamed within a particular folder or directory. In this manner, the graphical user interface 902 can provide detailed information about specific files and/or folders for a selected client computing device, which can assist in the administrator or operator of the information management system 302 in developing a solution to address the potential malware and/or ransomware.

Figure 10A:
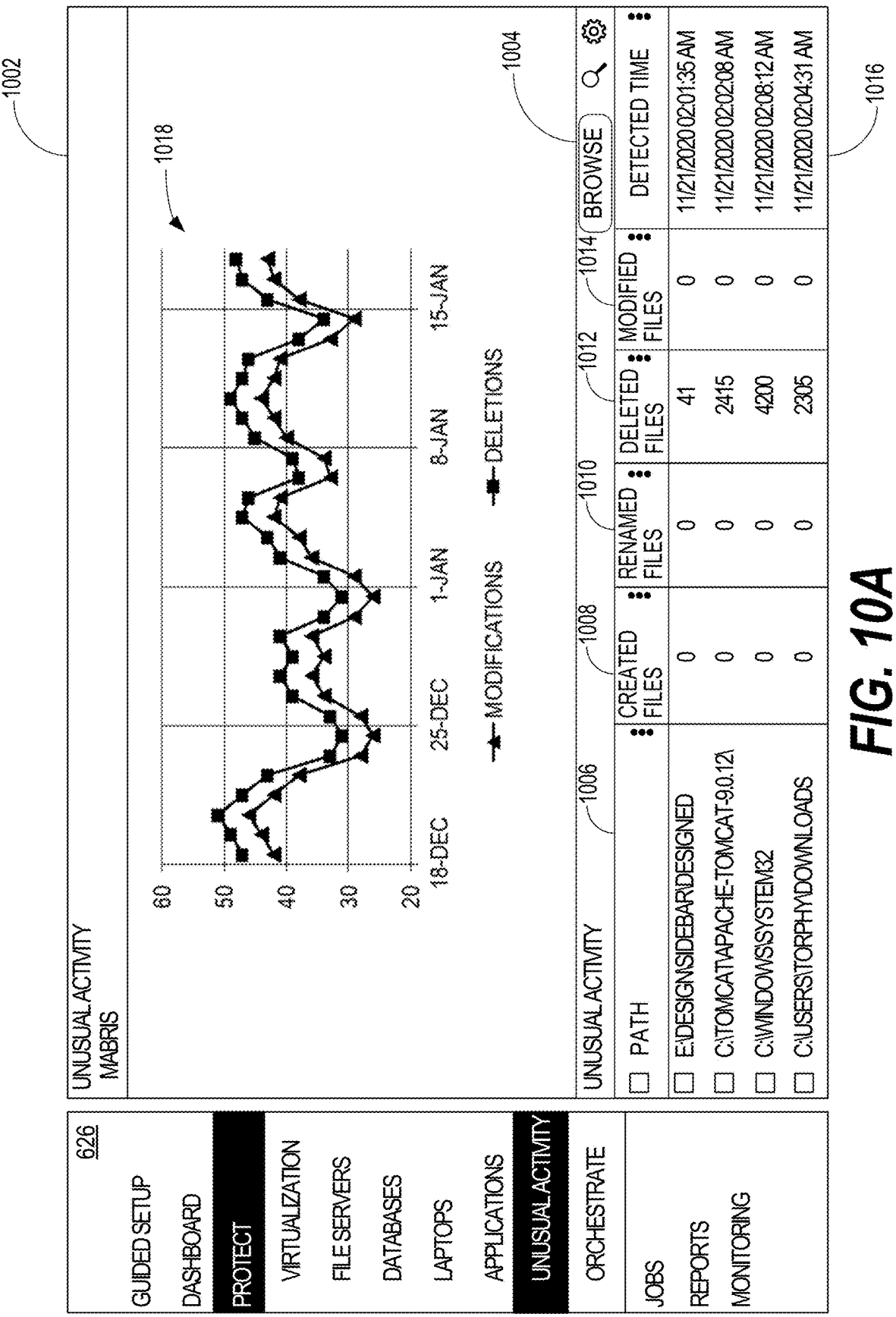
FIGS. 10A-10B illustrate a graphical user interface that display graphs of detected changes in a particular client computing device, according to example embodiments.
Figure 10B:
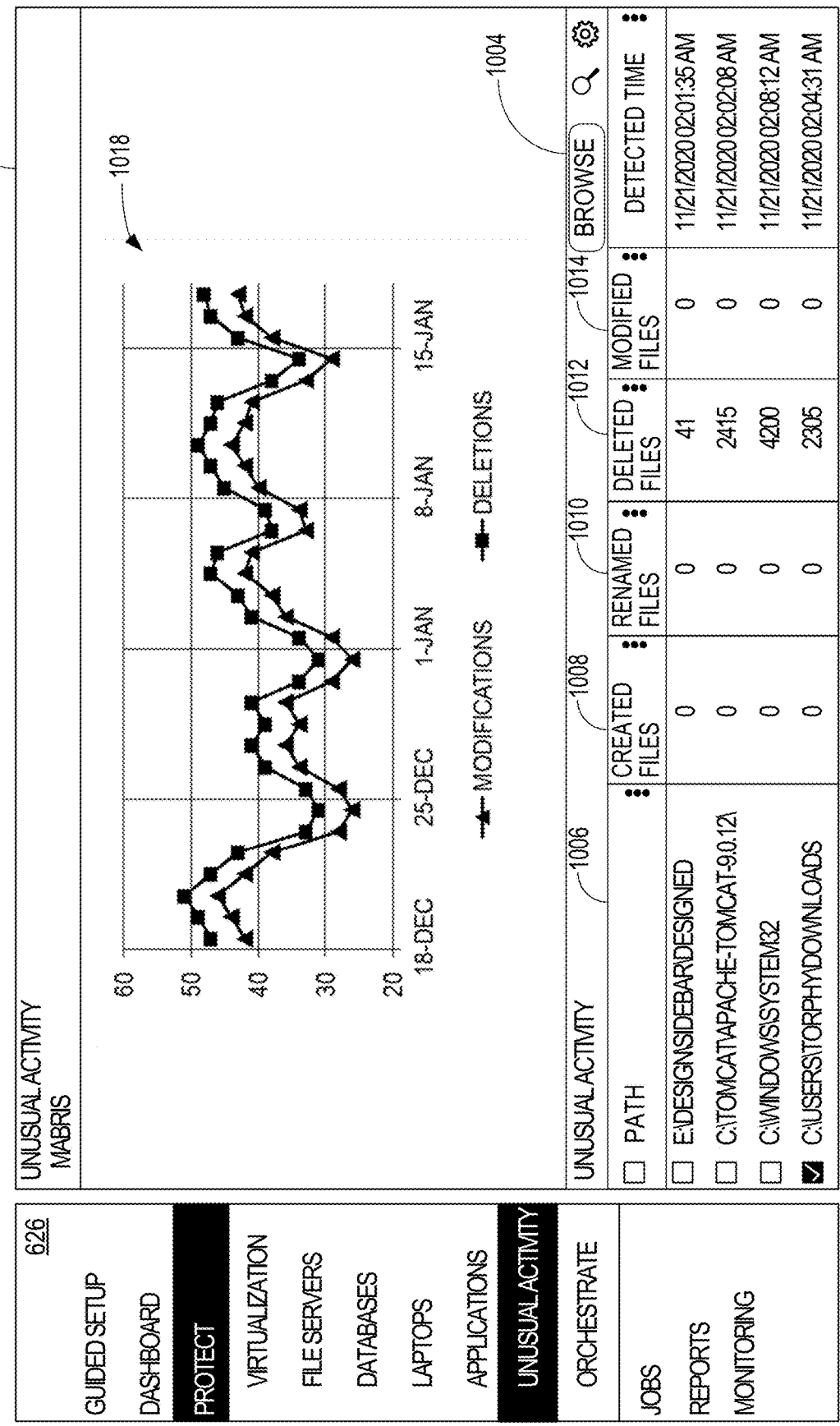

FIGS. 10A-10B illustrate a graphical user interface 1002 that display graphs of detected changes in a particular client computing device, according to example embodiments. In one embodiment, the graphical user interface 1002 displays a graph 1018 of activity for the particular client computing device, and an unusual activity table 1004 that displays activity information for particular files and/or directories that were affected by the detected or determined activity.

Referring first to the graph 1018, the graph 1018 may display the number of files that were affected by one or more activities over a predetermined period of time within one or more folders or directories. For example, the graph 1018 may be configured to display a graph of activities over a selectable period of time, where the selectable period of time is selectable and/or configurable by an administrator or operator of the information management system 302. The period of time may be selected from one or more values including, but not limited to, a day (e.g., a 24-hour time period), a week, a month, six months, a year, and so forth. The period of time may also include incremental or configurable values, such that the administrator or operator may input any increment of time (e.g., three days), which would then be displayed in the graph 1018.

Each line of the graph 1018 may be associated with a particular activity that occurred with the selected client computing device. As shown in FIG. 10A, a first line of the graph 1018 is associated with modifications to the files of the client computing device, and a second line of the graph 1018 is associated with deletions of files of the client computing device. In addition, each point on each line of the graph 1018 may represent an activity for folder or directory accessible by the client computing device. The values displayed in the graph 1018 may be provided by one or more sources of information including, but not limited to, the storage manager 304, the anomaly detection database 316, the anomaly detection database 318, or combinations thereof.

The unusual activity table 1004 of the graphical user interface 1002 may show the folders or directories of a selected computing device that were affected by a particular activity and the number of files within a folder or directory that were affected by a particular activity. In one embodiment, the unusual activity table 1004 includes five columns such as a path column 1006, a created files column 1008, a renamed files column 1010, a deleted files column 1012, a modified files column 1014, and a detected time column 1016. The values of each of the columns 1008-1014 may be similar to the values displayed in the files sub-panel 906B. Using the path column 1006, a user of the graphical user interface 1002 may select a particular folder or directory to browse and/or explore (discussed with reference to FIGS. 11A-11B), which allows the user to restore and/or download a particular file or directory that was affected by the detected activity.

FIG. 10B also illustrates the graphical user interface 1002, where a user has selected a particular folder or directory to browse and explore. As shown in FIG. 10B, a single directory has been selected but, in another examples, a user may select multiple folders or directories to browse and/or explore. By selecting a selectable option in the unusual activity table 1004, labeled "BROWSE" in FIG. 10B, a user of the graphical user interface 1002 may browse and/or explore the selected one or more folders or directories.

Figure 11A:
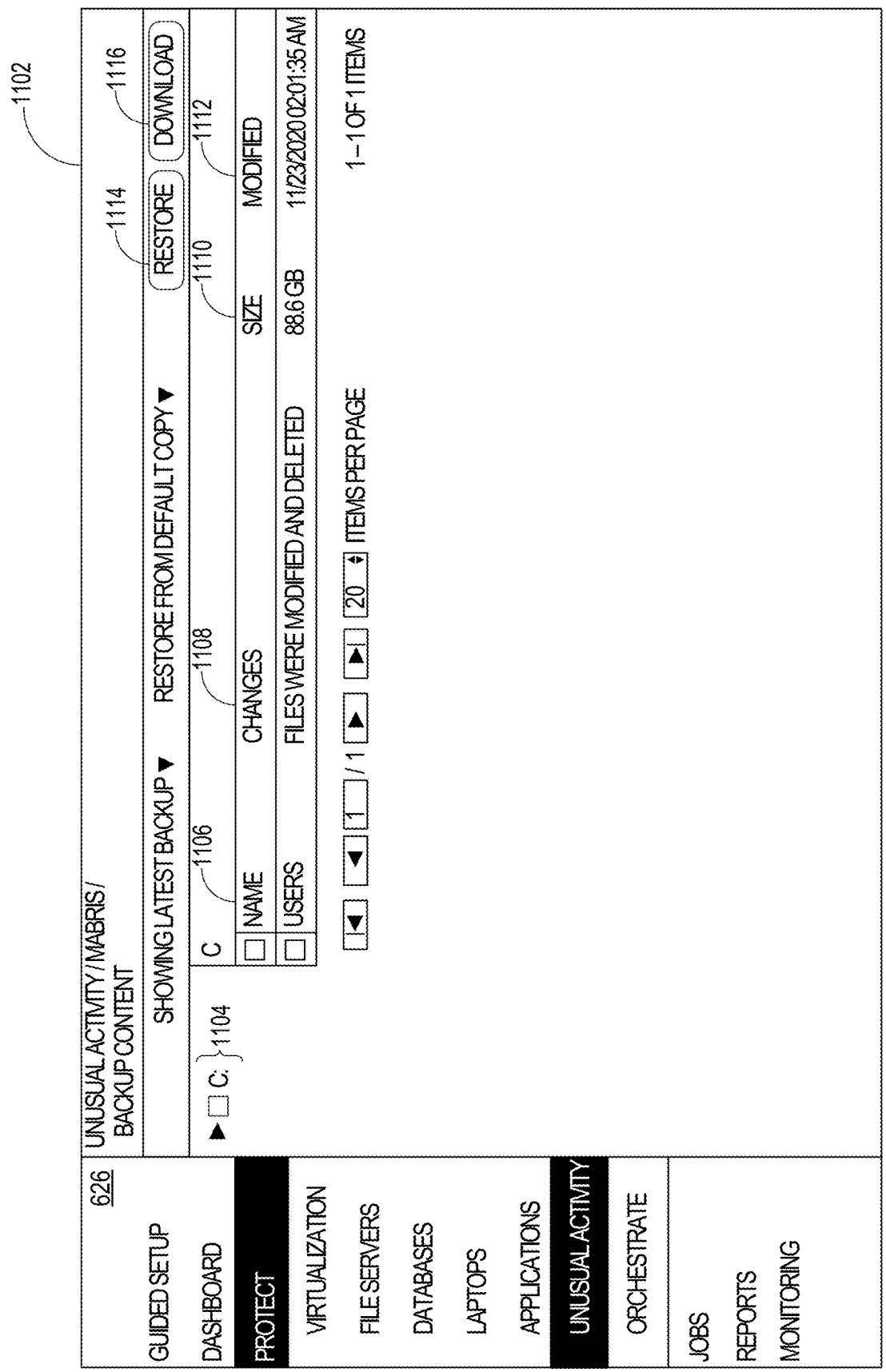
FIGS. 11A-11B illustrate graphical user interfaces that display file system information for a client computing device, according to an example embodiment.
Figure 11B:
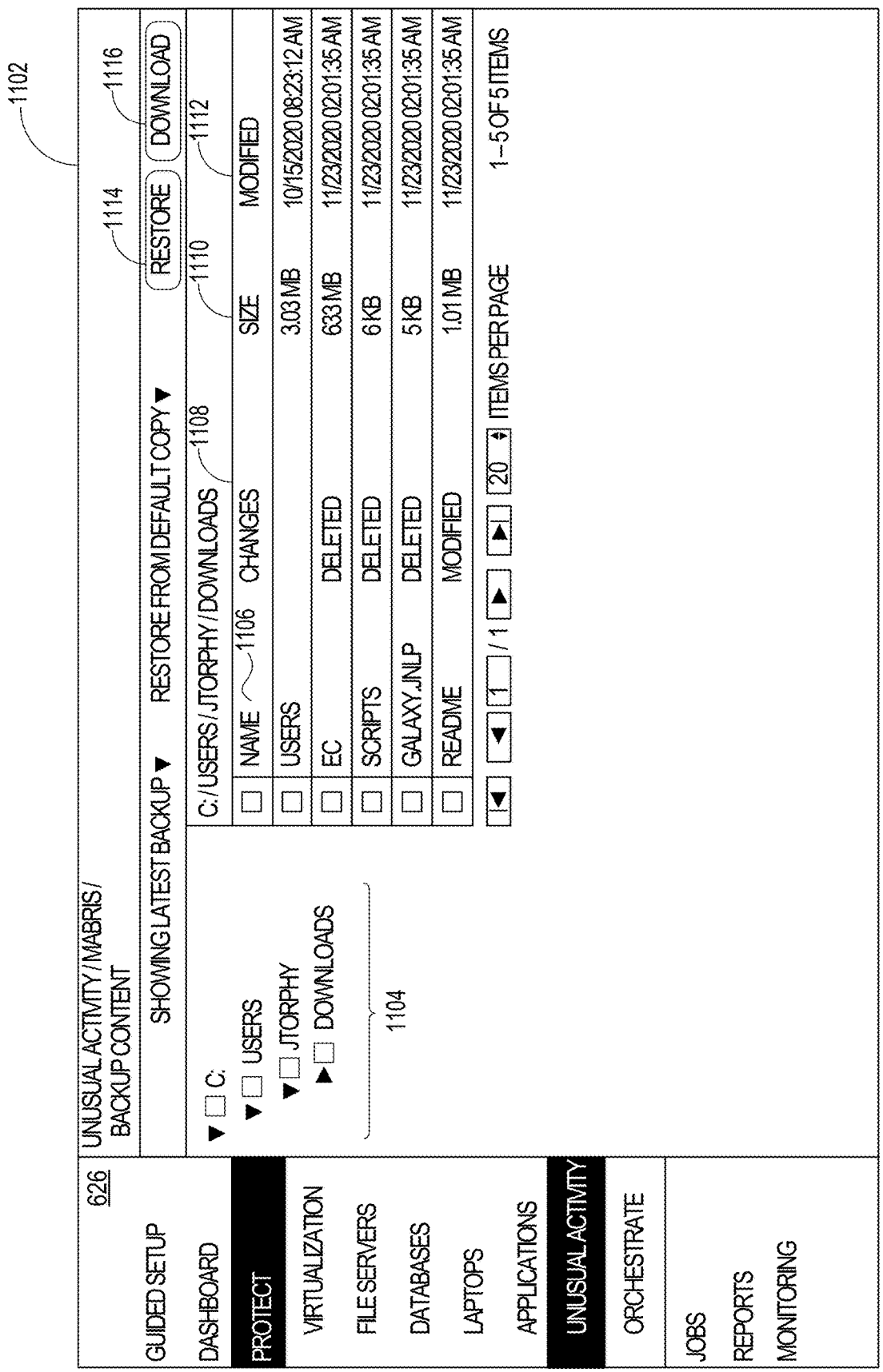

FIGS. 11A-11B illustrate a graphical user interface 1102 that is displayed in response to selecting the "BROWSE" selectable option of FIGS. 10A-10B, according to an example embodiment. In one embodiment, the graphical user interface 1102 displays a directory structure 1104 of a selected directory of a client computing device. The directory structure 1104 displays a directory hierarchy of a folder or directory structure of the client computing device. The directory structure 1104 may initially display a root directory for the selected folder or directory, where the directory structure 1104 includes a graphical element (e.g., an arrow, button, addition symbol, etc.), that allows the user to expand and traverse the directory corresponding to the directory structure 1104. An example of expanding the directory structure 1104 is discussed with reference to FIG. 11B.

Furthermore, the directory structure 1104 may include one or more directories that have been backed up to a secondary storage device. The graphical user interface 1102 may be configured to display one or more versions of a backed up file and/or directory. In one embodiment, the graphical user interface 1102 displays a most recent backup of the selected directory of the client computing device. A user knows that the graphical user interface 1102 is displaying a most recent backup because the graphical user interface 1102 is labeled with "SHOWING LATEST BACKUP." Further still, a user may select another backup stored in the secondary storage device to view and/or restore by interacting with the graphical user interface 1102. For example, a user interacting with the graphical user interface 1102 may view a backup of a file and/or directory the client computing device from one version prior to the current version, two versions prior to the current version, and so forth. In this fashion, a user may view prior backups of files and/or directories of the client computing device that occurred earlier in time, and may have been created prior to the current backup of the files and/or directories of the client computing device.

The graphical user interface 1102 also displays several columns 1106-1112 that identify the changes and/or activities detected by the monitoring process(es) 418 and/or determined by the classifier 420 or classifier 520. In one embodiment, the columns 1106-1112 include a name column 1106, a change column 1108, a size column 1110, and a modification date column 1112. Additional or alternative columns may be displayed, such as a permission column that displays the file permissions for a particular file or directory permissions for a particular directory, an ownership column that displays the data owner for a particular file or directory, and other such columns or combinations thereof. The columns 1106-1112 that are displayed may be configurable by the administrator and/or operator of the information management system 302.

The name column 1106 displays the name of a directory or file affected by a detected activity. As shown in FIG. 11A, the name column 1106 displays a directory named "USERS" that is present in the directory structure 1104. The change column 1108 identifies the changes that were determined and/or detected by the monitoring process(es) 418, the classifier 420, and/or the classifier 520. In FIG. 11A, the change column 1108 indicates that there were files modified and/or deleted within the directory named "USERS". The size column 1110 indicates a size of a corresponding directory named in the name column 1106. Finally, the modification date column 1112 indicates the time and/or date on which the corresponding directory in the name column 1106 was modified. The values for each of the columns may be obtained from one or more sources of information including, but not limited to, the storage manager 304, the anomaly detection database 316, and/or the anomaly detection database 318.

The graphical user interface 1102 also includes two graphical elements 1114-1116, namely, a restore option 1114 and a download option 1116. The restore option 114 allows a user of the graphical user interface 1102 to restore a selected file or directory to the corresponding client computing device. In one embodiment, selecting the restore option 1114 causes the storage manager 304 to instruct the secondary storage computing device 312 to restore a secondary copy of the selected file or directory from a secondary storage device (not shown). In addition, if there more than one secondary copies of the selected file or directory stored in the secondary storage device (e.g. various backups of the selected file or directory made at various times), the storage manager 304 may instruct the secondary storage computing device 312 to provide a listing of the secondary copies, and the user of the graphical user interface 1102 may then select which of the secondary copies to restore to the corresponding client computing device.

The download option 1116 allows a user of the graphical user interface 1102 to download a secondary copy of the selected file or directory. In contrast to the restore option 1114, the download option 1116 may cause a secondary copy of the selected file or directory to be downloaded to the device being used by the user to display the graphical user interface 1102 rather than restore to the selected file or directory to the corresponding client computing device. The download option 1116 may be preferable where the user prefers not to restore the selected file or directory to the client computing device, but still wants to obtain a copy of the selected file or directory.

FIG. 11B further illustrates the graphical user interface 1102 of FIG. 11A where the directory structure 1104 has been expanded, according to an example embodiment. In the illustration shown in FIG. 11B, a user has expanded the directory structure 1104 to a sub-directory named "DOWNLOADS". A user may understand that the "DOWNLOADS" directory is a sub-directory because it appears indented and underneath another directory named "JTORPHY," which is a sub-directory of the directory named "USERS." The name column 1106 indicates that several files within the "DOWNLOADS" sub-directory were deleted, such as a file named "EC," a file named "SCRIPTS," a file named "GALAXY.JNLP," and a file named "README". By selecting one or more of the files and/or directories shown in the name column 1106, a user may use the restore option 1114 to restore one or more of the selected files or directories. The selected files and/or directories may be restored to the client computing device. Similarly, by selecting one or more of the files and/or directories shown in the name column 1106, a user may use the download option 1116 to download one or more of the selected files and/or directories. Using the download option 1116, a user may download the selected files and/or directories to a location and/or device other than the client computing device from which from the secondary copies were created. Using the download option 1116 may be preferred over using the restore option 1114 in cases where the client computing device from which the secondary copies were made is not available or the client computing device has become comprised (e.g., infected with malware and/or ransomware).

Figure 12A:
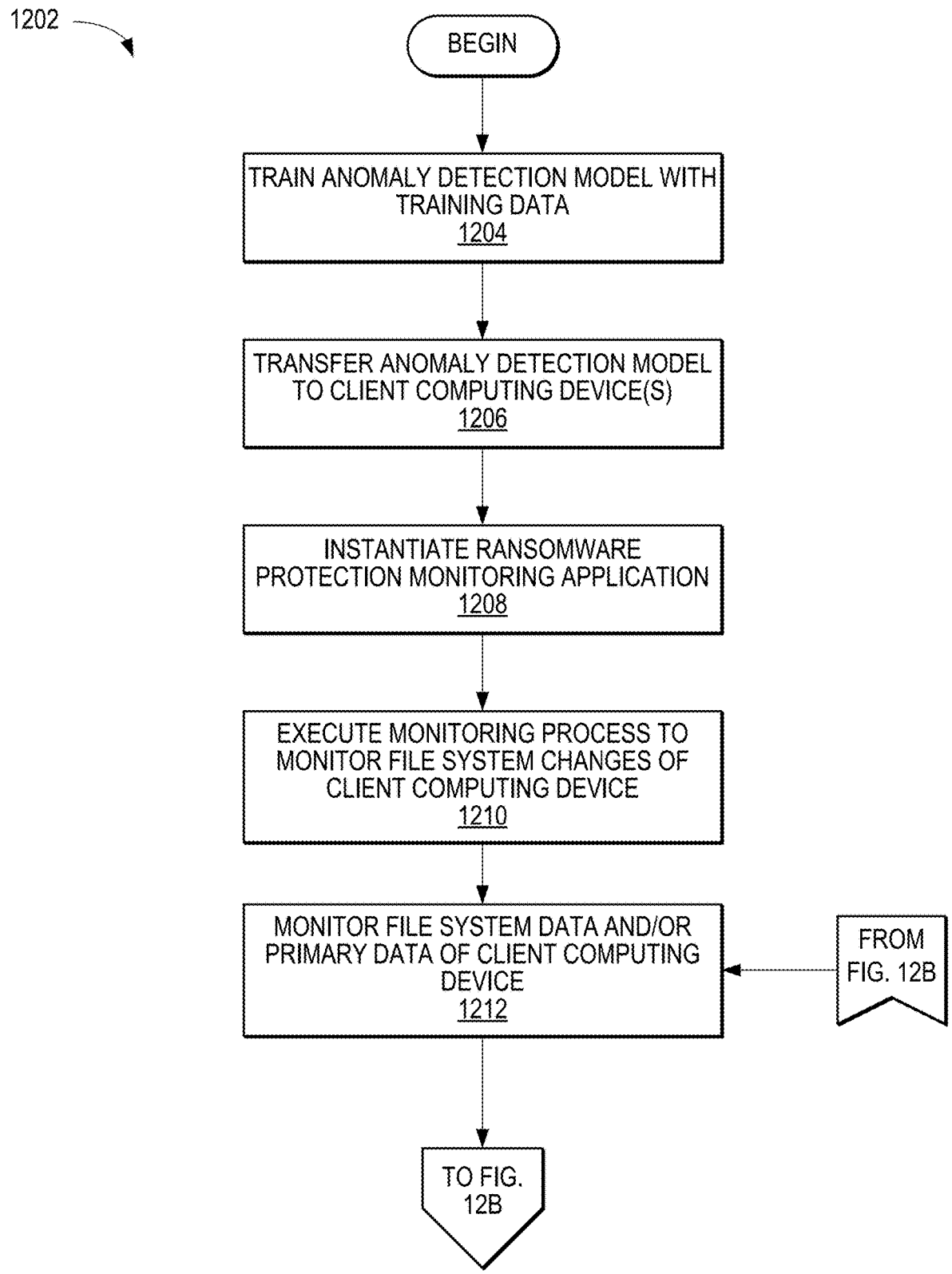
FIGS. 12A-12C illustrate a method, in accordance with an example embodiment, for monitoring file system data and/or primary data of a client computing device for potential anomalies in the file system data and/or primary data on a real-time or near real-time basis.
Figure 12B:
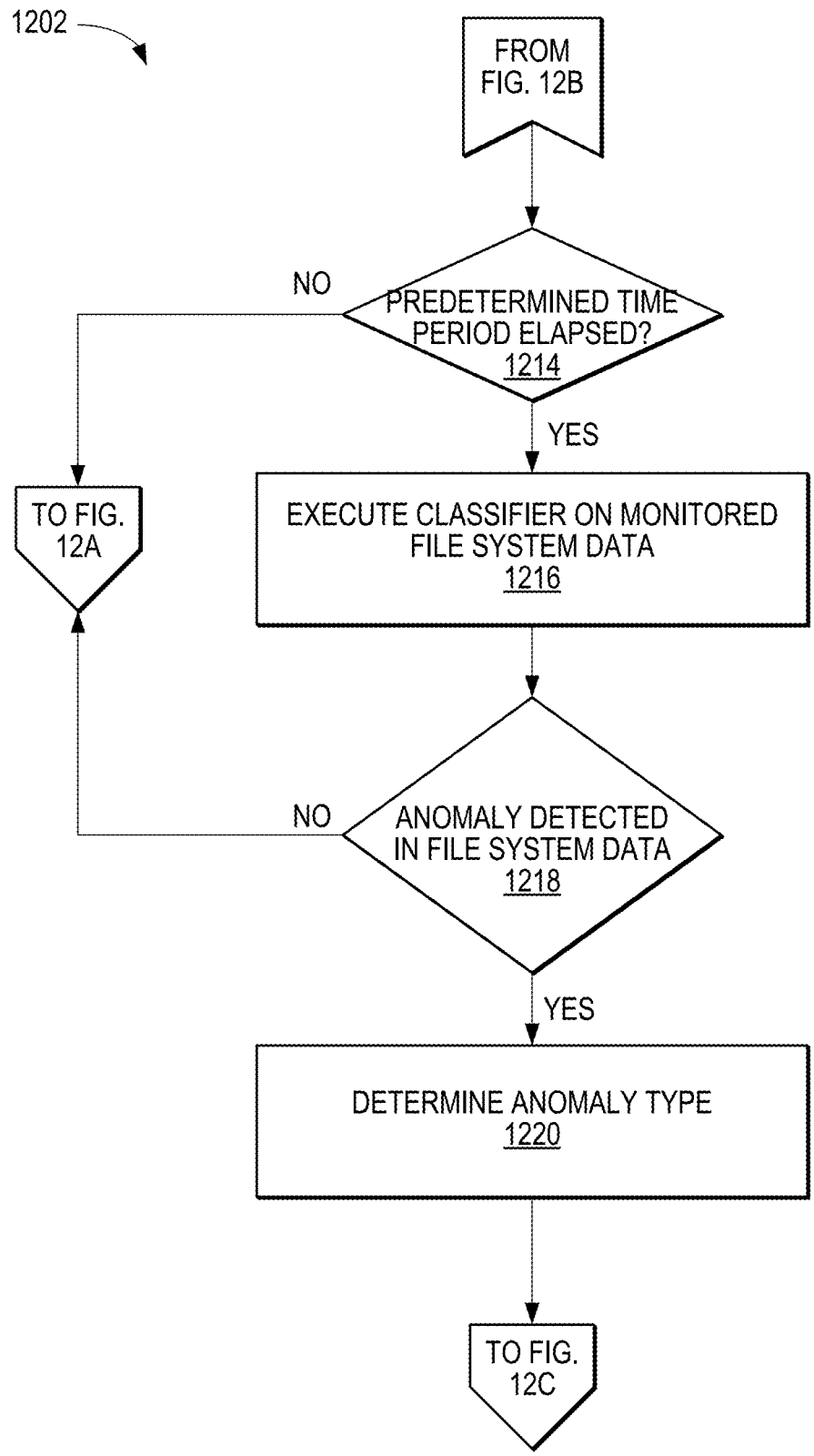
Figure 12C:
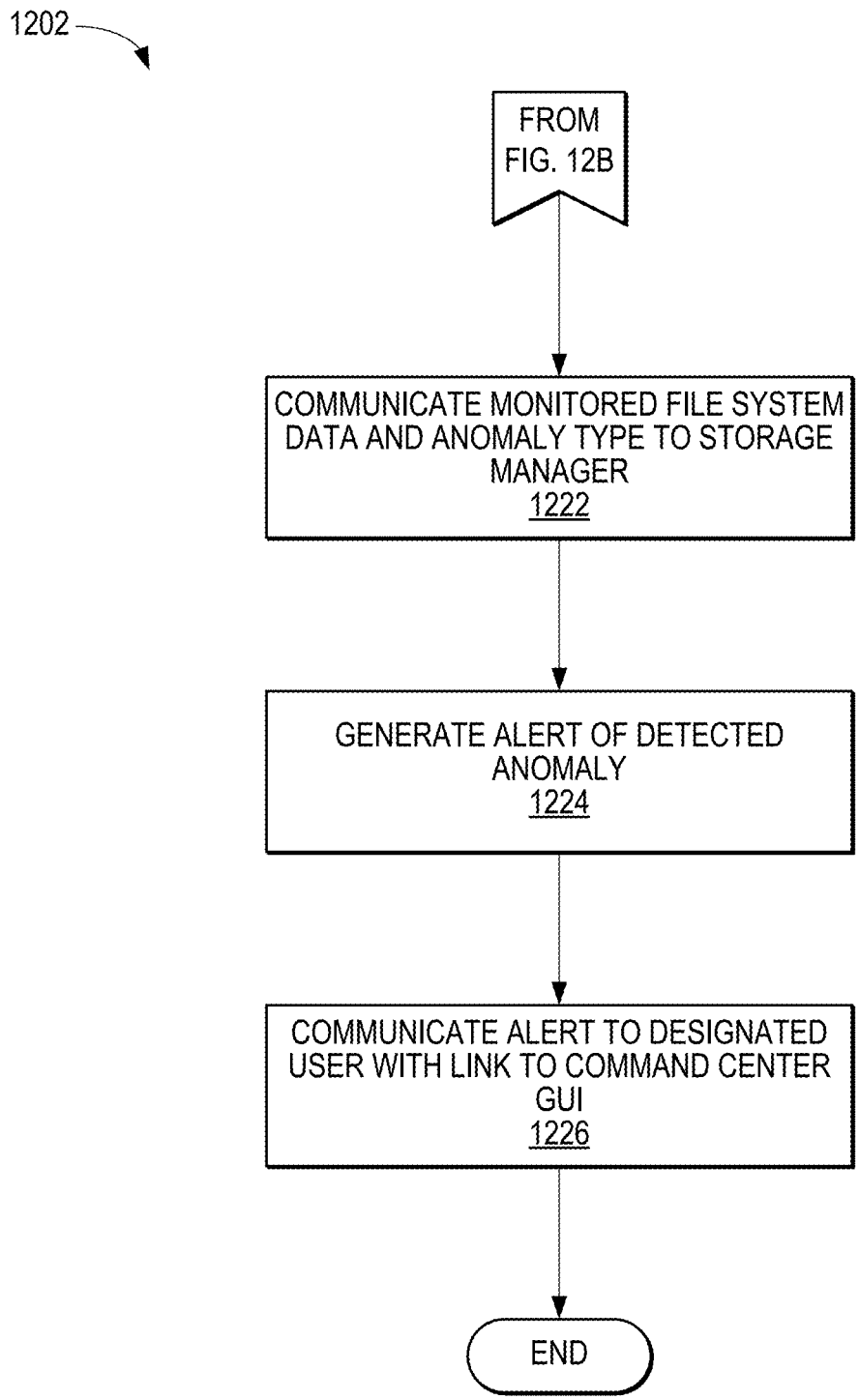

FIGS. 12A-12C illustrate a method 1202, in accordance with an example embodiment, for monitoring file system data and/or primary data of a client computing device for potential anomalies in the file system data and/or primary data on a real-time or near real-time basis. The method 1202 may be implemented by one or more of the devices and/or components illustrated in FIGS. 3-5. FIGS. 12A-12C are discussed relative to the client computing device 306, but one of ordinary skill in the art will appreciate that the below discussion may also be applied to other devices within the information management system 302 including, but not limited to, the storage manager 304, the secondary storage computing device 312, the virtual machine host 314, and any one of the virtual machines 326-330.

Referring initially to FIG. 12A, the anomaly detection model may be trained using one or more sets of training data (Operation 1204). The anomaly detection model may be trained by the storage manager 304 or it may be trained by another computing device in communication with the information management system 302. As discussed previously, the training data for training the anomaly detection model may include a labeled training data set, where the labeled training data set indicates which types of modifications and/or changes are from the innocuous or normal operation of a client computing device, and which types of modifications and/or changes are from the operation of malware and/or ransomware. The training of the anomaly detection model may occur using various types of data, various types of modifications, over one or more different time periods, and so forth. Furthermore, different types of training data sets may be used for different anomaly detection models, depending on whether the anomaly detection model is for evaluating modifications and/or changes on a client computing device that are occurring in real-time or near real-time, or for evaluating modifications and/or changes between backup copies of primary data of the client computing device. By using different types of training data sets, different types of anomaly detection models can be developed and deployed to different devices throughout the information management system 302.

After training, the anomaly detection model may then be transferred to a client computing device (e.g., client computing device 306) (Operation 1206). The storage manager 304 may "push" (e.g., initiate a transfer of) the anomaly detection model to the client computing device 306, where the client computing device 306 stores the anomaly detection model as the anomaly detection model 422. In addition, the storage manager 304 may push the RPMA 416 to the client computing device 306 at or about the same time as the storage manager 304 transfers the anomaly detection model 422 to the client computing device 306. Furthermore, the storage manager 304 may provide ransomware protection configuration data 426 to the client computing device 306 that configures the RPMA 416 to monitor the client computing device 306 and/or detect malware and/or ransomware that may have infected it. In other instances, a user or operator of the client computing device 306 may download and/or install the RPMA 416 and/or the anomaly detection model 422 on the client computing device 306.

After the anomaly detection model 422 and/or the RPMA 416 are installed on the client computing device 306, the client computing device 306 instantiates the RPMA 416 to protect the client computing device 306 from modifications and/or changes by malware and/or ransomware (Operation 1208). Once instantiated, the RPMA 416 may initiate one or more monitoring process(es) 418 to monitor for changes and/or modifications to the file system data 424 and/or primary data 428 (Operation 1210). After executing the one or more monitoring process(es) 418, the monitoring process(es) 418 monitor the client computing device 206 according to the ransomware protection configuration data 426 (Operation 1212), which may include monitoring the file system data 424 and/or the primary data 428.

In one embodiment, the monitoring process(es) 418 monitor for changes to the client computing device 306 according to a predetermined time period. Referring to FIG. 12B, the RPMA 416 determines whether that time period has elapsed (Operation 1214). Where the RPMA 416 determines that the time period has elapsed (e.g., the "YES" branch of Operation 1214), the method 1202 proceeds to Operation 1216. Where the RPMA 416 determines that the time period has not elapsed (e.g., the "NO" branch of Operation 1216), the method 1202 may return to Operation 1212 of FIG. 12A, where the monitoring process(es) 418 continue to monitor for changes to the file system data 424 and/or primary data 428.

With regard to Operation 1216, the classifier 420 may determine whether the changes and/or modifications detected by the monitoring process(es) 418 represent anomalous behavior. For example, the monitoring process(es) 418 may record the detected modifications and/or changes to the client computing device 306 in one or more data structures, and the classifier 420 may read from these data structures to obtain the recorded modifications and/or changes. Using the detected modifications and/or changes to the client computing device 306, the classifier 420 may reference the anomaly detection model 422 to determine whether the detected modifications and/or changes represent anomalous and/or malicious behavior (Operation 1218).

Where the classifier 420 determines that anomalous behavior is occurring and/or has occurred (e.g., the "YES" branch of Operation 1218), the method 1202 proceeds to Operation 1220, where the anomaly detection model 422 provides an indication or output of the type of anomalous behavior that was detected. Where the classifier 420 determines that anomalous behavior did not occur (e.g., the "NO" branch of Operation 1218), the method 1202 returns to Operation 1212 of FIG. 12A, where the monitoring process(es) 418 continue to monitor for changes to the file system data 424 and/or primary data 428.

At Operation 1220, the classifier 420 determines the type of anomalous behavior that occurred and/or is occurring (Operation 1220). As previously discussed with regard to FIG. 4, the classifier 420 may output a value indicating the type of behavior that was detected.

Turning to FIG. 12C, the RPMA 416 may then communicate the detected changes and/or modifications and the determined anomaly type to the storage manager 304 (Operation 1222). In one embodiment, the storage manager 304 stores this information in the anomaly detection database 316, where this information may be later retrieved in displaying one or more of the graphical user interfaces discussed with reference to FIGS. 6-10B. Further still, depending on the type of anomaly detected, the storage manager 304 may automatically initiate virtualization of the client computing device in which the anomaly was detected (e.g., via the virtual machine host 314), and then place the affected client computing device into an offline state or prohibit the affected client computing device from being part of the information management system 302 (e.g., by placing the media access control address of the affected client computing device on a blacklist). As shown in FIG. 12C, the storage manager 304 may further generate an alert of the detected anomaly (Operation 1224), and the alert may be communicated to the operator and/or administrator of the information management system 302 via one or more communication channels (e.g., SMS, e-mail, phone call, etc.). Where the generated alert is communicated via SMS and/or e-mail, the generated alert may further include a hyperlink to web-based command center (e.g., the software illustrated in FIGS. 6-10B), where the administrator and/or operator can learn more about the detected anomaly and take remedial measures on the affected data (Operation 1226).

Figure 13A:
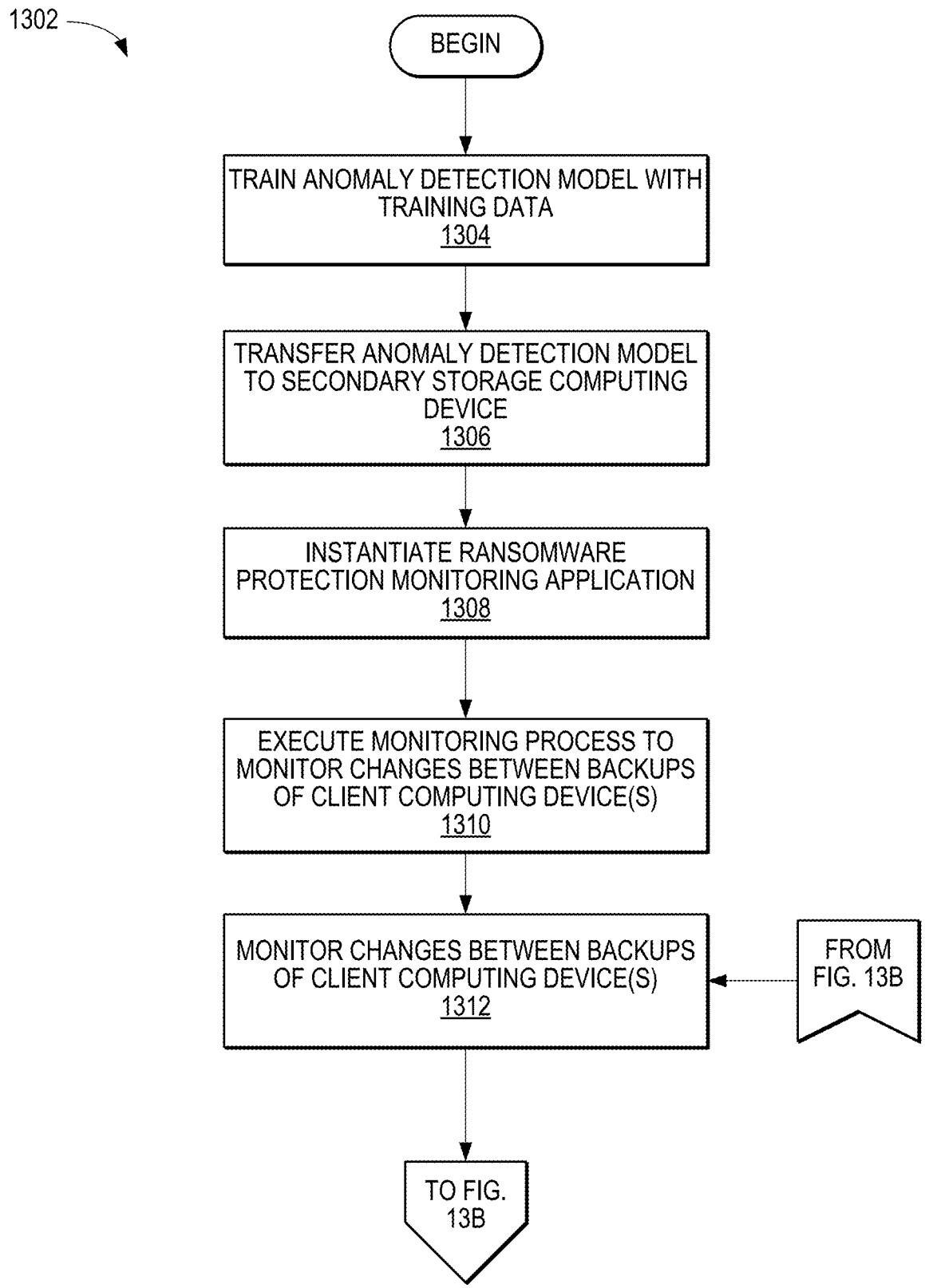
FIGS. 13A-13C illustrate a method, in accordance with an example embodiment, for determining whether file system anomalies exist between backups of a client computing device.
Figure 13B:
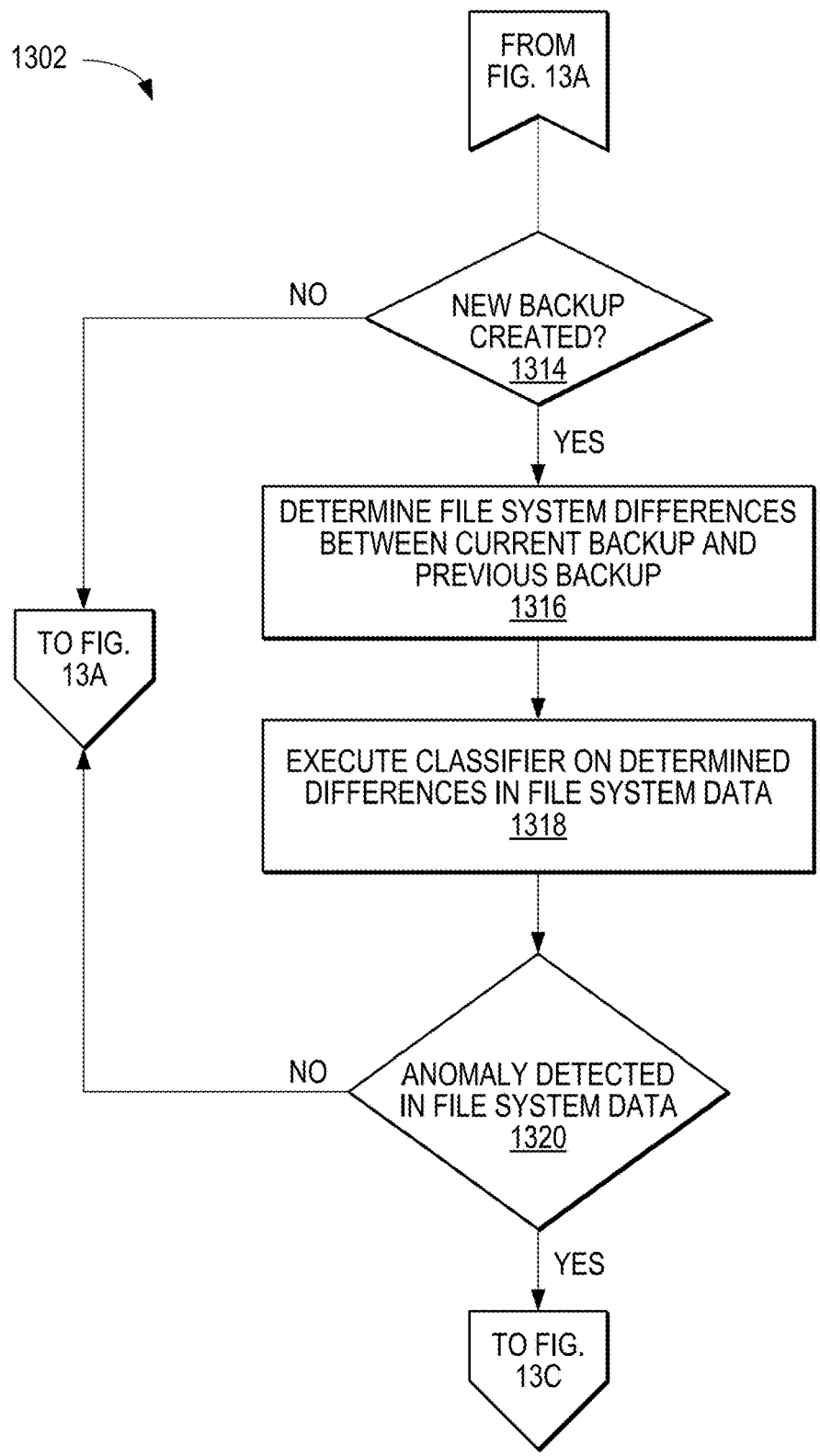
Figure 13C:
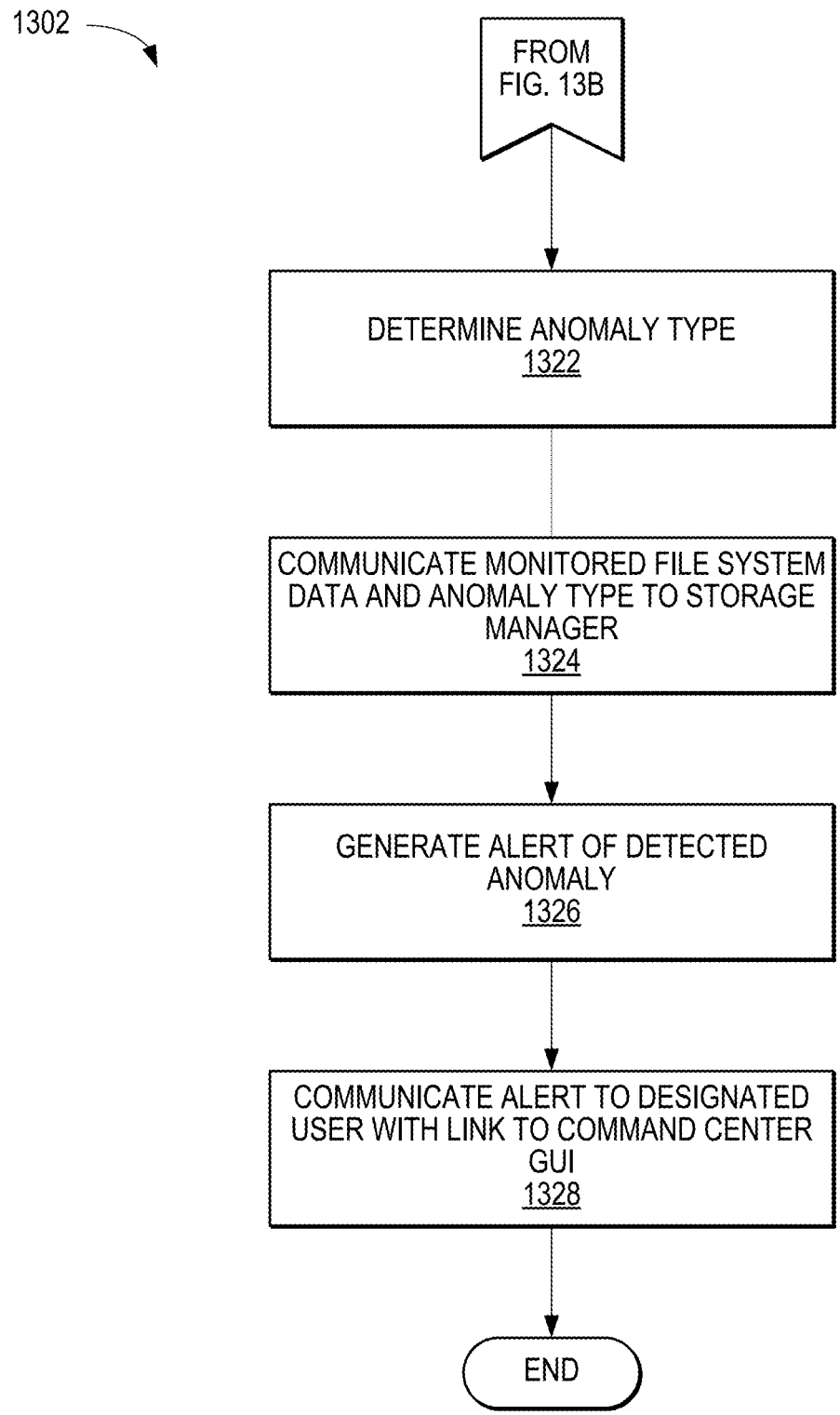

FIGS. 13A-13C illustrate a method 1302, in accordance with an example embodiment, for determining whether file system anomalies exist between backups of a client computing device (e.g., client computing device 306). The method 1302 may be implemented by one or more of the devices and/or components illustrated in FIGS. 3-5. FIGS. 13A-13C are discussed relative to the secondary storage computing device 312, but one of ordinary skill in the art will appreciate that the below discussion may also be applied to other devices within the information management system 302 including, but not limited to, the storage manager 304, one or more of the client computing devices 306-310, the virtual machine host 314, and any one of the virtual machines 326-330.

Referring initially to FIG. 13A, the anomaly detection model may be trained using one or more sets of training data (Operation 1304). The anomaly detection model may be trained by the storage manager 304 or it may be trained by another computing device in communication with the information management system 302. As discussed previously, the training data for training the anomaly detection model may include a labeled training data set, where the labeled training data set indicates which types of modifications and/or changes are from the innocuous or normal operation of a client computing device, and which types of modifications and/or changes are from the operation of malware and/or ransomware. The training of the anomaly detection model may occur using various types of data, various types of modifications, over one or more different time periods, and so forth. Furthermore, different types of training data sets may be used for different anomaly detection models, depending on whether the anomaly detection model is for evaluating modifications and/or changes on a client computing device that are occurring in real-time or near real-time, or for evaluating modifications and/or changes between backup copies of primary data of the client computing device. By using different types of training data sets, different types of anomaly detection models can be developed and deployed to different devices throughout the information management system 302.

After training, the anomaly detection model may then be transferred to a secondary storage computing device (e.g., secondary storage computing device 312) (Operation 1306). The storage manager 304 may "push" (e.g., initiate a transfer of) the anomaly detection model to the secondary storage computing device 312, where the secondary storage computing device 312 stores the anomaly detection model as the anomaly detection model 522. In addition, the storage manager 304 may push the RPMA 516 to the client computing device 306 at or about the same time as the storage manager 304 transfers the anomaly detection model 422 to the client computing device 306. Furthermore, the storage manager 304 may provide ransomware protection configuration data 526 to the secondary storage computing device 312 that configures the RPMA 516 to monitor the backups of the client computing devices, and detect malware and/or ransomware that may have infected one or more of the backups. In other instances, a user or operator of the secondary storage computing device 312 may download and/or install the RPMA 516 and/or the anomaly detection model 522.

After the anomaly detection model 522 and/or the RPMA 516 are installed on the secondary storage computing device 312, the secondary storage computing device 312 instantiates the RPMA 516 to monitor for potential malware and/or ransomware in one or more backups of the client computing devices 306-312 (Operation 1310). Once instantiated, the RPMA 516 may initiate one or more monitoring process(es) 518 to monitor for changes (e.g., differences) between one or more backups of a client computing device (Operation 1312). After executing the one or more monitoring process(es) 518, the monitoring process(es) 518 monitor for new backups created by the client computing devices, and may compare the file modifications and/or changes between the new backups created by the client computing devices, and corresponding prior backups that were previously created.

In one embodiment, the monitoring process(es) 518 monitor for changes backups of the client computing devices 306-312 in response to a new backup being created in a secondary storage device (not shown). Referring to FIG. 13B, the RPMA 516 determines whether a new backup has been created (Operation 1314). Where the RPMA 516 determines that a new backup has been created (e.g., the "YES" branch of Operation 1314), the method 1302 proceeds to Operation 1316. Where a new backup has not been created (e.g., the "NO" branch of Operation 1316), the method 1302 may return to Operation 1312 of FIG. 13A, where the monitoring process(es) 518 continue to monitor for new backups created in the secondary storage device.

At Operation 1316, the monitoring process(es) 518 determine differences between the newly created backup and a prior corresponding backup (e.g., an earlier version of a backup). As discussed previously, the monitoring process(es) 518 may reference the media agent index 322 and/or the file system data 528 stored by the media agent index 322 to determine these differences. In another embodiment, the differences are already recorded in the media agent index 322 (e.g., the differences are recorded at the time the newly created backup is stored in the secondary storage device).

At Operation 1318, the classifier 520 may determine whether the changes and/or modifications detected by the monitoring process(es) 418 represent anomalous behavior. In one embodiment, the detected differences between corresponding backups is input to the classifier 520, which then determines whether the determined differences represent anomalous behavior and, if so, the type of behavior (Operation 1318). The classifier 520 may determine whether differences in the backups indicate anomalous activity by using the determined differences as input to the anomaly detection model 522, which then outputs an indication or value indicating whether the determined differences indicate anomalous activity.

Accordingly, at Operation 1320, where the classifier 420 determines that there is anomalous activity in the differences between backups (e.g., the "YES" branch of Operation 1320), the method 1302 proceeds to Operation 1322 on FIG. 13C. Where the classifier 520 determines that there is no anomaly in the difference between backups (e.g., the "NO" branch of Operation 1320), the method 1302 returns to Operation 1312 of FIG. 13A, where the monitoring process(es) 518 continue to monitor for new backups of the client computing devices 306-312.

At Operation 1322, the classifier 520 determines the type of anomalous behavior based on the determined differences of the backups (Operation 1322). As previously discussed with regard to FIG. 5, the classifier 520 may output a value indicating the type of behavior that was detected based on the anomaly detection model 522. The types of behaviors include, but is not limited to, that a large number of files were deleted, a large number of files were created, a large number of files were modified, a large number of files were encrypted, and so forth. Although the preceding description uses the relative term "large," it will be understood by one of ordinary skill in the art that the numerical value of "large" may vary depending on the training data sets used to train the anomaly detection model 522.

After determining the type of anomalous activity in the determined differences of the backups, the RPMA 516 may then communicate the determined differences and/or the determined anomaly type to the storage manager 304 (Operation 1324). In one embodiment, the storage manager 304 stores this information in the anomaly detection database 316, where this information may be later retrieved in displaying one or more of the graphical user interfaces discussed with reference to FIGS. 6-10B. Further still, depending on the type of anomaly detected, the storage manager 304 may automatically initiate virtualization of the client computing device in which the anomalous activity was detected (e.g., via the virtual machine host 314), and then place the affected client computing device into an offline state or prohibit the affected client computing device from being part of the information management system 302 (e.g., by placing the media access control address of the affected client computing device on a blacklist). As shown in FIG. 12C, the storage manager 304 may further generate an alert of the detected anomaly (Operation 1326), and the alert may be communicated to the operator and/or administrator of the information management system 302 via one or more communication channels (e.g., SMS, e-mail, phone call, etc.). Where the generated alert is communicated via SMS and/or e-mail, the generated alert may further include a hyperlink to web-based command center (e.g., the software illustrated in FIGS. 6-10B), where the administrator and/or operator can learn more about the detected anomaly and take remedial measures on the affected data (Operation 1328).

Figure 14A:
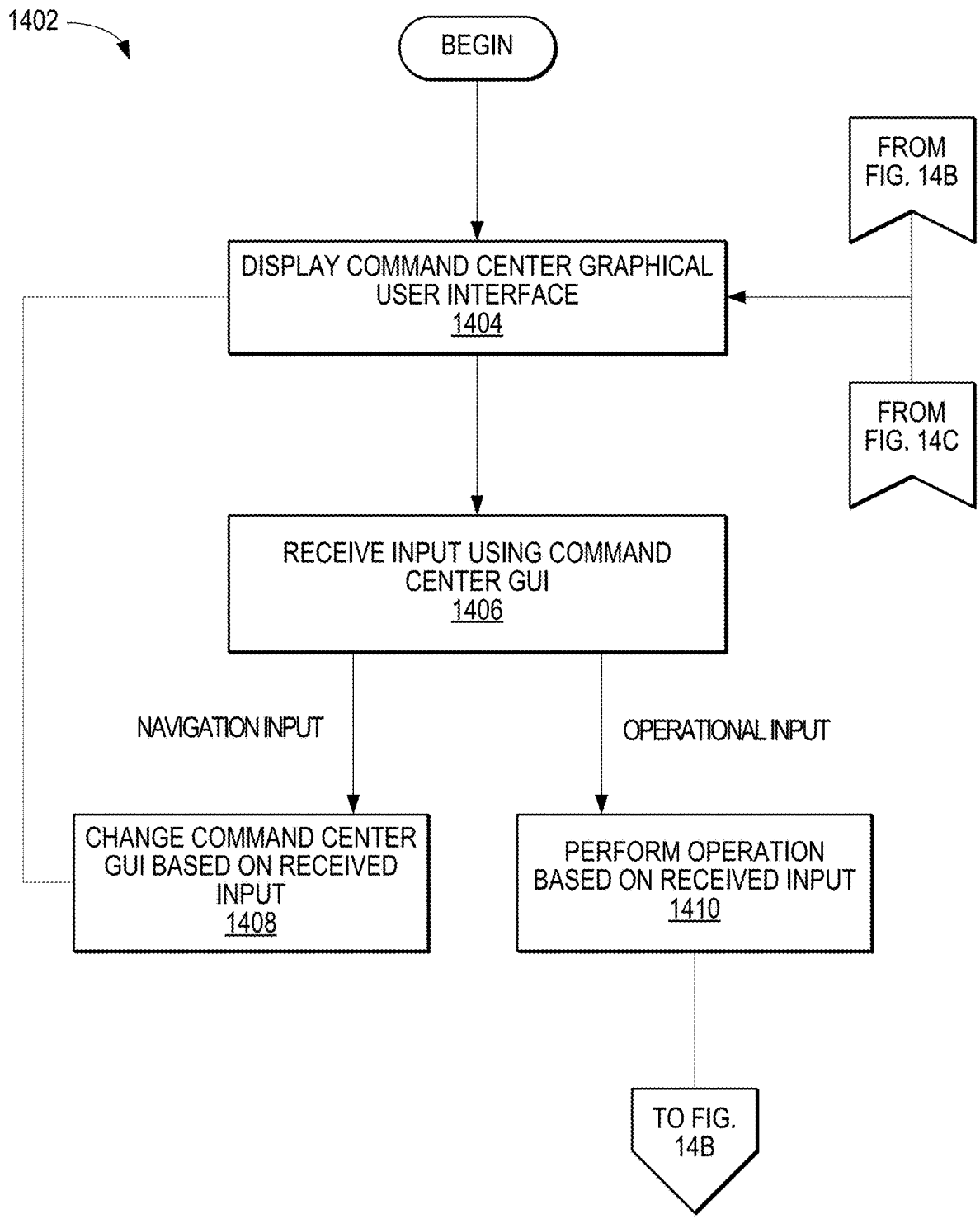
FIGS. 14A-14C illustrate a method, in accordance with an example embodiment, for interacting with a graphical user interface that provides anomaly detection information for one or more client computing devices of the information management system of FIG. 3.
Figure 14B:
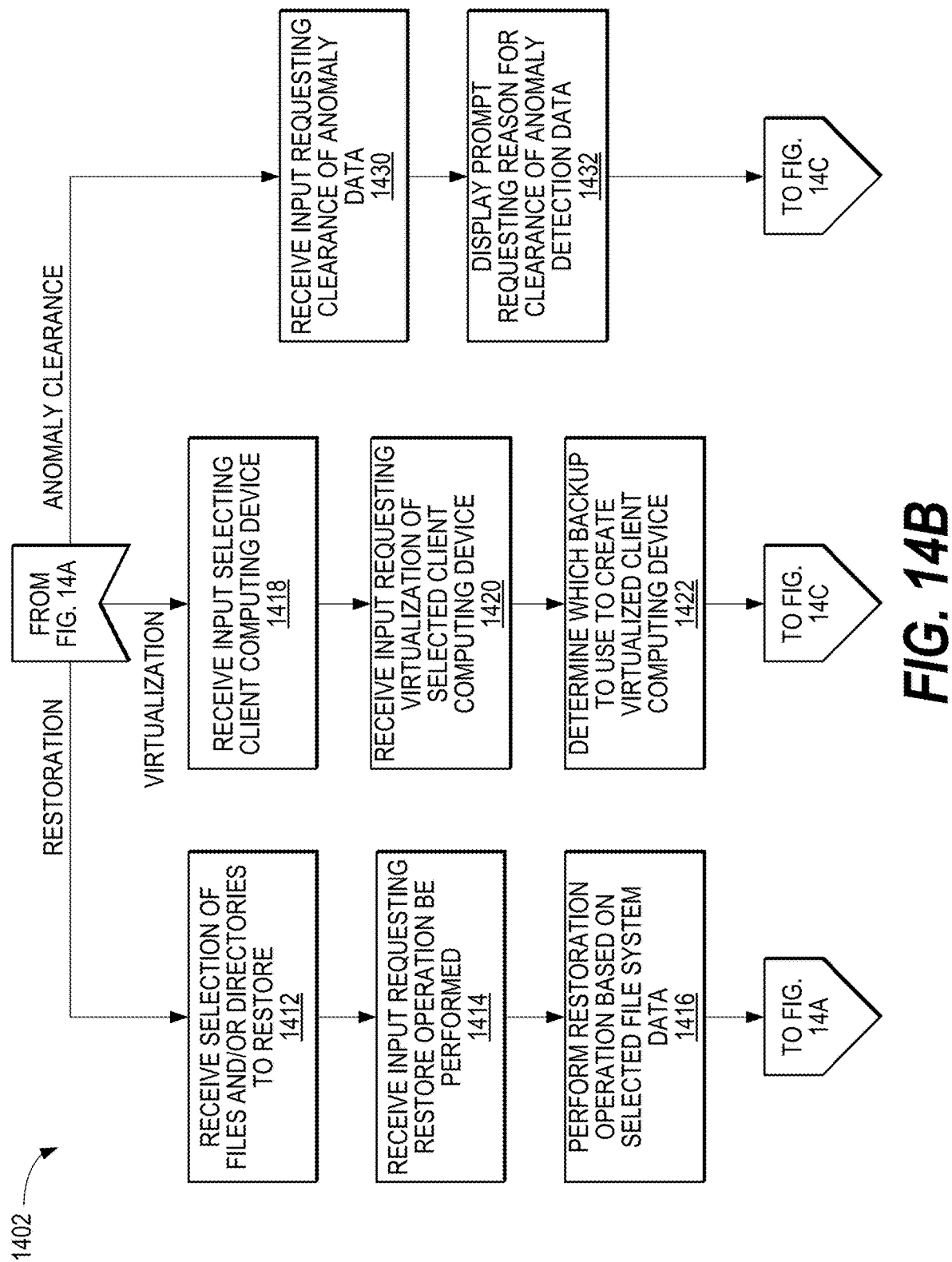
Figure 14C:
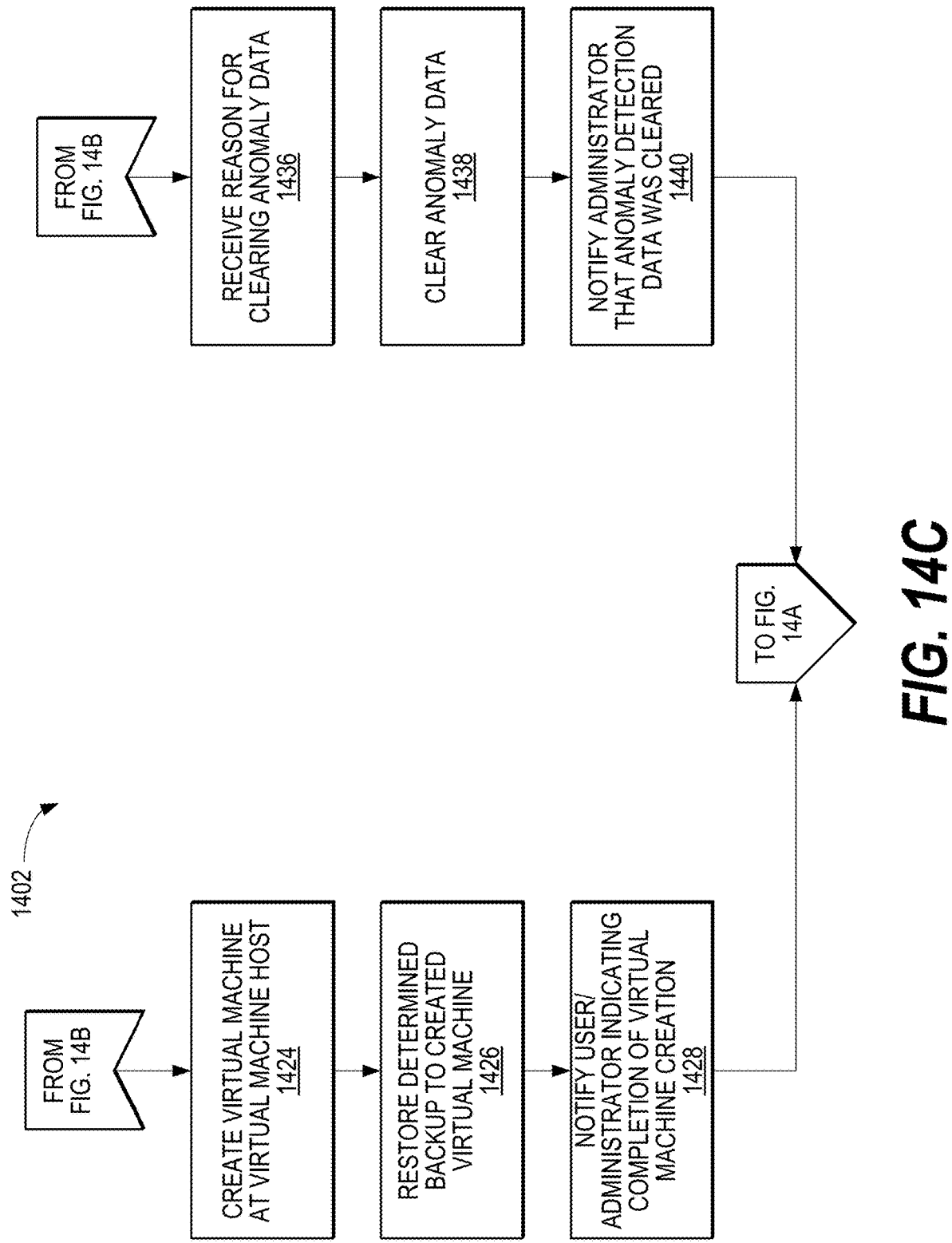

FIGS. 14A-14C illustrate a method 1402, in accordance with an example embodiment, for interacting with a graphical user interface that provides anomaly detection information for one or more client computing devices of the information management system of FIG. 3. The method 1402 may be implemented by one or more of the devices and/or components illustrated in FIGS. 3-5.

Referring initially to FIG. 14A, a user using a client computing device (e.g., client computing device 306), may visit a web page or execute an application for displaying the command center graphical user interfaces illustrated in FIGS. 6-11B (Operation 1404). In user the graphical user interfaces, the user may provide different types of input for interacting with the displayed graphical user interfaces. In this regards, FIG. 14A categorizes the types of input into "navigational input" and "operational input." A navigational input may be an input that causes the displayed graphical user interface to navigate to a different graphical user interface. For example, selecting one or more of the menu options from the menu panel 626 to change to a different graphical user interface. An operational input may be an input that effects a change in the currently displayed graphical user interface or effects a change in one or more of the devices or components of the information management system. For example, selecting the clear option 724 of the graphical user interface 702 is an example of providing an operational input. Where the input is a navigational input (e.g., the "NAVIGATION INPUT" branch of Operation 1406), the method 1402 proceeds to Operation 1408, where the displayed graphical user interface changes to a different graphical user interface based on the input. Where the input is an operational input (e.g., the "OPERATIONAL INPUT" branch of Operation 1406), the displayed application performs the operation associated with the provided input (Operation 1410).

Referring to FIG. 14B is an example of some of the operations that may be performed based on the provided operational input. In one instance, the operational input is an input that requests restoration of one or more files to a client computing device. Following the "RESTORATION" branch from Operation 1410, a user may input a selection of one or more files and/or directories to restore to a client computing device (Operation 1412). For example, the user may use the graphical user interfaces displayed in FIGS. 11A-11B to select one or files and/or directories displayed in the graphical user interface 1102 for restoration. The user may then provide an input to perform the restoration of the selected files and/or directories (Operation 1414). Based on the provided instruction and the selected one or more files and/or directories, the secondary storage computing device 312 then performs the requested restoration (Operation 1416).

In another instance, the operational input may be an input that requests virtualization of a particular client computing device. Following the "VIRTUALIZATION" branch from Operation 1410, a user may select a client computing device to virtualize via the virtual machine host 314. For example, and with reference to FIG. 7, a user may use the graphical user interface 702 to select a client computing device from the client table 706 to virtualize (Operation 1418). Using the graphical user interface 702, a user may then select the virtualization option 722 to instruct the secondary storage computing device 312 and/or the virtual machine host 314 to begin the virtualization process of the selected client computing device (Operation 1420). The virtual machine host 314 and/or the secondary storage computing device 312 may then determine which of the backups of the client computing device to use in virtualizing the selected client computing device (Operation 1422). In one embodiment, the virtual machine host 314 and/or the secondary storage computing device 312 uses a most recent backup of the client computing device to virtualize. In another embodiment, a user may select a backup from a plurality of backups of the client computing device to virtualize, where the plurality of backups were created from the client computing device over a period of time.

Referring to FIG. 14C, and continuing with the "VIRTUALIZATION" branch, the virtual machine host 314 may then create a virtual machine (e.g., virtual machine 326) for virtualizing the client computing device, where the created virtual machine may include virtualized hardware that is similar to the physical hardware of the client computing device (Operation 1424). As explained previously, the virtual machine host 314 may store a table, data structure, or a plurality of virtual machine templates that the virtual machine host 314 references in creating the new virtual machine. The virtual machine host 314 and/or the secondary storage computing device 312 may then restore the selected backup of the client computing device to the created virtual machine (Operation 1426). After the client computing device has been virtualized and the virtual machine is ready for use, the virtual machine host 314 and/or the secondary storage computing device 312 may inform the storage manager 304 that the virtual machine is ready, and the storage manager 304 may then communicate an alert or notification to the administrator or operator of the information management system 302 that that the virtual machine is ready (Operation 1428).

Referring back to FIG. 14B, yet another operational input that the user may provide is an anomaly clearance input, where the anomaly clearance input is to clear one or more anomaly alerts for one or more client computing devices. The anomaly clearance input is indicated by the "ANOMALY CLEARANCE" branch from Operation 1410, which proceeds to Operation 1430. At Operation 1430, a user of the graphical user interfaces may provide an input indicating that the user desires to clear one or more of the detected anomalies for one or more of the client computing devices (Operation 1410). One example of a graphical user interface that provides an option for clearing anomalies is illustrated at FIG. 7, where the graphical user interface 702 includes a clear option 724 that allows a user to clear one or more of the determined anomalies. After selecting the clear option 724, the graphical user interface 702 may display a further prompt requesting confirmation from the user that he or she wants to proceed with the anomaly clearance (Operation 1432). The prompt may further request that the user provides a reason for clearing the anomaly. The benefit of displaying the prompt is that it records the reason for the anomaly clearance, which may be helpful in resolving future disputes if the anomaly was not meant to be cleared.

Continuing to FIG. 14C, the storage manager 304 may receive the reason for clearing the detected anomalies (Operation 1436). Further still, the storage manager 304 may store the reason for clearing the anomaly in one or more databases, such as the anomaly detection database 316. The reason for the clearance may also be associated with a date of the clearance, a time of the clearance, the client computing device corresponding to the detected anomaly, and the type of anomaly that was detected.

The storage manager 304 may then clear the anomaly data selected by the user (Operation 1438). In one embodiment, clearing the anomaly data includes storing a flag or other identifier indicating that the cleared anomaly data is not to be displayed in further displays of the graphical user interfaces. In another embodiment, clearing the anomaly data causes the storage manager 304 to delete the anomaly data from the anomaly detection database 316. This embodiment may result in the removal or deletion of the anomaly data, and thus, will not appear in future displays of the graphical user interfaces. The storage manager 304 may then notify an administrator and/or operator of the information management system 302 that the anomaly data was cleared from the anomaly detection database 316.

In this manner, the foregoing description provides an information management system that detects potential malware and/or ransomware in one or more client computing devices, and provides a graphical user interface that allows an administrator or operator of the information management system to restore previously backed-up files of client computing devices that may have been affected by the detected malware and/or ransomware. In addition, the administrator or operator of the information management system may instantiate a virtual machine that mimics or replicates the hardware of an affected client computing device, and a secondary copy of primary data of the affected client computing may be restored to the instantiated virtual machine copy. The virtual machine may be instantiated with a secondary copy of primary data prior to the infection of the malware and/or ransomware detected in the client computing device. Thus, the virtual machine copy of the client computing device may represent a restored version of the client computing device prior to the infection of the malware and/or ransomware. In this way, the disclosed information management system addresses the problem of malware and/or ransomware affecting a client computing device, and allows an administrator or operator of the information management system to provide a working version of the client computing device prior to the infection of the malware and/or ransomware.

Example Embodiments

Some example enumerated embodiments of the present invention are recited in this section in the form of methods, systems, and non-transitory computer-readable media, without limitation. In one embodiment, this disclosure describes a method of protecting file system data of a client computing device being managed by a storage manager, where the method includes training an anomaly detection model based on file system data obtained from one or more backup operations, monitoring file system data of a client computing device being managed by a storage manager, wherein the client computing device is in communication with a secondary storage computing device for storing a secondary copy of data of the client computing device, and determining that there are one or more changes to the file system data of the client computing device. The method may also include providing the one or more changes of the file system data to the anomaly detection model to determine whether there is an anomaly in the file system data, determining that there is an anomaly in the file system data based on the anomaly detection model, and generating a notification to a user that there is an anomaly in the file system data based on the determination that there is an anomaly in the file system data. The method may further include transmitting the notification to the user and providing a graphical user interface for viewing the determined anomaly in response to a selection of the generated notification.

In another embodiment of the method, the graphical user interface displays an activity summary of the file system data based on the determined anomaly, and the graphical user interface displays a type of the determined anomaly in the activity summary.

In a further embodiment of the method, the graphical user interface displays a detected time when the determined anomaly was detected.

In yet another embodiment of the method, the method includes displaying an identifier representing at least one file system directory based on the determined anomaly in the file system data, displaying at least one option to restore a prior version of the at least one file system directory stored as a secondary copy managed by the secondary storage computing device, receiving an input of the at least one option to restore to the prior version, and restoring the prior version of the at least one file system directory to the client computing device.

In yet a further embodiment of the method, the method includes displaying an identifier representing the client computing device in the graphical user interface based on the determined anomaly in the file system data with at least one option to create a virtual machine copy of the client computing device, receiving an input of the at least one option to create the virtual machine copy of the client computing device, and creating the virtual machine copy of the client computing device.

In another embodiment of the method, the method includes determining a backup copy of the client computing device to use in creating a virtual machine copy of the client computing device, wherein the backup copy is stored as a secondary copy managed by the secondary storage computing device, the determined backup copy originated from the client computing device prior to the detected anomaly in the file system data, and creating the virtual machine copy of the client computing device comprises creating the virtual machine copy from the determined backup copy.

In a further embodiment of the method, the method includes displaying a geographic location of the client computing device having the detected anomaly in the file system data on a geographic map displayed by the graphical user interface.

This disclosure further provides a system for protecting the file system data of a client computing device, where the system includes one or more non-transitory, computer-readable mediums having computer-executable instructions stored thereon, and one or more processors that, having executed the computer-executable instructions, configures the system to perform a plurality of operations that includes training an anomaly detection model based on file system data obtained from one or more backup operations, monitoring file system data of a client computing device being managed by a storage manager, wherein the client computing device is in communication with a secondary storage computing device for storing a secondary copy of data of the client computing device, and determining that there are one or more changes to the file system data of the client computing device. The plurality of operations may also include providing the one or more changes of the file system data to the anomaly detection model to determine whether there is an anomaly in the file system data, determining that there is an anomaly in the file system data based on the anomaly detection model, and generating a notification to a user that there is an anomaly in the file system data based on the determination that there is an anomaly in the file system data. The plurality of operations may further include transmitting the notification to the user and providing a graphical user interface for viewing the determined anomaly in response to a selection of the generated notification.

In another embodiment of the system, the graphical user interface displays an activity summary of the file system data based on the determined anomaly, and the graphical user interface displays a type of the determined anomaly in the activity summary.

In a further embodiment of the system, the graphical user interface displays a detected time when the determined anomaly was detected.

In yet another embodiment of the system, the plurality of operations further includes displaying an identifier representing at least one file system directory based on the determined anomaly in the file system data, displaying at least one option to restore a prior version of the at least one file system directory stored as a secondary copy managed by the secondary storage computing device, receiving an input of the at least one option to restore to the prior version, and restoring the prior version of the at least one file system directory to the client computing device.

In yet a further embodiment of the system, the plurality of operations further includes displaying an identifier representing the client computing device in the graphical user interface based on the determined anomaly in the file system data with at least one option to create a virtual machine copy of the client computing device, receiving an input of the at least one option to create the virtual machine copy of the client computing device, and creating the virtual machine copy of the client computing device.

In another embodiment of the system, the plurality of operations further includes determining a backup copy of the client computing device to use in creating a virtual machine copy of the client computing device, wherein the backup copy is stored as a secondary copy managed by the secondary storage computing device, the determined backup copy originated from the client computing device prior to the detected anomaly in the file system data, and creating the virtual machine copy of the client computing device comprises creating the virtual machine copy from the determined backup copy.

In a further embodiment of the system, the plurality of operations further includes displaying a geographic location of the client computing device having the detected anomaly in the file system data on a geographic map displayed by the graphical user interface.

This disclosure also describes a non-transitory, computer-readable medium having computer-executable instructions stored that, when executed by one or more processors, configures a system to perform a plurality of operations that includes training an anomaly detection model based on file system data obtained from one or more backup operations, monitoring file system data of a client computing device being managed by a storage manager, wherein the client computing device is in communication with a secondary storage computing device for storing a secondary copy of data of the client computing device, and determining that there are one or more changes to the file system data of the client computing device. The plurality of operations may also include providing the one or more changes of the file system data to the anomaly detection model to determine whether there is an anomaly in the file system data, determining that there is an anomaly in the file system data based on the anomaly detection model, and generating a notification to a user that there is an anomaly in the file system data based on the determination that there is an anomaly in the file system data. The plurality of operations may further include transmitting the notification to the user and providing a graphical user interface for viewing the determined anomaly in response to a selection of the generated notification.

In another embodiment of the non-transitory, computer-readable medium, the graphical user interface displays an activity summary of the file system data based on the determined anomaly, and the graphical user interface displays a type of the determined anomaly in the activity summary.

In a further embodiment of the non-transitory, computer-readable medium, the graphical user interface displays a detected time when the determined anomaly was detected.

In yet another embodiment of the non-transitory, computer-readable medium, the plurality of operations further includes displaying an identifier representing at least one file system directory based on the determined anomaly in the file system data, displaying at least one option to restore a prior version of the at least one file system directory stored as a secondary copy managed by the secondary storage computing device, receiving an input of the at least one option to restore to the prior version, and restoring the prior version of the at least one file system directory to the client computing device.

In yet a further embodiment of the non-transitory, computer-readable medium, the plurality of operations further includes displaying an identifier representing the client computing device in the graphical user interface based on the determined anomaly in the file system data with at least one option to create a virtual machine copy of the client computing device, receiving an input of the at least one option to create the virtual machine copy of the client computing device, and creating the virtual machine copy of the client computing device.

In another embodiment of the non-transitory, computer-readable medium, the plurality of operations further includes determining a backup copy of the client computing device to use in creating a virtual machine copy of the client computing device, wherein the backup copy is stored as a secondary copy managed by the secondary storage computing device, the determined backup copy originated from the client computing device prior to the detected anomaly in the file system data, and creating the virtual machine copy of the client computing device comprises creating the virtual machine copy from the determined backup copy.

In a further embodiment of the non-transitory, computer-readable medium, the plurality of operations further includes displaying a geographic location of the client computing device having the detected anomaly in the file system data on a geographic map displayed by the graphical user interface.

This disclosure further describes a method for protecting file system data of a client computing device being managed by a storage manager, the method comprising training an anomaly detection model based on file system data obtained from one or more backup operations, receiving a secondary copy of data from a client computing device being managed by a storage manager, wherein the client computing device is in communication with a secondary storage computing device for storing the secondary copy, and determining that there are one or more changes to the secondary copy. The method also includes providing the one or more changes of the secondary copy to the anomaly detection model to determine whether there is an anomaly in file system data of the secondary copy, determining that there is an anomaly in the secondary copy based on the anomaly detection model, and generating a notification to a user that there is an anomaly in the secondary copy based on the determination that there is an anomaly in the secondary copy. The method further includes transmitting the notification to the user, and providing a graphical user interface for viewing the determined anomaly in response to a selection of the generated notification.

In another embodiment of the method, the graphical user interface displays an activity summary of the secondary copy based on the determined anomaly, and the graphical user interface displays a type of the determined anomaly in the activity summary.

In a further embodiment of the method, the graphical user interface displays a detected time when the determined anomaly was detected.

In yet another embodiment of the method, the method further includes displaying an identifier representing at least one file system directory based on the determined anomaly in the secondary copy, displaying at least one option to restore a prior version of the at least one file system directory stored as secondary copy managed by the secondary storage computing device, receiving an input of the at least one option to restore to the prior version, and restoring the prior version of the at least one file system directory to the client computing device.

In yet a further embodiment of the method, the method further includes displaying an identifier representing the client computing device in the graphical user interface based on the determined anomaly in the secondary copy with at least one option to create a virtual machine copy of the client computing device, receiving an input of the at least one option to create the virtual machine copy of the client computing device, and creating the virtual machine copy of the client computing device.

In another embodiment of the method, the method further includes determining a backup copy of the client computing device to use in creating a virtual machine copy of the client computing device, wherein the backup copy is stored as a secondary copy managed by the secondary storage computing device, and the determined backup copy originated from the client computing device prior to the detected anomaly in the secondary copy. In addition, creating the virtual machine copy of the client computing device comprises creating the virtual machine copy from the determined backup copy.

In a further embodiment of the method, determining that there are one or more changes to the secondary copy comprises comparing the received secondary copy with a prior backup copy of the client computing device, wherein the prior copy is managed by the secondary storage computing device.

This disclosure also describes a system that includes one or more non-transitory, computer-readable having computer-executable instructions stored thereon and one or more processors that, having executed the computer-executable instructions, configure the system to perform a plurality of operations that includes training an anomaly detection model based on file system data obtained from one or more backup operations, receiving a secondary copy of data from a client computing device being managed by a storage manager, wherein the client computing device is in communication with a secondary storage computing device for storing the secondary copy, and determining that there are one or more changes to the secondary copy. The plurality of operations also includes providing the one or more changes of the secondary copy to the anomaly detection model to determine whether there is an anomaly in file system data of the secondary copy, determining that there is an anomaly in the secondary copy based on the anomaly detection model, and generating a notification to a user that there is an anomaly in the secondary copy based on the determination that there is an anomaly in the secondary copy. The plurality of operations further includes transmitting the notification to the user, and providing a graphical user interface for viewing the determined anomaly in response to a selection of the generated notification.

In another embodiment of the system, the graphical user interface displays an activity summary of the secondary copy based on the determined anomaly, and the graphical user interface displays a type of the determined anomaly in the activity summary.

In a further embodiment of the system, the graphical user interface displays a detected time when the determined anomaly was detected.

In yet another embodiment of the system, the plurality of operations further includes displaying an identifier representing at least one file system directory based on the determined anomaly in the secondary copy, displaying at least one option to restore a prior version of the at least one file system directory stored as a secondary copy managed by the secondary storage computing device, receiving an input of the at least one option to restore to the prior version, and restoring the prior version of the at least one file system directory to the client computing device.

In yet a further embodiment of the system, the plurality of operations further includes displaying an identifier representing the client computing device in the graphical user interface based on the determined anomaly in the secondary copy with at least one option to create a virtual machine copy of the client computing device, receiving an input of the at least one option to create the virtual machine copy of the client computing device, and creating the virtual machine copy of the client computing device.

In another embodiment of the system, the plurality of operations further includes determining a backup copy of the client computing device to use in creating a virtual machine copy of the client computing device, wherein the backup copy is stored as a secondary copy managed by the secondary storage computing device, and the determined backup copy originated from the client computing device prior to the detected anomaly in the secondary copy. In addition, creating the virtual machine copy of the client computing device comprises creating the virtual machine copy from the determined backup copy.

In a further embodiment of the system, determining that there are one or more changes to the secondary copy comprises comparing the received secondary copy with a prior backup copy of the client computing device, wherein the prior copy is managed by the secondary storage computing device.

This disclosure also describes a non-transitory, computer-readable medium having computer-executable instructions stored thereon that, when executed by one or more processors, configures a system to perform a plurality of operations that includes training an anomaly detection model based on file system data obtained from one or more backup operations, receiving a secondary copy of data from a client computing device being managed by a storage manager, wherein the client computing device is in communication with a secondary storage computing device for storing the secondary copy, and determining that there are one or more changes to the secondary copy. The plurality of operations also includes providing the one or more changes of the secondary copy to the anomaly detection model to determine whether there is an anomaly in file system data of the secondary copy, determining that there is an anomaly in the secondary copy based on the anomaly detection model, and generating a notification to a user that there is an anomaly in the secondary copy based on the determination that there is an anomaly in the secondary copy. The plurality of operations further includes transmitting the notification to the user, and providing a graphical user interface for viewing the determined anomaly in response to a selection of the generated notification.

In another embodiment of the non-transitory, computer-readable medium, the graphical user interface displays an activity summary of the secondary copy based on the determined anomaly, and the graphical user interface displays a type of the determined anomaly in the activity summary.

In a further embodiment of the non-transitory, computer-readable medium, the graphical user interface displays a detected time when the determined anomaly was detected.

In yet another embodiment of the non-transitory, computer-readable medium, the plurality of operations further includes displaying an identifier representing at least one file system directory based on the determined anomaly in the secondary copy, displaying at least one option to restore a prior version of the at least one file system directory stored as secondary copy managed by the secondary storage computing device, receiving an input of the at least one option to restore to the prior version, and restoring the prior version of the at least one file system directory to the client computing device.

In yet a further embodiment of the non-transitory, computer-readable medium, the plurality of operations further includes displaying an identifier representing the client computing device in the graphical user interface based on the determined anomaly in the secondary copy with at least one option to create a virtual machine copy of the client computing device, receiving an input of the at least one option to create the virtual machine copy of the client computing device, and creating the virtual machine copy of the client computing device.

In another embodiment of the non-transitory, computer-readable medium, the plurality of operations further includes determining a backup copy of the client computing device to use in creating a virtual machine copy of the client computing device, wherein the backup copy is stored as secondary copy managed by the secondary storage computing device, and the determined backup copy originated from the client computing device prior to the detected anomaly in the secondary copy. In addition, creating the virtual machine copy of the client computing device comprises creating the virtual machine copy from the determined backup copy.

In a further embodiment of the non-transitory, computer-readable medium, determining that there are one or more changes to the secondary copy comprises comparing the received secondary copy with a prior backup copy of the client computing device, wherein the prior copy is managed by the secondary storage computing device.

In other embodiments according to the present invention, a system or systems operates according to one or more of the methods and/or computer-readable media recited in the preceding paragraphs. In yet other embodiments, a method or methods operates according to one or more of the systems and/or computer-readable media recited in the preceding paragraphs. In yet more embodiments, a non-transitory computer-readable medium or media causes one or more computing devices having one or more processors and computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

We claim:

1. A computer-implemented method performed by a secondary storage computing device, the method comprising:
    receiving data from a client computing device,
        wherein the secondary storage computing device is configured to generate a first secondary copy of the data;
    generating the first secondary copy of the data received from the client computing device;
    determining that, compared to a second secondary copy of the data that precedes the first secondary copy, there are one or more changes in the first secondary copy,
        wherein the one or more changes are determined based on an index maintained by the secondary storage computing device,
        wherein the index is configured to track file system information for each secondary copy, including file system information about data files backed up within the first secondary copy and file system information about data files backed up within the second secondary copy;
    providing the one or more changes to an anomaly detection model, which is deployed at the secondary storage computing device, to determine whether there is an anomaly in the first secondary copy, wherein the anomaly detection model was previously trained with file system information obtained from backup operations that generated secondary copies;
    determining that there is an anomaly in the first secondary copy, based on the anomaly detection model; and
    generating a notification of the anomaly to a user.

2. The computer-implemented method of claim 1, further comprising:
    displaying an identifier representing at least one file system directory based on the anomaly in the first secondary copy;
    displaying an option to restore a prior version of the at least one file system directory stored as a secondary copy managed by the secondary storage computing device;
    receiving an input of the option to restore to the prior version; and
    restoring the prior version of the at least one file system directory to the client computing device.

3. The computer-implemented method of claim 1, further comprising:
    displaying an identifier representing the client computing device with an option to create a virtual machine copy of the client computing device;
    receiving an input of the option to create the virtual machine copy of the client computing device; and
    creating the virtual machine copy of the client computing device.

4. The computer-implemented method of claim 1, further comprising:
    determining a backup copy of the client computing device to use in creating a virtual machine copy of the client computing device, wherein
    the backup copy is stored as a secondary copy managed by the secondary storage computing device, and
    the backup copy originated from the client computing device prior to the anomaly in the secondary copy, and
    creating the virtual machine copy of the client computing device from the backup copy.

5. The computer-implemented method of claim 1, wherein the data within the first secondary copy of the data comprises one or more of: files, directories, and data structures.

6. The computer-implemented method of claim 1, wherein the file system information about the data within the first secondary copy of the data comprises metadata generated by the secondary storage computing device in a backup operation that generated the first secondary copy of the data.

7. The computer-implemented method of claim 1, wherein the second secondary copy of the data and the first secondary copy of the data are sequential.

8. The computer-implemented method of claim 1, wherein the second secondary copy of the data and the first secondary copy of the data correspond to a same one or more primary data at the client computing device.

9. The computer-implemented method of claim 1, wherein determining that there are one or more changes in the data received from the client computing device is performed by an application that monitors the index as the first secondary copy is created, wherein the application executes at the secondary storage computing device.

10. The computer-implemented method of claim 1, the anomaly detection model determines that there is an anomaly in the first secondary copy, based on one or more differences between the first secondary copy and the second secondary copy.

11. A system comprising: one or more hardware processors and computer memory carrying computer programming instructions that configured the system to:
 perform a first backup operation comprising transmitting data from a client computing device to a secondary storage computing device, wherein the secondary storage computing device is configured to generate a first secondary copy of the data received from the client computing device;
 determine differences between the first secondary copy and a second secondary copy that preceded the first secondary copy, wherein the second secondary copy and the first secondary copy are sequential in the system;
 wherein the differences between the first secondary copy and a second secondary copy are determined from an index maintained by the secondary storage computing device, wherein the index is configured to track file system information for each secondary copy, including file system information about first data files backed up within the first secondary copy and file system information about second data files backed up within the second secondary copy;
 provide the differences to an anomaly detection model deployed at the secondary storage computing device, wherein the anomaly detection model was trained, before the first backup operation, with file system information obtained from backup operations performed in the system;
 determine, by the anomaly detection model, that there is an anomaly in file system information of the data received from the client computing device and being backed up into the first secondary copy; and
 generating a notification of the anomaly to a user, wherein the notification provides an indication of the first secondary copy.

12. The system of claim 11, wherein the file system information for the first secondary copy of the data comprises metadata generated by the secondary storage computing device in the first backup operation that generated the first secondary copy.

13. The system of claim 11, wherein the differences between the first secondary copy and the second secondary copy are determined by an application that monitors the index during the first backup operation, wherein the application executes at the secondary storage computing device.

14. The system of claim 11, wherein the second secondary copy and the first secondary copy correspond to a same primary data at the client computing device.

15. The system of claim 11, wherein the system is further configured to:
 display an identifier representing at least one file system directory based on the anomaly in the first secondary copy;
 display an option to restore a prior version of the at least one file system directory, which is stored as a secondary copy managed by the secondary storage computing device;
 receive an input of the option to restore to the prior version; and
 restore the prior version of the at least one file system directory to the client computing device.

16. The system of claim 11, wherein the system is further configured to:
 display an identifier representing the client computing device based on the anomaly, with an option to create a virtual machine copy of the client computing device;
 receive an input of the option to create the virtual machine copy of the client computing device; and
 create the virtual machine copy of the client computing device.

17. The system of claim 11, wherein the system is further configured to:
 determine a backup copy of the client computing device to use in creating a virtual machine copy of the client computing device, wherein
 the backup copy is stored as a secondary copy managed by the secondary storage computing device, and
 the backup copy originated from the client computing device prior to the anomaly in the first secondary copy; and
 create the virtual machine copy of the client computing device based on the backup copy.

* * * * *